US012651992B2

(12) United States Patent
Pennington, III et al.

(10) Patent No.: US 12,651,992 B2
(45) Date of Patent: Jun. 9, 2026

(54) WIRELESSLY TRANSFERRING POWER WITHIN AN ELECTRIC MACHINE HAVING AC AND DC ROTOR COILS

(71) Applicant: Tau Motors, Inc., Redwood City, CA (US)

(72) Inventors: Walter Wesley Pennington, III, Portola Valley, CA (US); Ethan Bagget Swint, Redwood City, CA (US); Gregory Gordon Stevenson, San Carlos, CA (US); Anthony Da Costa, Los Altos, CA (US); Michael Parker Owen, St. Augustine, FL (US); Matthew J. Rubin, Indianapolis, IN (US); Matthias Preindl, New York, NY (US)

(73) Assignee: Tau Motors, Inc., Redwood City, CA (US)

( * ) Notice: Subject to any disclaimer, the term of this patent is extended or adjusted under 35 U.S.C. 154(b) by 143 days.

(21) Appl. No.: 18/279,364

(22) PCT Filed: Mar. 4, 2022

(86) PCT No.: PCT/US2022/019041
§ 371 (c)(1),
(2) Date: Aug. 29, 2023

(87) PCT Pub. No.: WO2022/187715
PCT Pub. Date: Sep. 9, 2022

(65) Prior Publication Data
US 2024/0186932 A1      Jun. 6, 2024

Related U.S. Application Data

(60) Provisional application No. 63/157,563, filed on Mar. 5, 2021.

(51) Int. Cl.
*H02P 25/03* (2016.01)
*H02K 1/26* (2006.01)
(Continued)

(52) U.S. Cl.
CPC ............... *H02P 25/03* (2016.02); *H02K 1/26* (2013.01); *H02K 11/042* (2013.01); *H02K 19/26* (2013.01)

(58) Field of Classification Search
CPC .......... H02P 25/03; H02P 9/302; H02K 1/26; H02K 11/042; H02K 19/26; H02K 3/20; H02K 19/12; H02K 1/223
See application file for complete search history.

(56) References Cited

U.S. PATENT DOCUMENTS

| | | | | |
|---|---|---|---|---|
| 5,023,540 | A * | 6/1991 | Walton ................... | H02P 9/302 363/39 |
| 2008/0123379 | A1* | 5/2008 | Smidt ..................... | H02M 1/10 363/84 |

(Continued)

FOREIGN PATENT DOCUMENTS

| | | | | |
|---|---|---|---|---|
| DE | 102010060998 | A1 * | 6/2012 | ............. H02K 19/26 |
| EP | 3595167 | A1 | 1/2020 | |

(Continued)

OTHER PUBLICATIONS

English translation of DE-102010060998-A1 (Year: 2012).*
International Search Report and Written Opinion issued in corresponding PCT Application No. US2022/019041, issued Jul. 25, 2022.

*Primary Examiner* — Tulsidas C Patel
*Assistant Examiner* — Joshua Kiel M Rodriguez
(74) *Attorney, Agent, or Firm* — Quarles & Brady, LLP

(57) ABSTRACT

A stator defines multiple stator poles with associated stator windings. A rotor defines multiple fixed rotor poles with associated teeth with a ferromagnetic material. The fixed rotor poles have associated rotor windings configured to be (Continued)

energized substantially by the stator. Each of the rotor windings is associated with the tooth. Each of the rotor windings includes an alternating current (AC) coil (or auxiliary coil) configured to carry an AC current induced by an AC current flowing in the stator. A direct current (DC) coil (or primary coil) defines a rotor field energizable by magnetic fields produced by the stator windings to produce relative forces between the rotor and the stator. The DC coil is at least partially powered or controlled by the AC coil.

21 Claims, 34 Drawing Sheets

(51) Int. Cl.
 *H02K 11/042* (2016.01)
 *H02K 19/26* (2006.01)

(56) References Cited

U.S. PATENT DOCUMENTS

| | | | |
|---|---|---|---|
| 2012/0086381 A1 | 4/2012 | Lipo | |
| 2016/0211787 A1 | 7/2016 | Shrestha | |
| 2019/0097501 A1 * | 3/2019 | Lin | H02K 3/20 |
| 2019/0207484 A1 | 7/2019 | Shrestha et al. | |

FOREIGN PATENT DOCUMENTS

| | | | | |
|---|---|---|---|---|
| JP | 2015065803 A | 4/2015 | | |
| WO | WO-2005086323 A1 * | 9/2005 | | H02K 16/00 |
| WO | 2019/067853 A1 | 4/2019 | | |
| WO | 2019226929 A1 | 11/2019 | | |

* cited by examiner

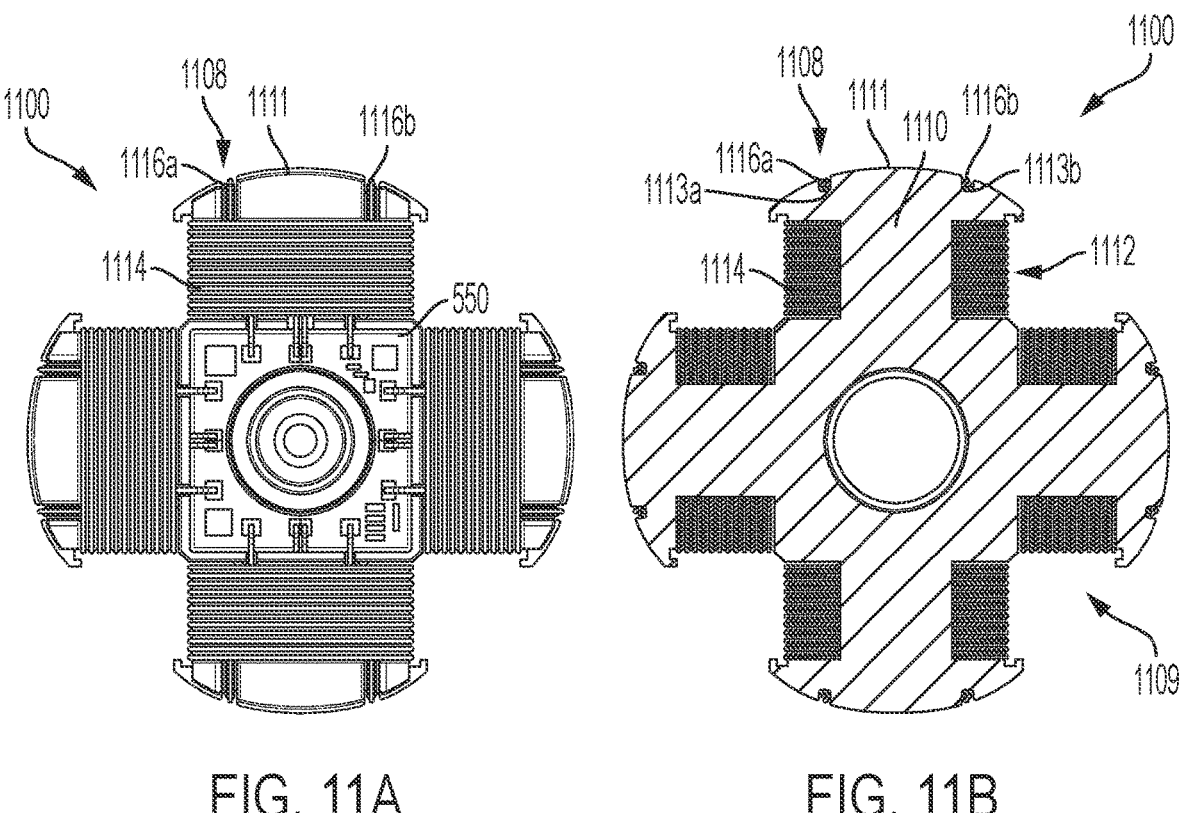
FIG. 11A                    FIG. 11B
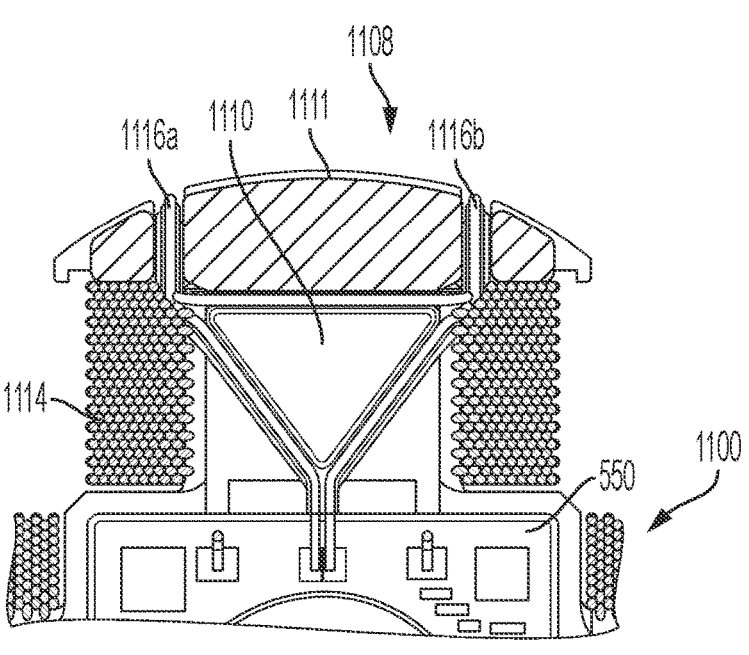
FIG. 11C

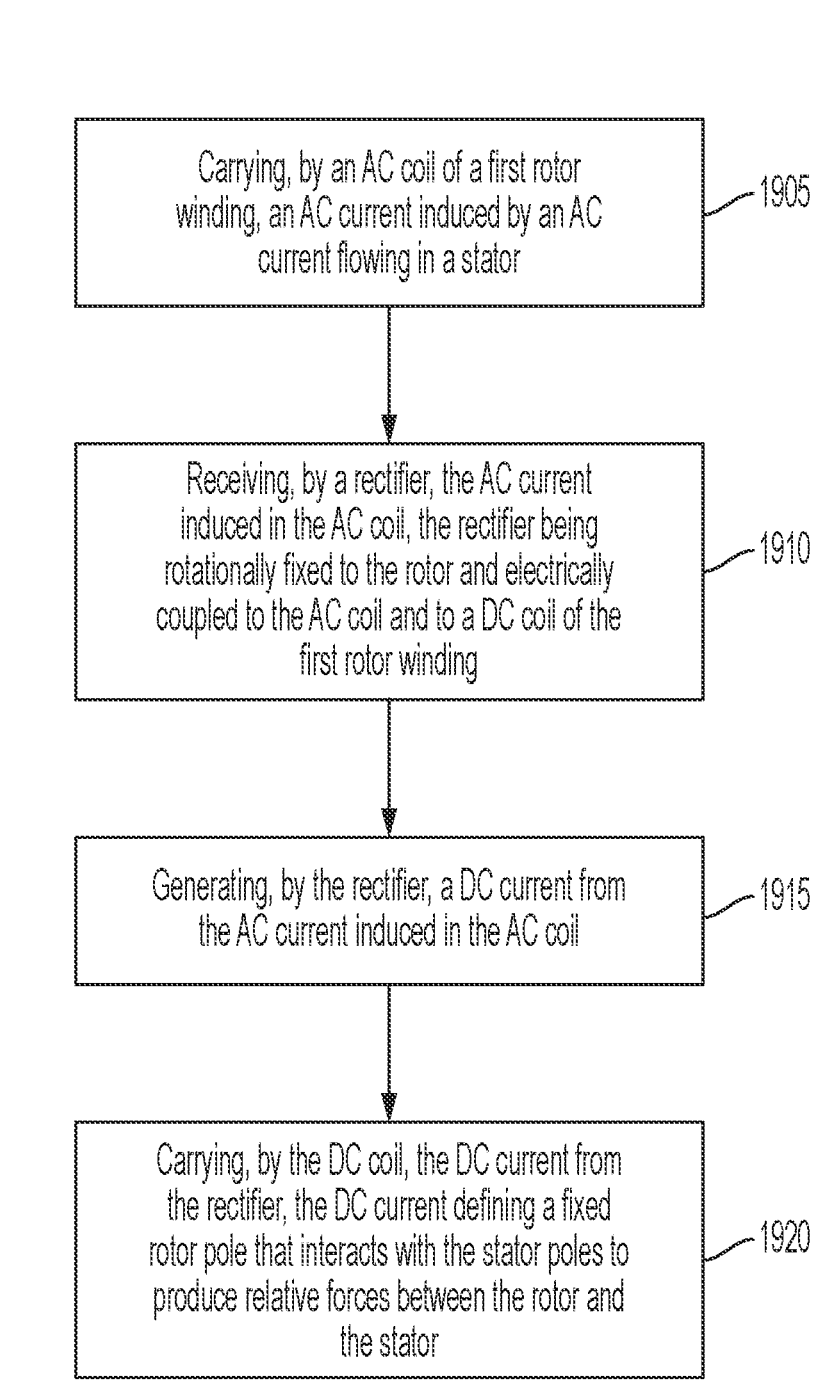

1900

Carrying, by an AC coil of a first rotor winding, an AC current induced by an AC current flowing in a stator — 1905

Receiving, by a rectifier, the AC current induced in the AC coil, the rectifier being rotationally fixed to the rotor and electrically coupled to the AC coil and to a DC coil of the first rotor winding — 1910

Generating, by the rectifier, a DC current from the AC current induced in the AC coil — 1915

Carrying, by the DC coil, the DC current from the rectifier, the DC current defining a fixed rotor pole that interacts with the stator poles to produce relative forces between the rotor and the stator — 1920

FIG. 19

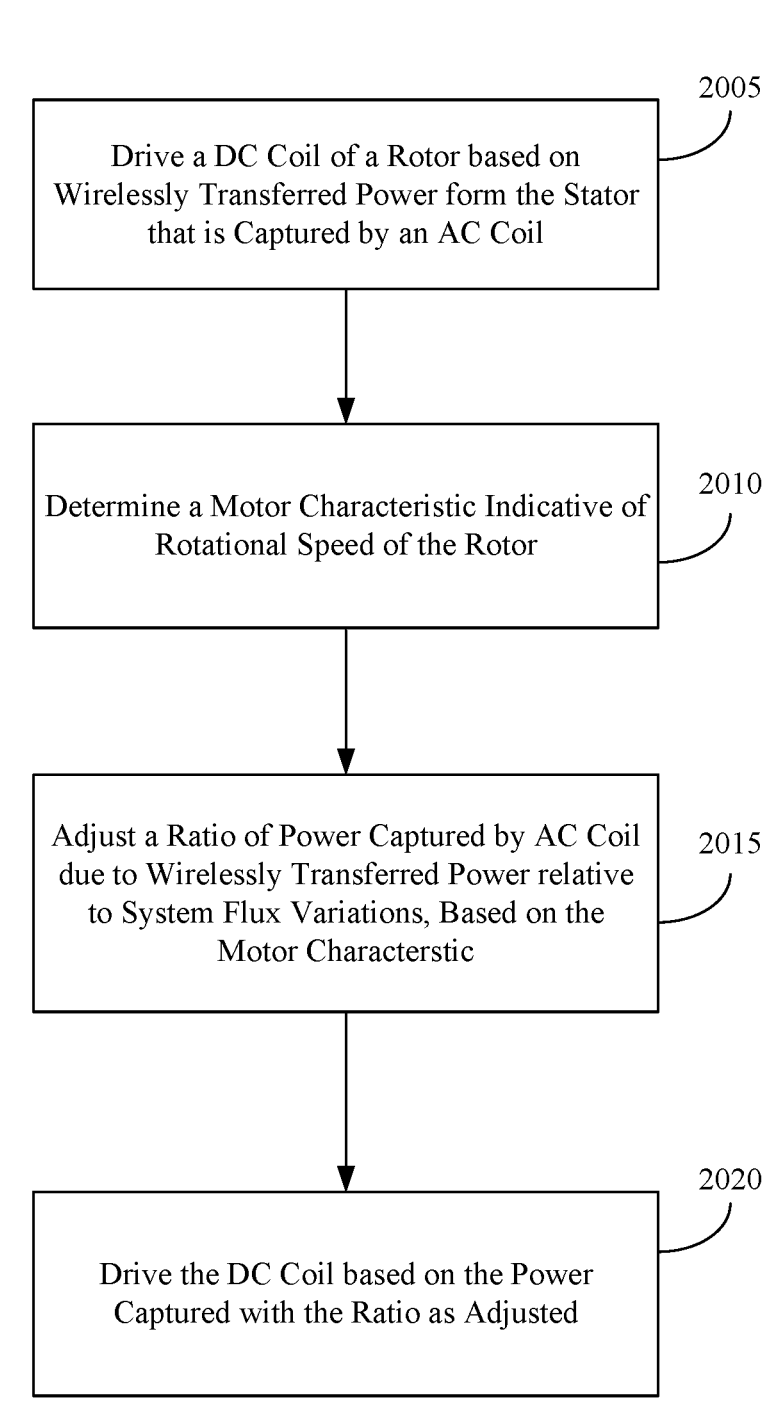

2000

Drive a DC Coil of a Rotor based on Wirelessly Transferred Power form the Stator that is Captured by an AC Coil — 2005

Determine a Motor Characteristic Indicative of Rotational Speed of the Rotor — 2010

Adjust a Ratio of Power Captured by AC Coil due to Wirelessly Transferred Power relative to System Flux Variations, Based on the Motor Characterstic — 2015

Drive the DC Coil based on the Power Captured with the Ratio as Adjusted — 2020

*FIG. 20*

WIRELESSLY TRANSFERRING POWER WITHIN AN ELECTRIC MACHINE HAVING AC AND DC ROTOR COILS

CROSS-REFERENCE TO RELATED APPLICATIONS

This application is a 371 application of PCT/US2022/019041 filed Mar. 4, 2022, which claims priority to U.S. Provisional Application No. 63/157,563 titled "Wirelessly Transferring Power with an Electric Machine having AC and DC Rotor Coils," filed on Mar. 5, 2021, which is hereby incorporated by reference in its entirety.

STATEMENT REGARDING FEDERALLY SPONSORED RESEARCH

N/A

TECHNICAL FIELD

This invention relates to electric motors and generators.

BACKGROUND

Electric motors generally include a stationary component, often referred to as a stator, and a rotational component often referred to as a rotor. Electric current is translated into electromagnetic fields that exert a mechanical force, or torque, between the stator and the rotor, which may be used to do work. Generators work on similar principles with mechanical force being translated into electric current. While primarily described in terms of rotational force, or torque, the principles described herein are also applicable to linear motors. For linear motors, in some implementations, the rotor acts as the stationary component while the stator acts as a translated component.

SUMMARY

This disclosure relates to wirelessly transferring power within an electric machine having alternating current and direct current rotor coils.

An example implementation of the subject matter described within this disclosure is a field wound synchronous electric machine with the following features. A stator including stator windings configured to be energized to define stator poles. A rotor including rotor windings configured to be energized to define fixed rotor poles with associated teeth comprising a ferromagnetic material. The fixed rotor poles interact with the stator poles to produce relative forces between the rotor and the stator, and each of the rotor windings is associated with a respective at least one tooth of the teeth. Each of the rotor windings includes an auxiliary coil configured to carry an AC current induced by an AC current flowing in the stator, and a primary coil configured to carry a DC current that defines a respective one of the fixed rotor poles. The machine further includes a rectifier electrically coupled to the auxiliary coil and the primary coil of a first rotor winding of the rotor windings. The rectifier is configured to receive the AC current induced in the auxiliary coil of the first rotor winding and to generate the DC current in the primary coil of the first rotor winding from the AC current induced in the auxiliary coil.

Another example implementation of the subject matter described within this disclosure is a method for a field wound synchronous electric machine. The method includes carrying, by an auxiliary coil of a first rotor winding of a plurality of rotor windings of a rotor of the field wound synchronous electric machine, an AC current induced by an AC current flowing in a stator of the field wound synchronous electric machine, the stator including stator windings configured to be energized to define stator poles and the rotor windings configured to be energized to define fixed rotor poles with associated teeth comprising a ferromagnetic material; receiving, by a rectifier, the AC current induced in the auxiliary coil, the rectifier being rotationally fixed to the rotor and electrically coupled to the auxiliary coil and to a primary coil of the first rotor winding; generating, by the rectifier, a DC current from the AC current induced in the auxiliary coil; and carrying, by the primary coil, the DC current from the rectifier, the DC current defining a fixed rotor pole of the fixed rotor poles that interacts with the stator poles to produce relative forces between the rotor and the stator.

Another example implementation of the subject matter described within this disclosure is a field wound synchronous electric machine with the following features. A stator defines multiple stator poles with associated stator windings. A rotor defines multiple fixed rotor poles with associated teeth with a ferromagnetic material. The fixed rotor poles have associated rotor windings configured to be energized substantially by the stator. Each of the rotor windings is associated with the tooth. Each of the rotor windings includes an alternating current (AC) coil configured to carry an AC current induced by an AC current flowing in the stator. A direct current (DC) coil defines a rotor field energizable by magnetic fields produced by the stator windings to produce relative forces between the rotor and the stator. The DC coil is at least partially powered or controlled by the AC coil.

In some implementations, a stack length of the rotor is substantially similar to the stack length of the stator.

In some implementations, the field wound synchronous electric machine includes a controller configured to energize the stator windings. The controller is configured to produce a stator magnetic field within the stator by sending a drive signal to the stator windings by sending a current through the stator windings. The stator magnetic field induces a current within the AC coils. The controller is configured to generate a magnetomotive force interacting with the DC coil to move the rotor relative to the stator.

In some implementations, the AC coil is electrically coupled to the DC coil by a rectifier.

In some implementations, the rectifier includes a passive rectifier.

In some implementations, the passive rectifier includes a bridge rectifier.

In some implementations, the rectifier includes an active rectifier.

In some implementations, the active rectifier includes one or more gates.

In some implementations, the rectifier includes a resonance capacitor.

In some implementations, a voltage regulator is configured to regulate a voltage across the resonance capacitor.

In some implementations, the rectifier includes a secondary inductor on a DC side of the rectifier.

In some implementations, a DC coil D-axis is perpendicular to a movement plane of the rotor pole.

In some implementations, an AC coil D-axis substantially aligns with a DC coil D-axis.

In some implementations, an AC coil D-axis is substantially perpendicular to a DC coil D-axis.

In some implementations, the AC coil extends up to 20% into a trunk of the rotor.

In some implementations, the AC coil only covers a portion of the DC coil D-axis flux path.

In some implementations, the AC coil is a first AC coil, the rotor further includes a second AC coil.

In some implementations, the first AC coil and the second AC coil have different D-axis alignments.

In some implementations, the first AC coil and the second AC each have a D-axis different from a DC coil D-axis.

In some implementations, spacers are between the AC coil and DC coil.

In some implementations, a printed circuit board is at an end of the rotor.

In some implementations, an AC voltage within the AC coil is 5 times, more preferably 10 times, more preferably 100 times more than a voltage within the DC coil.

In some implementations, a DC current within the DC coil is 5 times, more preferably 10 times, more preferably 100 times more than a current within the AC coil.

An example implementation of the subject matter of described within this disclosure is a method with the following features. A power signal is received by a rotor from an associated stator. A control signal is received by the rotor from the stator. The control signal has an amplitude less than that of the power signal. A magnetomotive force is generated by the stator and the rotor responsive to the power signal and the control signal.

In some implementations, receiving the power signal includes receiving an AC signal by a rotor AC coil from the stator.

In some implementations, generating the magnetomotive force includes rectifying the received AC signal to a DC current. The DC current is passed through a DC rotor coil. a magnetic field is generated responsive to passing the DC current through the DC coil.

In some implementations, receiving a control signal includes receiving an AC signal by a rotor AC coil.

In some implementations, the AC signal includes a frequency modulated control signal.

In some implementations, the AC signal includes an amplitude modulated signal.

In some implementations, the AC signal includes a current angle modulated signal.

In some implementations, the AC signal comprises a tooth-pass frequency signal.

It is apparent from this disclosure that the subject matter described herein imparts the following advantages. The concepts described herein allow for more efficient power transfer mechanisms and, in some cases, thermal capability within an electric machine when compared to a standard wound field synchronous machine. Alternatively or in addition, the concepts described herein reduce the stress on semiconductor devices, decrease current/torque ripple, and limit the size of circuits, within a wound field synchronous machine.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 11A is a planar view of an example rotor.

FIG. 11B is a planar cross-sectional view of the example rotor of FIG. 11A.

FIG. 11C is a planar cross-sectional view, with the cross section being taken just past the end of the DC coils, of a pole of the example rotor of FIG. 11A.

FIG. 13A is a perspective view of an example rotor.

FIG. 13B is a perspective view of the example rotor of FIG. 13A with the back-iron of the rotor hidden from view.

FIG. 19 is a flow chart of an example method for controlling a field wound synchronous motor according to aspects of this disclosure.

FIG. 20 is a flow chart of an example method for a hybrid control scheme for controlling a field wound synchronous motor according to aspects of this disclosure.

Like reference numbers and designations in the various drawings indicate like elements.

DETAILED DESCRIPTION

Figure 1:
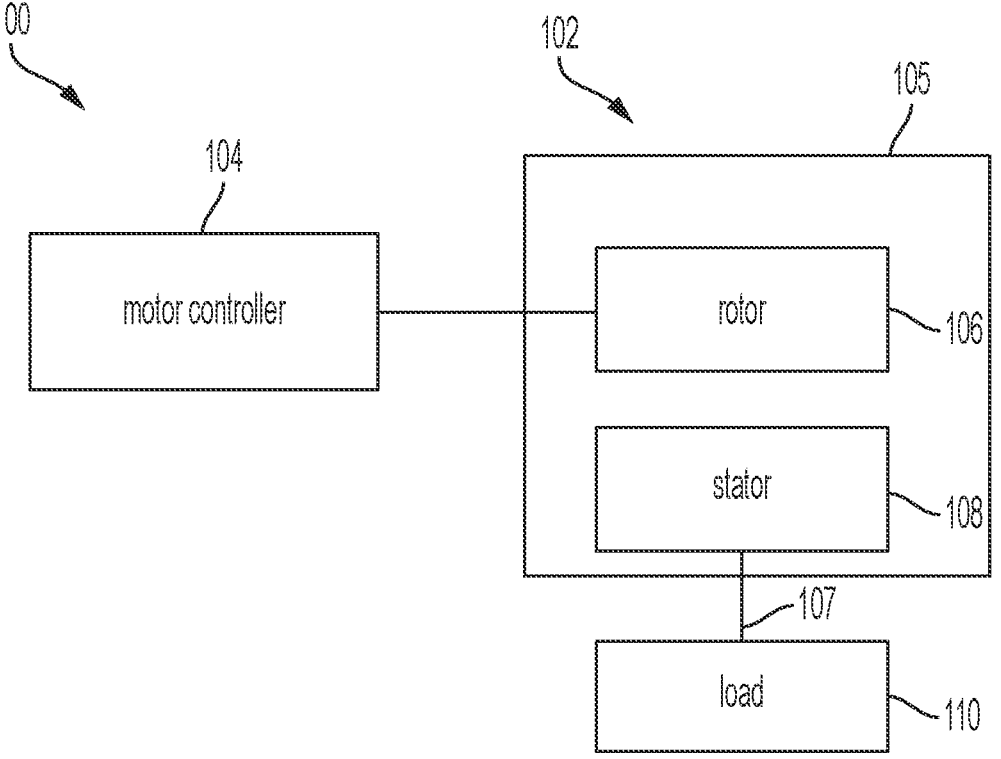
FIG. 1 is a schematic illustration of an example of an electric drive system.

In implementations according to this disclosure, rotor windings in a motor are charged by oscillating currents (e.g., currents with oscillations, perturbations, modulations, and or pulsations) in stator windings. When charged, the rotor windings carry a rotor current that couples to magnetic fields produced by currents in the stator windings, producing an electromotive force on the rotor.

Wound field synchronous machines create torque by exciting windings on the stator to provide a variable flux magnetomotive force source. The field winding (i.e., rotor winding or coil) in traditional wound field synchronous machines generates a magnetic field in the air gap in response to current flow through the field winding. The field current is typically provided by an external source and transferred to the rotor by brushes, slip-rings, etc. The windings of excited synchronous machines are part of the stator assembly and include three-phase (typical, alternatively single-phase, or multi-phase) stator windings and the magnetic paths on the stator. The winding current produces torque by interaction with the magnetic field established by the field assembly. Drawbacks of traditional wound field synchronous machines include the requirement of an auxiliary power source that generates the rotor field. In addition, mechanical slip rings with carbon brushes have a limited lifetime and require maintenance. Furthermore, the dynamic seals and brushes associated with wound field synchronous machines prevent liquid cooling options and, hence, limit power densities of their machines.

This disclosure describes a wound field synchronous machine that uses power electronics and control strategies such that the magnetomotive force of the field winding is generated through a wireless power transfer between the machine's stator windings and circuit(s) created on the rotor's windings. Such an arrangement can be thought of and modeled as a transformer of sorts, where the stator winding(s) serve as a primary winding of the transformer and the rotor winding(s) serve as the secondary winding of the transformer.

The circuits established on the rotor may be short circuited coils or rectified coils, wherein the current in the latter circuits are rectified by a semiconductor device such that alternating current (AC) is converted into direct current (DC) within the winding's circuit itself. Such rectification may include passive (e.g., diode) circuits, active (e.g., gates, MOSFET, or IGBT) circuits, or combinations thereof. Both passive and active rectification circuits are described throughout this disclosure.

In either case, in order to create a more efficient power transfer mechanism, reduce the stress on the semiconductor device, decrease current/torque ripple, and limit the size of circuits (for example, the Volt Ampere rating of circuit components), it may be advantageous to separate the power transfer component of the rotor circuit from the magnetomotive force component. To separate these components, the rotor may include at least one AC winding or coil for the power transfer and a DC field winding or coil for the magnetomotive force, where the power transferred to the AC winding is rectified to provide power to the DC field winding or coil to generate the magnetomotive force component. Such an AC winding or coil may also be referred to as an auxiliary winding or minor winding (for power transfer and/or communication), and the DC winding or coil may be referred to as a primary winding or major winding (for generating the magnetomotive force component). Thus, in the various embodiments throughout this disclosure, the terms AC coil, auxiliary coil, and minor coil may be used interchangeably, and the terms DC coil, primary coil, and major coil may be used interchangeably. Further, although an AC coil may typically or substantially only carry AC current and a DC coil may typically or substantially only carry a DC current, at least in some instances, unless otherwise indicated, an AC coil may carry some DC current (e.g., the current in the AC coil may include an AC component, a DC component, or both an AC and DC component), and a DC coil may carry some AC current (e.g., the current in the DC coil may include an AC component, a DC component, or both an AC and DC component). In some embodiments, the DC component of the current in the DC coil is greater than the AC component of the current in the DC coil. In some embodiments, the AC component of the current in the AC coil is greater than the DC component of the current in the DC coil. Additionally, as described further herein, the AC winding or coil (or auxiliary winding) may be referred to as having or lying on a minor axis, whereas the DC winding or coil (or primary winding) may be referred to as having or lying on a major axis.

This disclosure describes separating the AC and DC components within the rotor windings for the power transfer and magnetomotive force, respectively, by creating various axes on the rotor pole itself for the power transfer and magnetomotive force production. This is achieved with rotor windings that include an AC coil (power receiving coil) and a DC coil (magnetomotive force coil). In certain implementations, axes of both AC and DC coils may be the same (e.g., both coils having centers aligned with one another and/or the rotor pole) or different.

These AC and DC axes can be created by utilizing at least one AC field winding (or coil) that is placed on the rotor in conjunction with a DC winding (or coil) that resides on the primary D-axis of the rotor pole in the synchronous reference frame. Both windings are part of the same circuit and behave such that the current from the AC coil is rectified to produce DC current in the DC coil.

FIG. 1 illustrates an electric drive system 100 that includes an electric motor 102 and a motor controller 104 coupled to the electric motor 102. The motor controller 104 is configured to operate the electric motor 102 to drive a load 110. The load 110 can be an additional gear train such as a gear set, a vehicle wheel, a pump, a compressor, or another motor where multiple motors can be linked and operated in parallel.

The electric motor 102 has an output shaft 107 rotatable with respect to a motor housing 105, which is considered to be a datum with respect to rotations and other motions of motor components. In use, the output shaft 107 can be coupled to the load 110 to which the electric motor 102 can impart rotary power when electrically activated by appropriate electrical power and signals from the motor controller 104. The output shaft 107 may extend through the motor and be exposed at both ends, meaning the rotary power can be transmitted at both ends of the motor. The motor housing 105 can be rotationally symmetric about the rotation axis of output shaft 107, but may be of any external shape and can generally include means for securing the motor housing 105 to other structures to prevent housing rotation during motor operation.

The electric motor 102 includes an active magnetic component 106, such as a stator, and a passive magnetic component 108, such as a rotor. For illustration purposes, in the following, "stator" is used as a representative example of the active magnetic component and "rotor" is used as a representative example of the passive magnetic component.

The rotor 108 is associated with the stator 106 and can be disposed within the stator 106, e.g., in an internal rotor radial-gap motor; or parallel to the stator, e.g., in an axial-gap motor or in a linear motor; or around the stator, e.g., in an outer rotor radial-gap motor. As described more fully below, electrical activity in the stator 106, properly controlled, drives motion of the rotor 108. The rotor 108 is rotationally fixed or coupled to the output shaft 107, such that any rotational component of resultant rotor motion is transmitted to the output shaft 107, causing the output shaft 107 to rotate. The stator 106 is fixed to the housing 105 such that during operation, the rotor 108 moves about the stator 106 or parallel to the stator 106.

Current flowing through a loop of electric wire will result in a substantially uniform magnetomotive force (MMF) resulting in a motor pole within the wound, or encircled region. In a typical motor, such a loop has a sufficient diameter to carry the desired current load, but is thin enough that a skin depth of the drive frequency fully penetrates the loop. Many turns, or overlapping loops of wire, may be used to increase the pole's magnetic field strength. This topology is typically referred to as a wound field pole. Such a set of overlapping loops is referred to as a coil. For the purposes of this disclosure, one or more coils acting together within the stator or rotor are referred to as a winding. In some instances, coils can overlap and encompass multiple teeth on either a rotor or a stator. Such overlapping coils can be referred to as an armature or a distributed winding. A pole is a magnetic center of this distributed winding, and as such, the pole can move relative to the individual coils within such a distributed winding depending upon the drive current passing through the winding.

The stator 106 defines multiple stator poles with associated electrical windings and the rotor 108 includes multiple rotor poles, such as the examples illustrated with further details throughout this disclosure. The rotor 108 defines, together with the stator 106, a nominal air gap between the stator poles and the rotor poles, such as the example as illustrated with further details throughout this disclosure. The rotor 108 is movable with respect to the stator 106 along a motion direction.

Figure 2A:
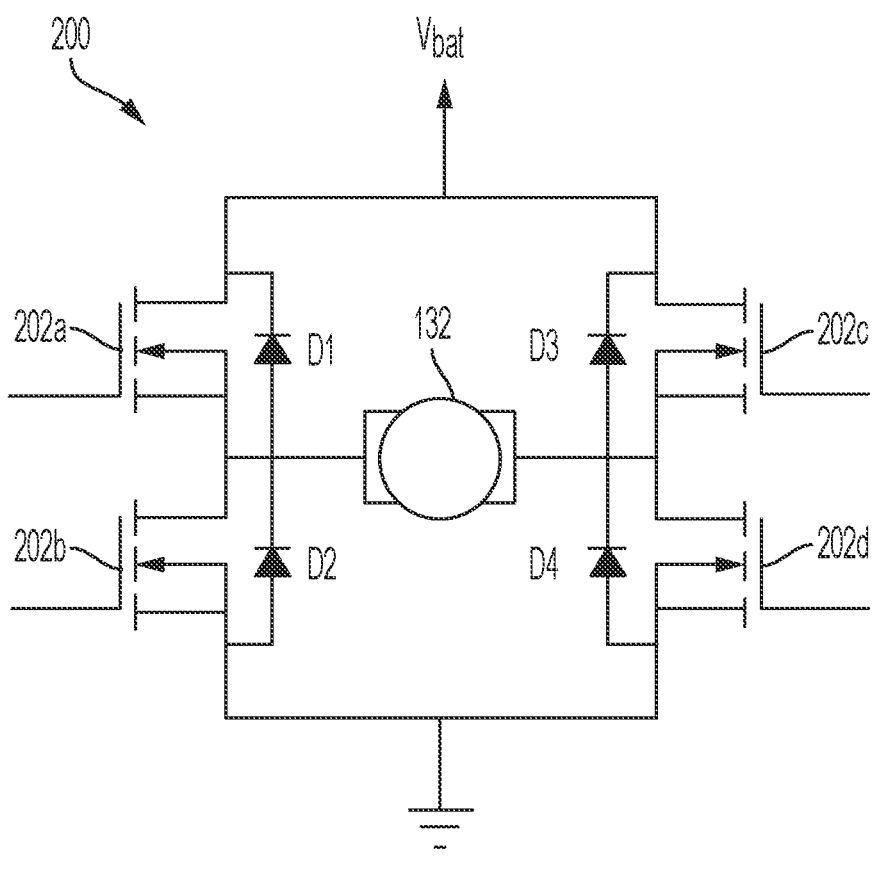
FIG. 2A is a schematic illustration of an example power switch for an electrical winding.

FIG. 2A shows an example power switch 200 for an individual electrical winding 132. The power switch 200 can have an H-bridge circuit including four switching elements 202a, 202b, 202c, and 202d, with the electrical winding 132 at the center, in an H-like configuration. The switching elements 202a, 202b, 202c, and 202d can be bi-polar or FET transistors. Each switching element 202a, 202b, 202c, and 202d can be coupled with a respective diode D1, D2, D3, and D4. The diodes are called catch diodes and can be of a Schottky type. The top-end of the bridge is connected to a power supply, e.g., a battery Vbat, and the bottom-end is grounded. Gates of the switching elements 202a, 202b, 202c, and 202d can be coupled to the motor controller 104 (FIG. 1) which is operable to send a respective control voltage signal to each switching element 202a, 202b, 202c, and 202d. The control voltage signal can be a direct current (DC) voltage signal or an alternating current (AC) voltage signal.

The switching elements 202a, 202b, 202c, and 202d can be individually controlled by the motor controller 104 (FIG. 1) and can be turned on and off independently. In some cases, if the switching elements 202a and 202d are turned on, the left lead of the stator is connected to the power supply, while the right lead is connected to the ground. Current starts flowing through the stator, energizing the electrical winding 132 in a forward direction. In some cases, if the switching elements 202b and 202c are turned on, the right lead of the stator is connected to the power supply, while the left lead is connected to the ground. Current starts flowing through the stator, energizing the electrical winding 132 in a reverse, backward direction. That is, by controlling the switching elements, the electrical winding 132 can get energized/activated in either of two directions. While primarily illustrated and described as using a single phase H-bridge configuration, a typical six switch inverter system can be used for multiphase machines without departing from this disclosure.

The motor controller 104 can be configured to sequentially operate the switches 200 for respective pole energization duty cycles to generate magnetic flux across the air gap between the stator poles and rotor poles, as described with further details throughout this disclosure. The switches can be controlled to sequentially energize stator poles to create a local attraction force pulling on the rotor. Such a sequential energization (or activation) can cause a rotation of the rotor 108, the output shaft 107, and the load 110.

Figure 2B:
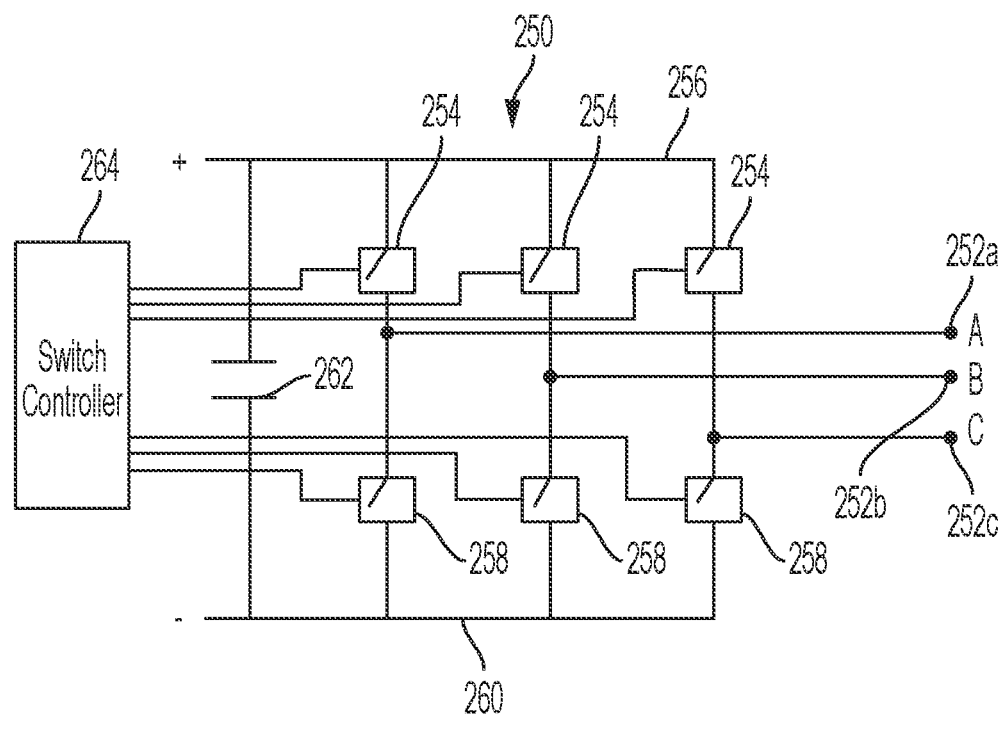
FIGS. 2B-2C are schematic illustrations of inverter circuit topologies that can be used with aspects of this disclosure.
Figure 2C:
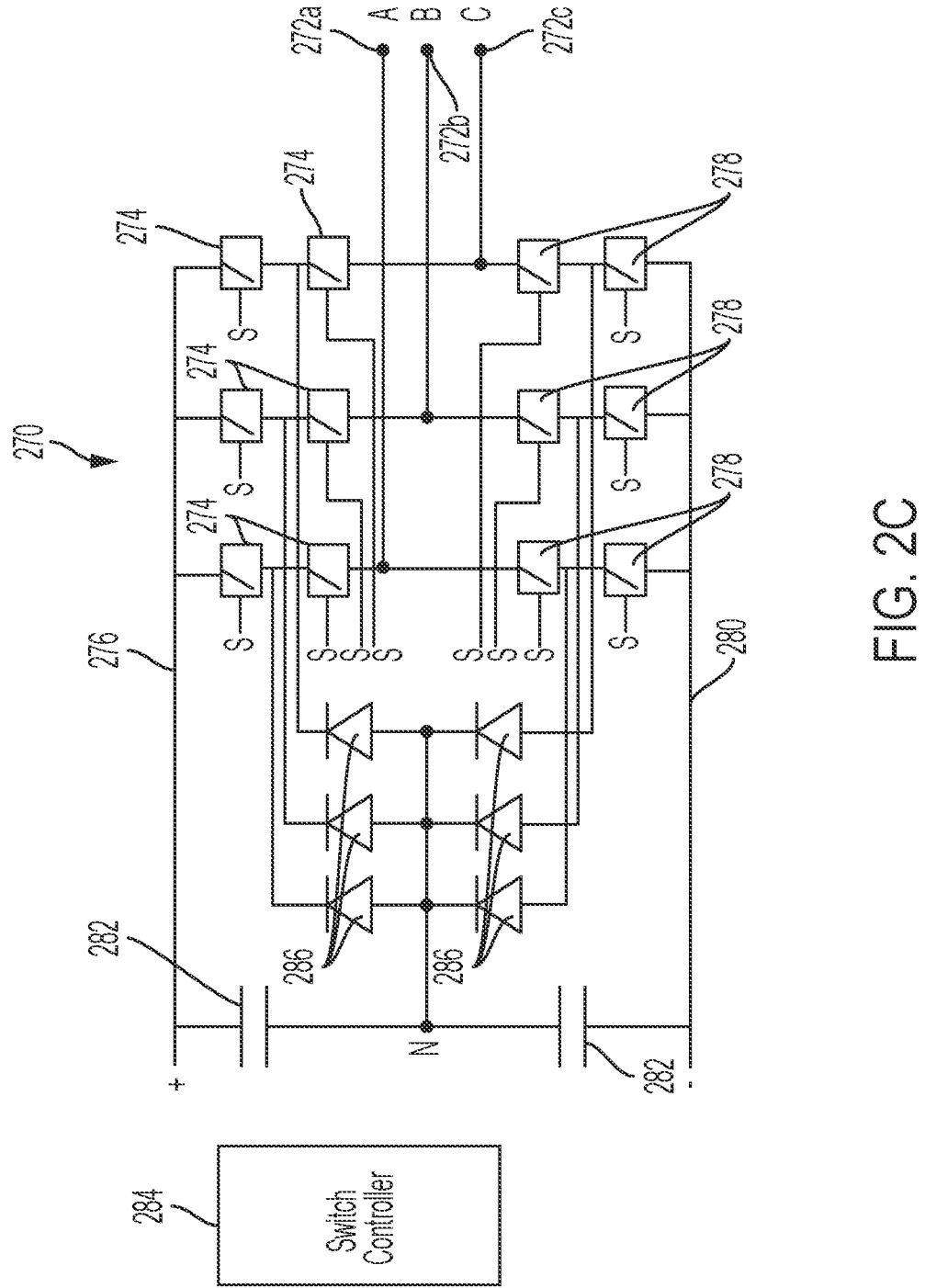

FIGS. 2B-2C show example inverters 250, 270 configured to implement power switching. The inverters 250, 270 may be implemented as part of, for example, motor controller 104, the motor controller 1700 (described below and with respect to FIG. 17), and/or as part of a stator or rotor, as described throughout this disclosure.

In the example of FIG. 2B, the inverter 250 is a three-phase two-level inverter. Stator windings A, B, and C (not shown, conductively coupled at nodes 252a, 252b, 252c) are switchably conductively coupled, by switches 254, to a positive voltage rail 256, and are also switchably conductively coupled, by switches 258, to a negative voltage rail 260. The stator windings themselves may be configured in, for example, a wye configuration or a delta configuration. The rails 256, 260 are conductively coupled by a capacitor 262. In some implementations, the rails 256, 260 corresponding to currents sources instead of voltage sources.

A switch controller 264 actively controls the switches 254, 258 to implement three-phase power in the stator windings (e.g., to cause movement of a rotor) and/or to transmit signals to the rotor using appropriate voltages/currents in the stator windings. In some embodiments, the switch controller 264 may be incorporated into the controller 104 or the motor controller 1700.

FIG. 2C shows an example three-level neutral point clamp (NPC) inverter 270, which operates as described for inverter 250 except where indicated otherwise. Stator windings A, B, and C (not shown, conductively coupled at nodes 272a, 272b, 272c) are switchably conductively coupled, by paired switches 274, to a positive voltage rail 276, and are also switchably conductively coupled, by paired switches 278, to a negative voltage rail 280. Paired diodes 286 are conductively coupled between respective sets of paired switches 274, 278. The switches 274, 278 are controlled by a switch controller 284. In some embodiments, the switch controller 284 may be incorporated into the controller 104 or the motor controller 1700.

In the example inverter 270, the stator windings A, B, and C are conductively coupled to a neutral point N (e.g., in a star configuration); the conductive coupling to the neutral point N may be direct or with one or more interceding electrical elements. The neutral point N is also conductively coupled within each pair of diodes 286. Two capacitors 282 conductively couple the neutral point N to the positive and negative voltage rails 276, 280. As noted for the inverter 250, in some implementations the rails 276, 280 represent a current source instead of a voltage source.

Operation of an electric machine may be described relative to the stationary reference frame, the synchronous reference frame, or the magnetic reference frame. The stationary reference frame is observed from the perspective of the stator, where the stator would appear to be motionless while the rotor would appear to spin about the central axis of rotation. The synchronous reference frame is observed from the perspective of the rotor, where the rotor would appear to be motionless while the stator would appear to spin. This would be consistent with the position as observed by an encoder in direct mechanical communication with the rotor. The magnetic reference frame is observed from the perspective of the magnetic field formed by the stator. From this perspective, the rotor of a synchronous distributed wound motor looks relatively stationary, but may include some slight oscillations if torque ripple is present. In addition, a rotor pole may look "behind" or "ahead" the magnetic field.

Motor components and controls are sometimes discussed in reference to a D-axis 406 (example illustrated in FIGS. 4A-4C) and Q-axis of a motor rotor and/or stator. The direct axis, or D-axis 406, in a motor may be defined as the center line of a pole 408 perpendicular to the air gap 418, and may be applied to either a stator pole 411 (See FIGS. 4A-4C) or rotor pole 408. A rotor may be characterized with a D-axis 406 for each pole as viewed in the synchronous reference frame. In a wire wound rotor, the D-axis 406 is the center point of the resultant magnetic center of a coil or field winding regardless of whether the field winding is concentrated to a single, large slot or spread across multiple, smaller slots. Stator poles can be similarly characterized.

Figures 4A, 4B, 4C:
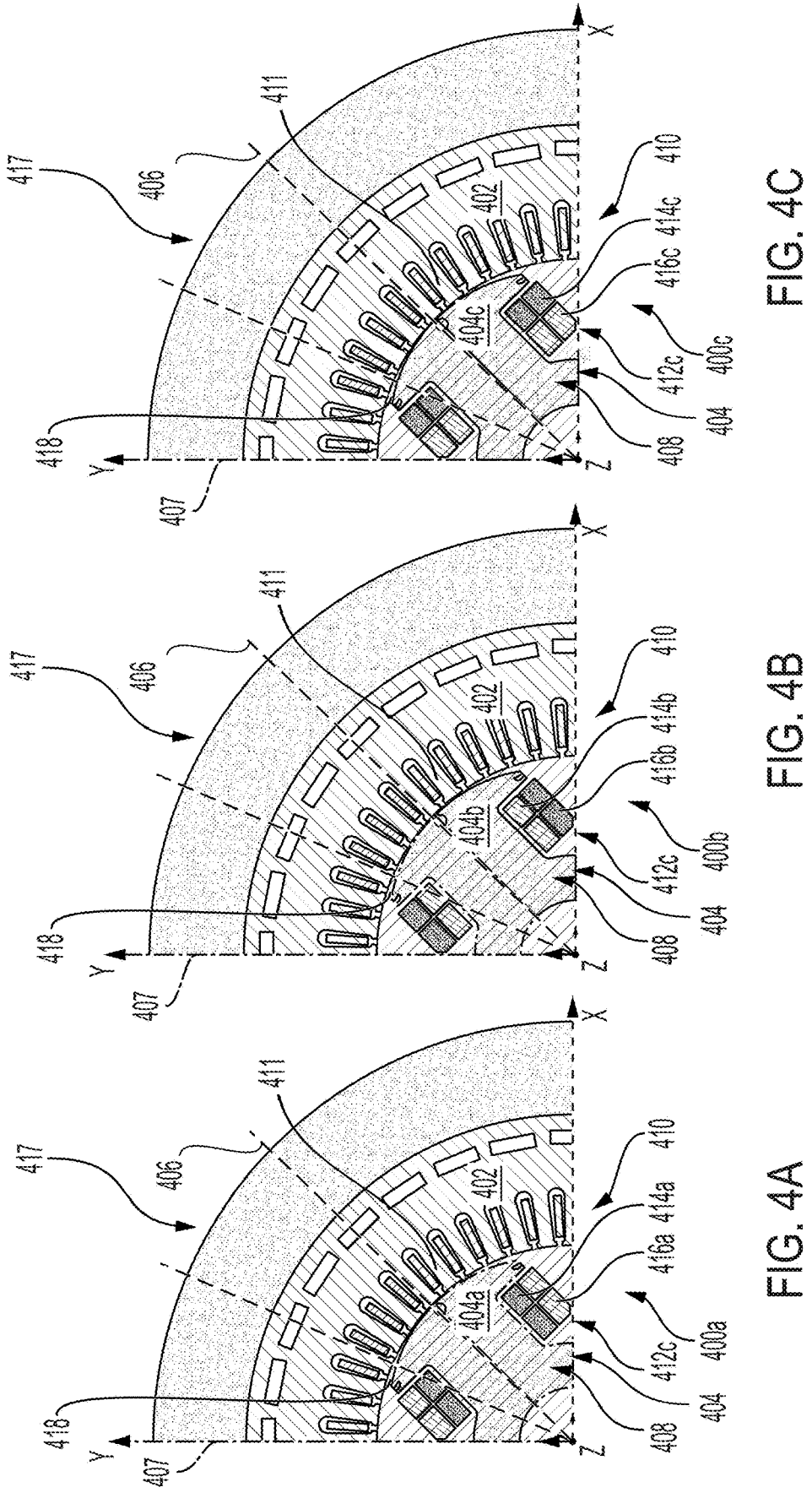
FIGS. 4A-4C are planar cross-sectional views of example rotor poles and associated windings.

The Q-axis is normal (that is, electrically 90° for a machine with four rotor poles, or, in some implementations, 360°/np for a machine with hp poles) to the D-axis within the magnetic reference frame. In some implementations, the Q-axis is electrically normal to the D-axis, and both lie in a plane in which the rotor rotates. In general, forces along the Q-axis generate an electromotive force, such as torque. Topologically, the Q-axis of a rotor or a stator is typically located directly between two poles. A Q-axis 407 is illustrated in FIGS. 4A-C. Although the Q-axis is 90° offset from the D-axis in the electrical frame of reference, in the mechanical frame of reference in FIGS. 4A-C, the Q-axis 407 is 45° offset from the D-axis (because there are # of poles/2 electrical cycles for every mechanical cycle, and the illustrated machine has four poles).

Axes may also be described as "major" or "minor" with respect to their relationship to a rotor tooth. A major D-axis is the D-axis of a rotor tooth with respect to the stator in the synchronous reference frame, and the major Q-axis is the Q-axis of this rotor tooth. For example, where a DC winding is a coil concentrated and wound around a single rotor tooth, the D-axis of the DC winding (and coil) may align with the major D-axis of the rotor pole, and the major Q-axis may be perpendicular to this D-axis in the electrical reference frame (45 degrees offset in the mechanical reference frame shown in FIGS. 4A-C). The major axes' primary function is torque production, although they may also be used for other purposes (e.g., fluxing of the rotor or bulk power transfer). A minor D-axis may be described as a sub-reference frame specific to an auxiliary coil, such as the various AC coils described herein. A minor D-axis (i.e., the D-axis of the AC coils described herein) may be used for wireless power transfer between the stator and rotor and/or data communication between the stator and rotor (bidirectional or unidirectional). A minor D-axis provides a flux path that is "differential" in nature to a flux path of the major D-axis. Thus, variations in flux linkage on this minor channel do not couple to the major D-axis, rather, their flux loops close in a path that is smaller than the major D-axis flux loop. In some examples, the minor D-axis loop may share portions of its flux path with the Major D axis. The minor D-axis of an auxiliary or AC coil may align with the major D-axis of the associated rotor pole (see, e.g., FIGS. 4A-C), may be perpendicular to the major D-axis (see, e.g., FIG. 8A-D), or may be oblique with respect to the major D-axis (see, e.g., FIG. 10A-D), as described and illustrated with respect to the various embodiments below. A minor Q-axis is a Q-axis associated with an auxiliary or AC coil.

Although a major axis (e.g., the major D-axis) may be used for power transfer and/or data signaling, using a minor axis, such as a minor D-axis associated with an AC coil, for power transfer and/or data communications between stator and rotor can be beneficial for several reasons. For example, using the minor D-axis may enable smaller core losses for power transfer because such power transfer uses variations in flux linkage on a small volume, as compared to power transfer over the major D-axis. Additionally, using the minor D-axis may provide a higher power transfer limit because, even during high torque conditions, portions of the motor geometry have low magnetic saturation that allow for better coupling from stator to rotor circuits. Further, using the minor D-axis may enable the associated AC coils to harness energy from slot passing effects (that result in minor D-axis flux variations) without additional stator control signals. Additionally, using the minor D-axis may reduce torque ripple from slot passing effects. That is, energy transfer from the slot passing effects can be balanced against torque ripple produced by the slot passing effects on the major D-axis. Further, using the minor D-axis may enable substantially pure AC MMF because power transfer on a minor d-axis flux path has substantially no DC component. As a result, current and voltage requirements of electronics on the minor D-axis may be less than those required for the major D-axis.

In such a system where control signals can be transformed into a D-axis and Q-axis, a third axis (a Z-axis) is present that is orthogonal to the plane at which the Q and D components can be found. The Z-axis component may be described as having the signal quantities (e.g., control and/or power signals) that do not map directly onto the D-axis or Q-axis. In some implementations, the Z-axis component of the control and/or power signals described herein is substantially zero. While primarily described within this disclosure as controlling/powering rotors using signal/power injection along the D- and Q-axis, it is possible to inject control and/or power signals along the Z-axis without departing from this disclosure. For example, an auxiliary coil (e.g., an AC coil) can communicate with the z-axis if a neutral voltage is present, for instance, some form of capacitive coupling between the stator and the rotor.

A current phasor angle 417 is the relative angle of a rotor D-axis 406 to the magnetic center of the stator (example illustrated in FIGS. 4A-4C). A positive current phasor angle indicates that the magnetic center of the stator is ahead of the rotor pole in a direction of motion. Such a situation results in the magnetic center of the stator "pulling" the rotor pole towards the magnetic center of the stator. Similarly, a negative current angle indicates that the magnetic center of the stator is behind the rotor pole. Such a situation "pulls" the rotor pole in the opposite direction. Such a negative current phasor angle 417 can be used in braking situations. In some implementations, a current phasor angle 417 of greater than 90° can be used. Such a large phasor current angle 417 can "push" an adjacent pole in the direction of motion. Similarly, a current phasor angle 417 of less than 90° can be used to "push" an adjacent pole in an opposite direction, such as during braking operations. Converting the current phasor angle 417 between the stationary and synchronous reference frames can be done using the following equation:

$$\theta_c=(P/2)\theta_m, \tag{1}$$

where $\theta_c$ is the current phasor angle in the synchronous reference frame, P is the number of stator poles, and $\theta_m$ is a current phasor angle in the stationary reference frame. Regardless of the current phasor angle, it can be broken down into a D-axis component and a Q-axis component. In general, for the motors and generators described herein, the D-axis component acts to "charge" or modulate the field within a rotor pole while the Q-axis component acts to impart a force or torque onto the rotor pole. The D-axis may also be used for parallel transmission of control signals directly from the stator windings to the rotor windings, as described throughout this disclosure in detail. Throughout this disclosure, the terms "current angle" and "current phasor angle" are used. It should be noted that the sum of resultant signals produced by the stator result in a signal along the "current phasor angle" while individual signals, for example, a signal solely along the D-axis, can be described as being injected at a "current angle." As a particular example, a "minor" d/q axis system could be a sine wave with additional periods so that the peaks of the D-minor axis fall on either side of the D-major axis. The correlation of the two waveforms may be zero, so the D-minor axis is mapped onto the null axis of the major D/Q system, or can be considered a subspace of the null axis. An embodiment of this type of field distribution may be seen in FIG. 8A-D, described in further detail below. However, the D-minor axis need not be a common sine wave. For example, the D-minor axis could be a "wavelet" with a positive/negative peak on either side of the D-major field, with a wide zero response section. FIGS. 13-15, described in further detail below, are illustrations of coil placements and connections that may produce this pattern.

Figure 3A:
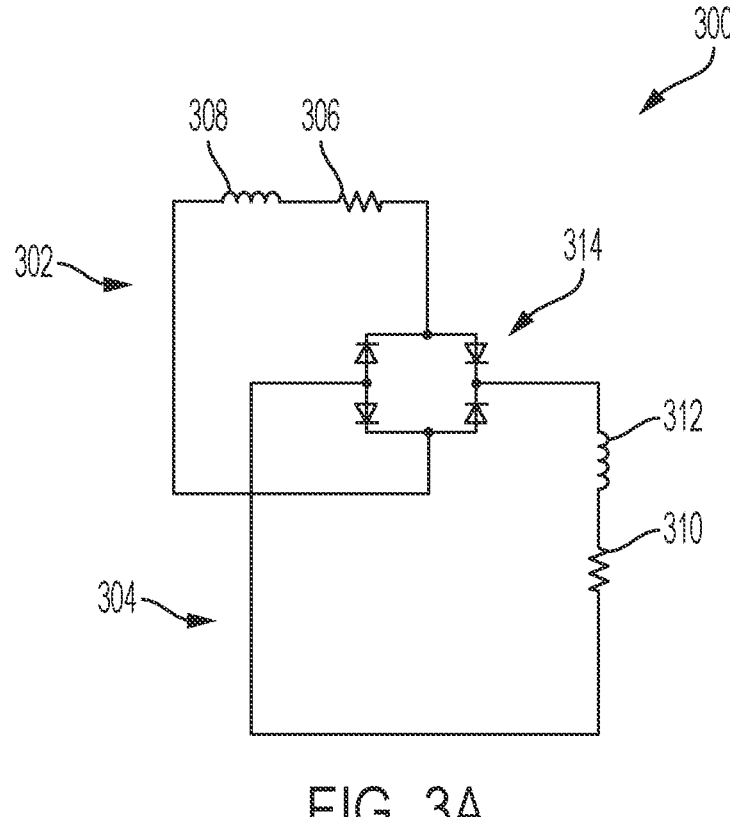
FIG. 3A is a circuit diagram of an example AC rotor coil and DC rotor coil arrangement.

The windings associated with each rotor pole include an AC coil and a DC coil associated with a tooth of a ferromagnetic material. FIG. 3A is a circuit 300 of such an example AC rotor coil 302 and DC rotor coil 304 arrangement. The AC rotor coil 302 is configured to carry an AC current/voltage induced by an AC current produced by the stator. The illustrated AC rotor coil 302 includes the inherent resistance 306 and inherent inductance 308 associated with the AC rotor coil 302. The DC coil 304, during operation, defines a rotor field winding energizable by magnetic fields produced by the stator windings (i.e., via the wireless power transfer discussed throughout). The energized rotor field winding produces a magnetic field that interacts with the magnetic fields produced by the stator windings to produce relative forces between the rotor and the stator. The illustrated DC coil 304 includes the inherent resistance 310 and inherent inductance 312 associated with any coil of wire.

The DC coil 304 is at least partially influenced by the AC coil 302. That is, the current and voltage within the AC coil 302 is allowed to "float," or act as an independent variable, while the current and voltage within the DC coil 304 is dependent upon the state of the AC coil 302. For example, in the illustrated implementation, the AC rotor coil 302 provides power to the DC rotor coil 304 by a passive rectifier 314. In other words, the DC coil 304 is a rectified coil, and the AC coil 302 is an unrectified coil. That is, to energize the windings (which includes both the AC coil 302 and the DC coil 304), the stator magnetic field induces a current within the AC coil 302, which is then rectified and passes along as DC current to the DC coil 304. This DC current through the DC coil 304 generates a magnetomotive force between the DC coil 304 and the stator to move the rotor relative to the stator.

In some implementations, during operation, a voltage within the AC coil 302 is greater than (e.g., 5 times more than, 10 times more than, or 100 times more than) a voltage within the DC coil 304. In some implementations, the current within the DC coil 304 is greater than (e.g., 5 times more than, 10 times more than, or 100 times more than) a current within the AC coil 302. This is in part because the DC coil 304 is the dominant coil regarding the magnetomotive force that causes movement in the rotor; such magnetomotive force is generally accomplished with large currents within a rotor coil.

As illustrated, the circuit includes a passive rectifier 314, more specifically, a bridge rectifier that includes four diodes. Although illustrated as using a bridge rectifier, other rectifiers, including half-bridge or active rectifiers, can be used without departing from this disclosure.

Figure 3C:
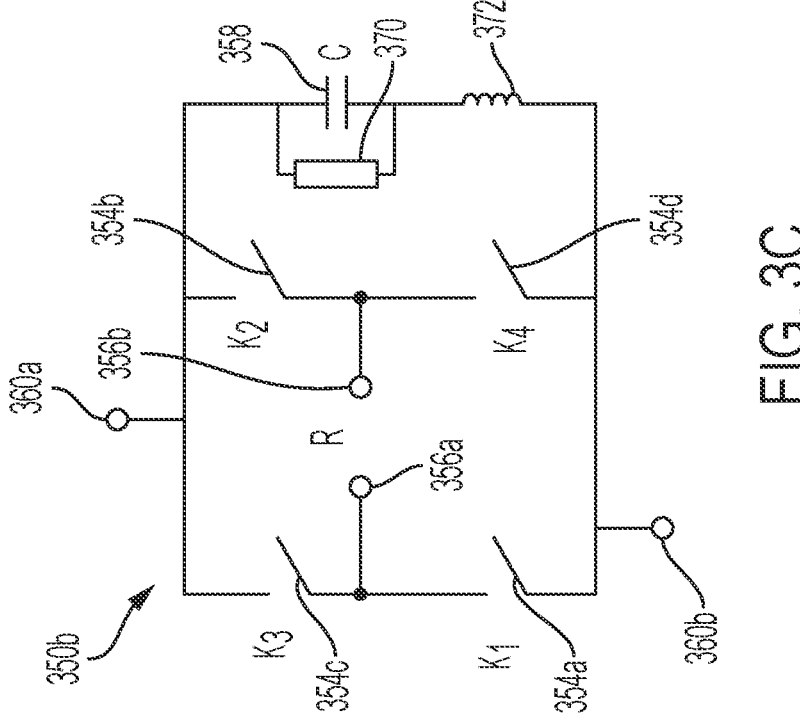
FIGS. 3B-3C are circuit diagrams of example active rectifier circuits that can be used with aspects of this disclosure.
Figure 3B:
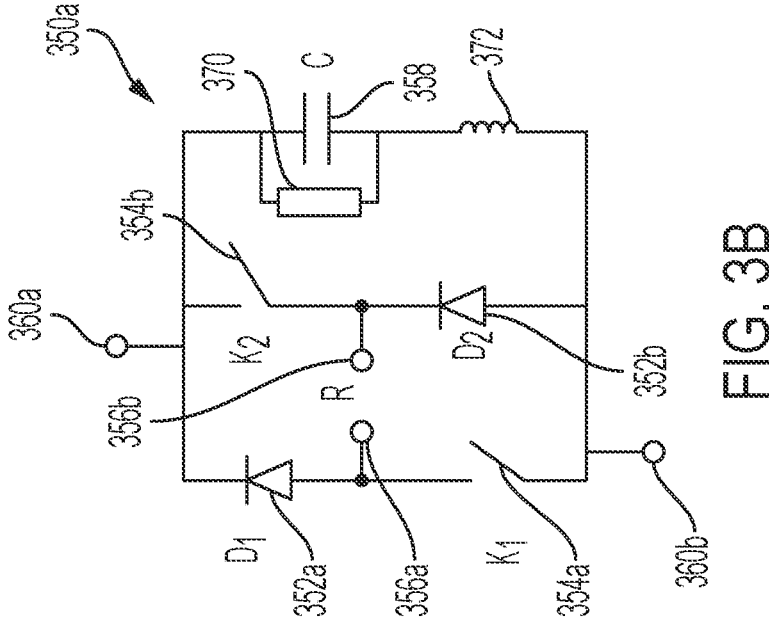

FIGS. 3B-3C are circuit diagrams of example active rectifier circuits 350a and 350b that can be used in lieu of the passive rectifier 314 previously described. The active rectifier circuit 350a of FIG. 3B is also referred to as an asymmetric bridge circuit 350a and includes two diodes 352a, 352b and two switches 354a, 354b. Diode 352a and switch 354a are each coupled to a first node 356a of the DC coil 304 (FIG. 3A), and diode 352b and switch 354b are each coupled to a second node 356b of the DC coil 304. Nodes 356a-b, each between a respective diode/switch pair, correspond to two ends of the DC coil 304. Diode 352a and switch 354b are each coupled to a first node 360a of the AC coil, and diode 352b and switch 354a are each coupled to a second node 360b of the AC coil. That is, nodes 360a-b, each between a separate respective diode-switch pair, are each coupled to two ends of the AC coil 302 (FIG. 3A). In some implementations, a capacitor 358 is wired in parallel with the diode/switch/rotor winding assembly. In some implementations, the capacitor 358 can be sized for a desired resonance frequency. Such a capacitor can be similarly included in a passively rectified system, such as bridge rectifier 314.

Several types of diodes can be used in the circuits of FIGS. 3A-3B, for example, a p-n junction diode, a gas diode, a Zener, or a Schottky diode. In some implementations, when a Schottky diode is used, the Schottky diode can be a silicon carbide diode. Diode selection is a function of a variety of factors, including voltage drop, reverse voltage breakdown, and recovery time. Different diodes may be used depending on the desired operating conditions. While several types of diodes have been listed, other diodes may be used without departing from this disclosure.

In some implementations, each switch 354*a*, 354*b* includes one or more transistors. Several types of transistors can be used, for example, bipolar junction transistors, FETs (e.g., MOSFETs), heterojunction bipolar transistors, and insulated-gate bipolar junction transistor. In some implementations, the switches 354*a*, 354*b* can include relays. Because rotor winding currents pass through the switches 354*a*, 354*b*, transistors included in the switches 354*a*, 354*b* may be rated for high currents, e.g., multiple amps.

FIG. 3C shows an example full-bridge active rectifier circuit 350*b*. The full-bridge active rectifier circuit 350*b* operates similarly to the asymmetric bridge circuit 350*a*, except that diodes 352*a*, 352*b* are replaced by switches 354*c*, 354*d*. This replacement may, in some implementations, reduce conduction loss in the full-bridge circuit 350*b* compared to in the asymmetric bridge circuit 350*a*, at least because each switch may have a lower effective on-resistance than the corresponding diode. Besides switches 354*c*, 354*d*, the full-bridge circuit also includes switches 354*a*, 354*b* and capacitor 358, as described in reference to FIG. 3B.

Each active rectifier circuit on the rotor (e.g., each circuit 350*a* and/or 350*b*) may be driven by corresponding control circuitry. That is, corresponding control circuitry drives switching elements of the active rectifier (e.g., with respective PWM signals) to actively rectify input AC current to generate and output DC current. For example, the control circuitry may include a rotor microprocessor or gate drive unit coupled to each switching element (e.g., 354*a*, 354*b*, 354*c*, and/or 354*d*) of the active rectifier. The control circuitry may drive the switching elements based on data signals received wirelessly from the stator or based on a "self-synchronizing" control scheme, as described herein. For example, data signals received or detected control information from the self-synchronization may indicate to the control circuitry to enable/disable, set a threshold for, and/or set a switching rate for the active rectifiers. The particular control signals (e.g., PWM signals) that the control circuitry provides to the switching elements to rectify AC current to DC current may be generated according to known techniques for active rectification using a full-bridge circuit or asymmetric-bridge circuit.

In some implementations of the active rectifier circuits 350*a* and/or 350*b*, a voltage regulator 370 configured to regulate a voltage across the resonance capacitor 358 can be included in any of the rectification circuits described herein. The voltage regulator 370 may be a circuit that monitors a voltage feedback signal, compares the signal to a commanded or reference voltage value, and controls the circuit to control (generally, reduce or minimize) the error between the feedback signal and reference voltage value. Alternatively or in addition, some implementations can include a secondary inductor 372, magnetically isolated from the rotor DC coils, on a DC side of the rectifier. However, some embodiments, one or both of the voltage regulator 370 and the secondary inductor 372 are not included in the active rectifier circuits 350*a* and/or 350*b*.

Regardless of the particular rectifier circuit used and the particular electric machine embodiment described herein that is incorporating the rectifier circuit, the rectifier circuit (including any accompanying voltage regulator, secondary inductor, and/or control circuitry) may be rotationally fixed to the rotor of the particular motor. In other words, each of the electric machine embodiments described herein may include a rectifier circuit, linking one or more AC coils of a rotor winding with a DC coil of that rotor winding, that rotates along with the rotor and the rotor shaft, and relative to the stator. For example, the rectifier circuit may be included on a printed circuit board (PCB) (e.g., defined by a combination of surface or through-mount circuit elements on the PCB that are interconnected by traces embedded in the PCB, or other PCB design techniques) that is secured to the rotor or rotor shaft. For example, in some embodiments, the PCB may be mounted on an axial side of the rotor (see, e.g., PCB 550 in FIGS. 5A-B and similar PCBs (unlabeled) in FIGS. 6A, 7A, 10A, and 11A). In other embodiments, the PCB incorporating the rectifier circuit is secured to or contained within the rotor shaft or another portion of the rotor. Although a PCB, such as PCB 550, may not be shown in one or more of illustrated embodiments in the figures, such a PCB may be present and secured to the rotor for rotation therewith in a similar manner as the PCB 550.

Various control schemes may be used for control of active or passive rectifier circuits. Some control schemes are "self-synchronizing" in that they do not require the transmission of special control signals from the stator to the rotor; rather, rotor-side circuits control the active rectifier circuits based on currents induced in the rotor windings by the same D-axis and/or Q-axis currents that energize the rotor windings and drive movement of the rotor. Other control schemes are "signal-driven" in that they include encoded signals (i.e., data signals) that are embedded into stator winding-to-rotor winding D-axis currents and/or Q-axis currents to pass motor status data from the stator to the rotor. Some control schemes include both self-synchronizing and signal-driven features.

Because stator-side currents may correspond to stator-side voltages, a scheme including signals embedded in currents may correspond to an equivalent scheme including signals embedded in voltages. Implementations described in this disclosure in reference to signals in stator-side voltages may be equivalent to, and may also describe, signals in stator-side currents, and vice-versa.

These schemes do not require additional stator-to-rotor coupling elements; rather, signals are transmitted using the stator windings and rotor windings that are already used for rotor winding energization and movement. This technique can help reduce costs and increase performance and flexibility compared to schemes that incorporate special detectors, sensors, or wired couplings.

Examples of such control schemes are described within U.S. Provisional Patent Application No. 63/157,560, filed on Mar. 5, 2021, the entirety of which is hereby incorporated by reference.

FIGS. 4A-4C are planar cross-sectional views of example electric machines 400*a*, 400*b*, and 400*c* with a stator 402 and rotor(s) 404 (404*a*, 404*b*, 404*c*). Previously, the D-axis 406 has been defined as being aligned with a pole 408 of a rotor. A "motor pole" may be described as a topological section on either a stator or rotor that emits a single polarity of magnetic flux across the air gap at a given point in time. Flux carried in the back-iron of the stator or rotor is considered when determining the pole number or location in an electric motor. Poles are typically characterized by high-field regions, which may exceed 5,000 Gauss. Poles may result from permanent magnets or from electromagnetic fields. While the number of poles on a stator or rotor are often fixed during manufacturing, in some implementations described herein, the number of poles for the rotor, stator, or both, can be changed during operation.

The stator 402 includes windings 410. The windings 410 can include salient, concentrated stator windings, distributed windings, and/or non-overlapping stator windings without departing from this disclosure. While illustrated as a cross-section with a single pole, the rotor(s) 404 (404*a*, 404*b*, 404*c*) each define multiple rotor poles 408 each with associated rotor coils 412 (412*a*, 412*b*, 412*c*). In some implementations, a stack length of the rotor 404 is substantially (e.g., + or −5%-10%) similar to the stack length of the stator 402.

As previously described, the rotor pole 408 has a D-axis at the rotor pole's magnetic center. In addition to the rotor pole 408 having a D-axis 406, both the AC coil 414 and DC coil 416 have a respective AC coil D-axis and DC coil D-axis. Similar to the pole D-axis, the AC coil D-axis and the DC coil D-axis are aligned with the center point of the resultant magnetic center of the respective coils. In FIGS. 4A-4C, the rotor pole D-axis, the AC coil D-axis, and the DC coil D-axis are all aligned with one another (i.e., the illustrated D-axis 406 represents the D-axis for each of the rotor pole, the AC coil, and the DC coil). In FIG. 4A, the DC coil 416*a* surrounds the AC coil 414*a*. In FIG. 4B, the AC coil 414*b* surrounds the DC coil 416*b*. In FIG. 4C, the AC coil 414*c* is radially stacked upon DC coil 416*c*. Similarly, the position of the AC coil 414*c* and the DC coil 416*c* could be switched without departing from this disclosure.

The rotor poles 408 are topologically and electrically fixed upon a rotor surface. A fixed-pole rotor is a rotor in which the poles are topographically and electromagnetically fixed or held static relative to a synchronous reference frame of the motor, for example, rotor 404 is a fixed-pole rotor. That is, the rotor 404 will always rotate at substantially the same speed as, or in sync with, the drive frequency provided by the stator (allowing for inherent levels of torque ripple). Accordingly, in motors that include a fixed-pole rotor, such as those described herein, the synchronous reference frame is the same as the magnetic reference frame. Fixed-pole motors are often referred to as "synchronous" motors for this reason. Field wound rotors, surface PM rotors, reluctance motors, and interior PM rotors are all examples of fixed pole rotors. Fixed pole rotor designs maximize the utilization of ferromagnetic material in the rotor D-axis 406 region (center of a rotor pole), and in the case of wound field rotors, ensuring that the effective magnetic center aligns with the D-axis 406. As a result, fixed pole rotors are considered to be more efficient than shifting pole rotors for a given size and power rating; however, fixed pole rotors are difficult to control in that maintaining a fixed pole rotor at a constant current phasor angle under dynamic load conditions and dynamic running speeds is challenging. For example, accelerating the motor or maintaining speed during a change in load involves actively adjusting the current phasor angle 417, the current magnitude, and/or drive frequency based on input from a position sensor. The concepts described herein are primarily applicable to synchronous machines as the stator magnetic field and the rotor, for example, the rotor 404, maintain synchronicity with one another during operation.

In contrast, the poles of shifting pole rotors are not topographically or electromagnetically fixed and will move under operation relative to the stationary reference frame. That is, the rotor will always "slip" and lag behind, or be out of synch with, the drive frequency provided by the stator. As such, these motors are often referred to as "asynchronous"

motors. Examples of shifting pole rotors include wire wound and squirrel cage induction rotors, armature wire wound rotors, brush motors, and other similar motors. While shifting pole rotors are able to self-regulate the current phasor angle 417 during operation, design concessions between D-axis ferromagnetic material and Q-axis field windings must be made to enable the pole to move evenly across the rotor surface. As a result, electrical resistance in such motors is higher, more starting current is required, and field strength is lower in shifting pole rotors of a given size and power rating.

The field of the rotor 404 is configured to be energized, ultimately, by a magnetic field produced by the stator windings 410 because the magnetic field inductively transfers power to the rotor field, which is captured and then used as a source for the energization. The rotor 404 and the stator windings 410 are configured to move relative to one another responsive to the energized rotor field. The rotor 404 is substantially energetically isolated from components of the stator 402 except for the stator windings 410. Additionally, the rotor 404 and stator windings 410 may communicate signals (e.g., data signals) unidirectionally (e.g., from stator to rotor, or from rotor to stator) or bidirectionally (from stator to rotor and also from rotor to stator). Further, the rotor 404 may be configured to harvest system energy, e.g., due to slotting effects. The stator-rotor power transfer, stator-rotor communication, and system energy harvesting are each described in further detail herein.

Within electric machines, a stator and a rotor can be coupled to enable power transfer, signal transfer, and/or field modulation during operation. Couplings may be classified as direct coupling or indirect coupling. Direct coupling occurs between the stator and rotor along the primary operating air gap, such as the air gap 418. Indirect coupling occurs along a secondary interface away from the primary operating air gap 418.

Direct couplings are typically characterized as inductively coupled, for example, a squirrel cage induction rotor is considered to be directly coupled to the stator. While direct coupling is common and easily controlled in an asynchronous machine, direct coupling with synchronous machines, for reasons described throughout this disclosure, are difficult to control. For example, a rotor position often needs to be known to ensure that a current magnitude and/or frequency is properly maintained.

Indirect couplings operate along a secondary coupling and may be radial oriented or axially oriented, and may communicate via electrical contacts, inductive couplings along a separate air gap, capacitively coupling, or optically coupling. While a secondary coupling may be used for a variety of functions to improve the efficiency and/or overall controllability of an electric machine, additional components are often required that can increase the weight, complexity, failure frequency, and costs (both operating and capital costs) of machines that take advantage of such systems.

Couplings may further be classified as either power couplings or signal couplings. Power couplings transmit power from the stator to the rotor to be used to directly drive magnetomotive force along the primary operating air gap, thereby generating torque. Signal couplings transmit signals between the stator and rotor that may be used to separately adjust an electric circuit within the rotor or monitor a rotor condition, such as temperature or position relative to the stationary reference frame. Signal couplings transmit at a very low power level relative to the power rating of a motor, for example, less than 5% of the power rating of the motor.

Energetically isolated motors and generators, such as those described throughout this disclosure, primarily (within standard electromagnetic shielding tolerances) use direct coupling to transmit power and signals between the stator and the rotor without the use of an indirect or secondary coupling. The electric machines described herein include direct coupling between the rotor 404 and the stator 402 for both power coupling and signal coupling. Direct signal coupling can be used, for example, to control a state of an active rectifier. Direct power coupling can be used, for example, to provide power to the AC coil(s) of the rotor to be rectified and provided as DC current to the DC coil(s) (e.g., which may be controlled by the direct signal coupling).

Alternatively or in addition, direct coupling can be used to transfer power, for example, to the AC coils 414. Similarly, direct coupling can be used to create torque, control flux of machine, and or control a rotational speed or the rotor. Signals used in direct coupling application can include the entire signal to the rotor 404, a vector summed component (e.g., D- or Q-axis), or a component of a given control channel (e.g., torque, power transfer, data) that can be superimposed on a given vector. In some implementations, direct coupling can be used to receive feedback from the rotor, for example, to determine a position of the rotor.

In some implementations, the rotor 404 includes permanent magnetic material embedded within the rotor 404. In such implementations, the rotor 404 can include channels of permanent magnetic material arranged in, for example, a substantial spoke-like arrangement in between each rotor pole; however, other arrangements of the permanent magnetic material can be used without departing from this disclosure. The permanent magnetic material can include a variety of material, including ferrite, SmFeN, N35, or N45. While lower power permanent magnetic material is typically used (if any is used at all), higher powered magnetic material in lower quantities can be used without departing from this disclosure. In implementations where permanent magnetic material is used, the permanent magnetic material can extend across the entire longitudinal length of each rotor pole 408 or partially across each rotor pole 408. In some implementations, the permanent magnetic material can be made-up of multiple layers, laminations, or segments.

In some implementations, permanent magnetic material can result in a net magnetic force that is substantially between each rotor pole 408. In some implementations the permanent magnetic material can be arranged such that the net magnetic force from the permanent magnetic material is aligned with the rotor poles 408. In general, the arrangement of the permanent magnetic material is dependent upon the desired cross-sectional flux density of the magnetic materials within the rotor. In implementations where the permanent magnetic material is located within a rotor winding, the flux for each set of permanent magnetic material can be individually adjusted and/or modulated by adjusting the charge of the surrounding rotor winding. Such implementations also protect the magnets from demagnetization that can be caused by a strong stator field. In implementations where the permanent magnetic material is not surrounded by a rotor winding, an adjustment in flux caused by the stator field can affect multiple sets of permanent magnetic material within the rotor 404. While occasionally described as including permanent magnetic material, the subject matter of this disclosure is still applicable to rotors that do not include permanent magnetic materials.

In some implementations in which permanent magnetic material is used within a rotor pole, the associated winding and polarity can be arranged to provide constructive rectification, magnetic writing (flux charging), and/or deconstructive rectification. With respect to constructive rectification, the winding may be energized to increment or increase the magnetic field of the permanent magnetic material (e.g., constructive to the polarity or MMF of the material). Such constructive rectification can provide magnetic shielding against unwanted fields and harmonics, and/or can be used to augment a magnetic field of the rotor, where the remnant magnetic field (B) of the rotor pole is increased from a residual value during operation. In other words, the constructive rectification via the winding provides amplification of the magnetic field of the permanent magnetic material. With respect to magnetic writing, the constructive rectification via the winding magnetizes the permanent magnetic material to a remnant field, also referred to as fluxing the material. With respect to deconstructive rectification, the winding may be energized to decrement or decrease the magnetic field of the permanent magnetic material (e.g., field weaken). Where the rectifier associated with the rotor winding is an active rectifier (e.g., including controllable switching elements such as shown in FIGS. 3B-C), the rectifier allows for bi-directional rectification and the controller (e.g., controller 104 or 1700) controlling the rectifier may selectively control the rectifier to provide constructive or deconstructive rectification, as desired, through control of the switching elements.

Figure 5A:
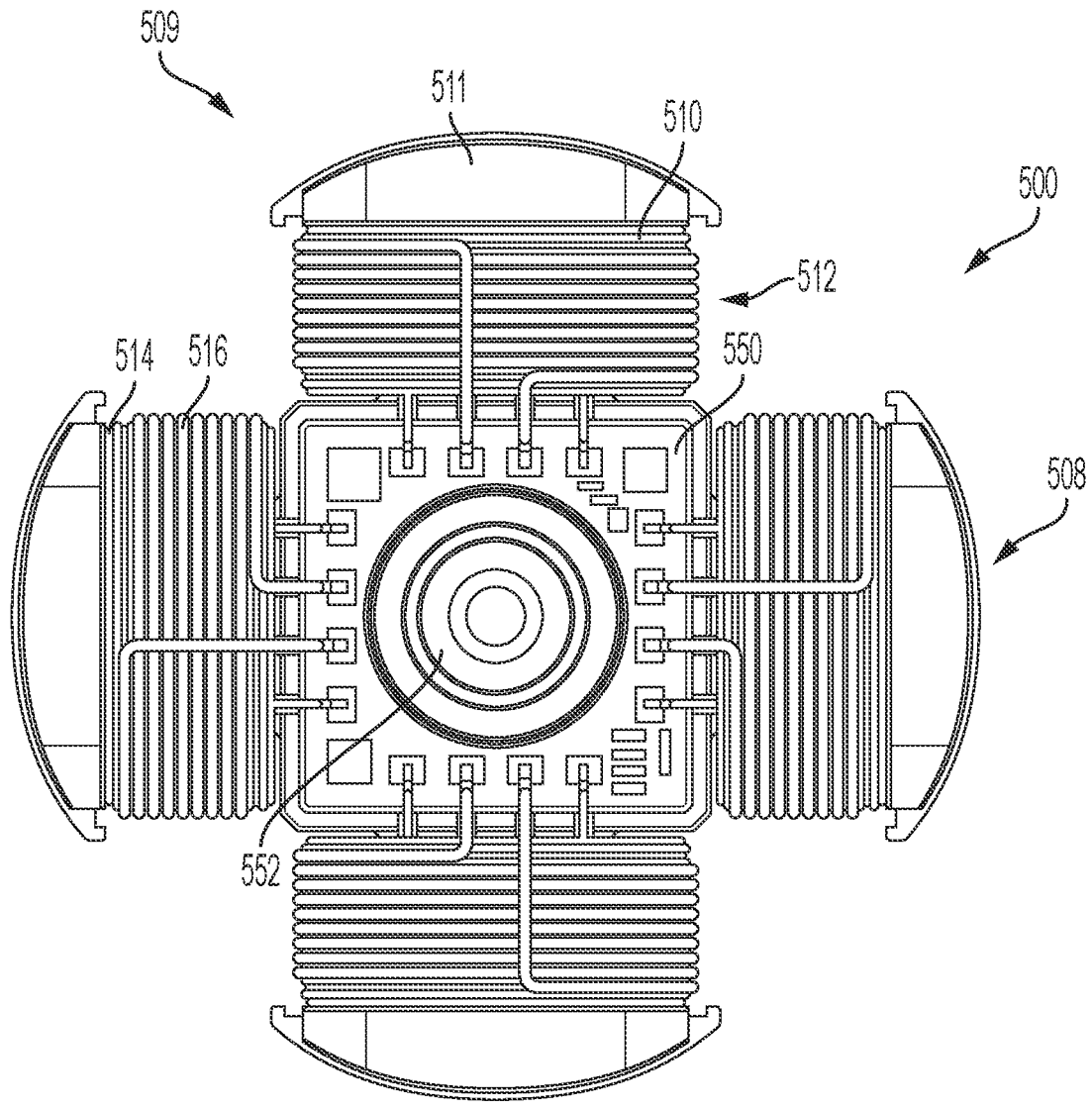
FIG. 5A is a planar view of an example rotor.
Figure 5B:
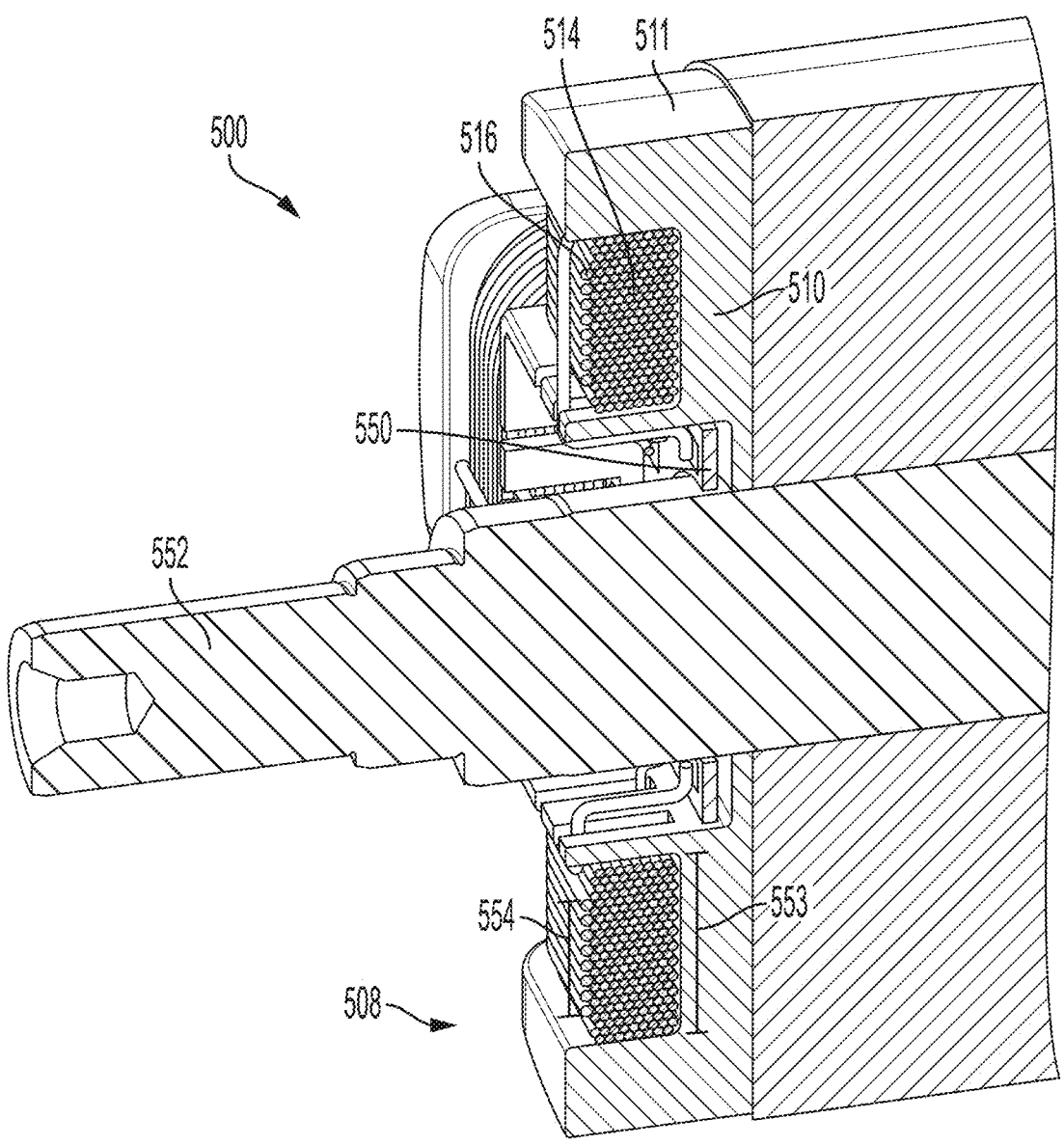
FIG. 5B is a side cross-sectional perspective view of the example rotor of FIG. 5A.

FIG. 5A is a planar view of an example rotor 500. FIG. 5B is a side cross-sectional perspective view of the example rotor 500. The rotor 500 is substantially similar to the rotor(s) 404 (404a, 404b, and 404c) with the exception of any differences described herein. The rotor 500 has four poles 508. Each pole 508 is associated with a central tooth 509 of ferromagnetic material that includes a winding portion 510 and a cap 511, and has an AC winding or coil 516 and a DC winding or coil 514 encircling the tooth 509. More particularly, the DC coil 514 and the AC coil are both wrapped around a winding portion 510 of each tooth 509 and extend through a channel 512 defined by the winding portion 510 and the cap 511 (also referred to as an end flange). At one or both ends of the rotor is a printed circuit board (PCB) 550. The windings are conductively connected to the PCB 550, for example, by soldering, by clamps, or by plugs. The PCB 550 can include discrete and/or integrated circuit components, such as the rectifiers described throughout this disclosure. A shaft 552 extends through the rotor to support the rotor to rotate within a stator or housing. In this implementation, the AC coils 516 are radially parallel to and surround the DC coils 514. The DC coils 514 have a longer radial length 553 than a radial length 554 of the AC coils 516. Both the AC coils 516 and the DC coils 514 have respective D-axis that are aligned with the rotor pole D-axis. That is, all of the D-axes for the rotor pole 508, the AC coil 516, and the DC coil 514, extend radially outward and are perpendicular to the direction of motion.

Figure 6A:
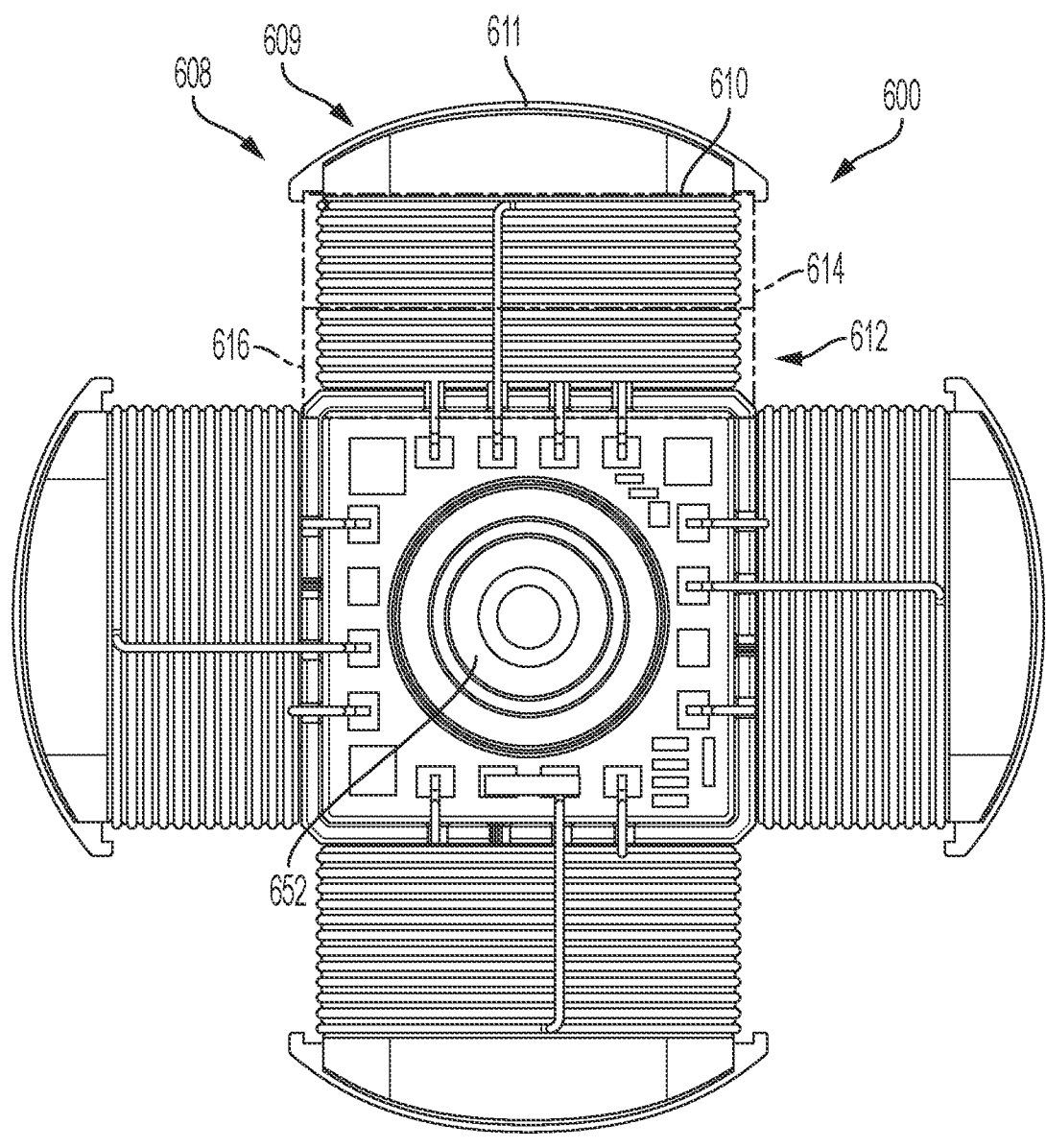
FIG. 6A is a planar view of an example rotor.
Figure 6B:
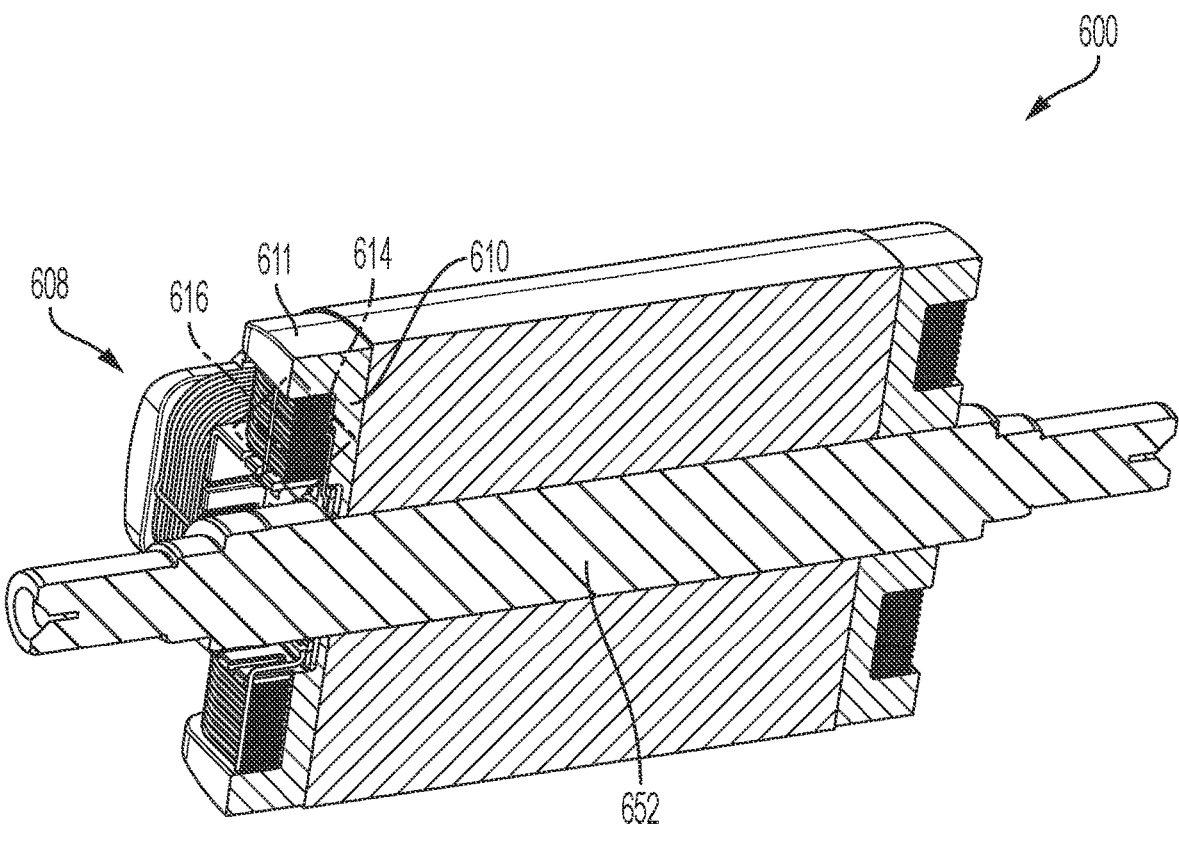
FIG. 6B is a side cross-sectional perspective view of the example rotor of FIG. 6A.

FIG. 6A is a planar view of an example rotor 600. FIG. 6B is a side cross-sectional perspective view of the example rotor 600. The rotor 600 is substantially similar to the example rotor 500 with the exception of any differences described herein. In FIGS. 6A-B, relative to FIGS. 5A-B, like numbers plus 100 are used to designate similar components (e.g., in FIG. 6A, a rotor pole is labeled "608" whereas, in FIG. 5A, the rotor pole is labeled "508"). The AC coils 616 and the DC coils 614 are radially stacked atop one another. More particularly, the DC coil 614 and the AC coil 616 are both wrapped around a winding portion 610 of each tooth 609 and extend through a channel 612 defined by the winding portion 610 and the cap 611. While illustrated as having the DC coils 614 radially farther from the shaft 652 than the AC coils 616, the two could be reversed without departing from this disclosure. While illustrated as being substantially the same size, the AC coils 616 and the DC coils 614 can be different sizes from one another (e.g., different number of turns, area of winding, or different volume of wire) without departing from this disclosure. For example, in some implementations, the AC coils area, wire diameter, and/or turn count 616 are larger than the DC coils 614. In some implementations, the DC coils area, wire diameter, and/or turn count 614 are larger than the AC coils 616.

Figure 7A:
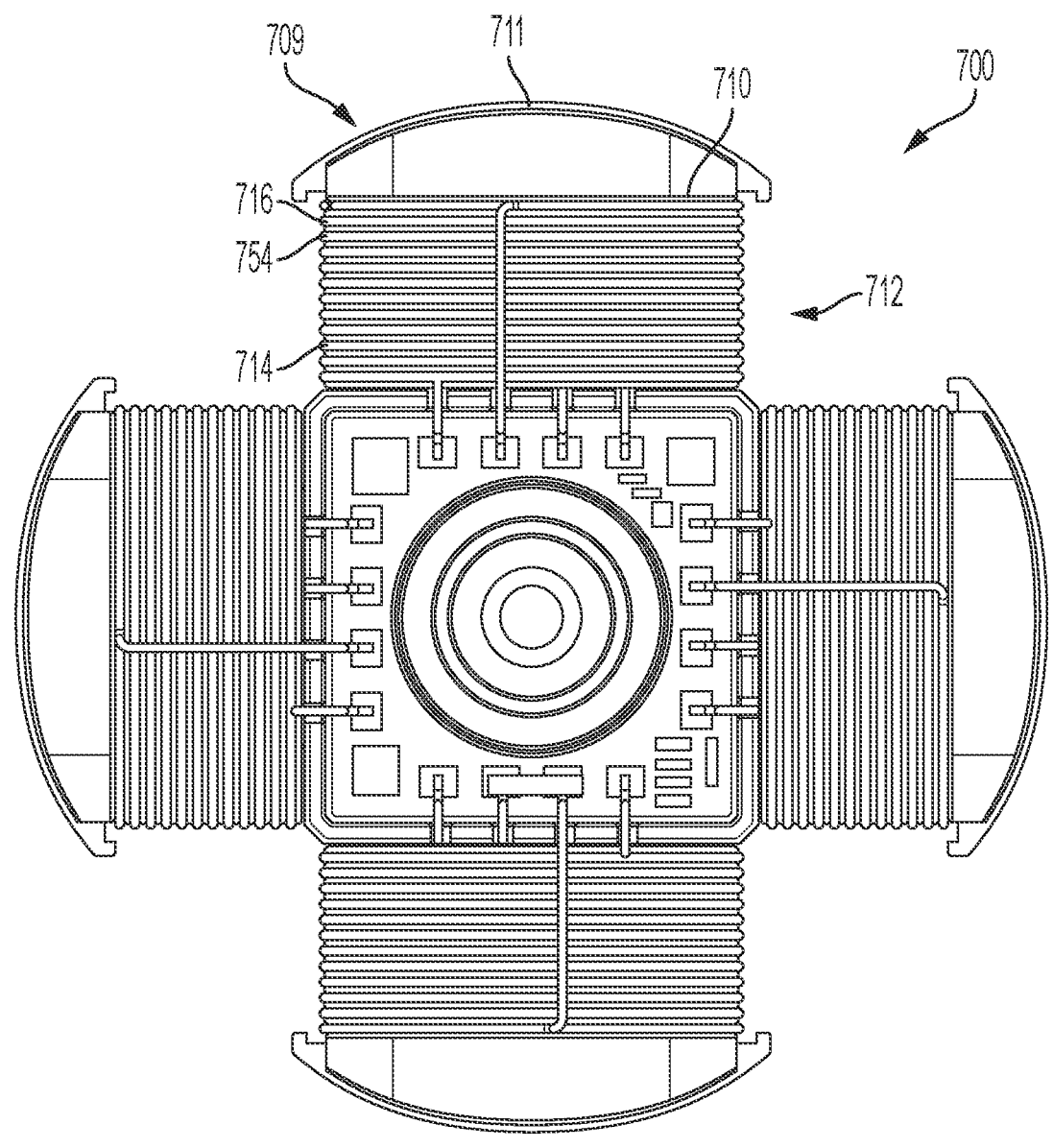
FIG. 7A is a planar view of an example rotor.
Figure 7B:
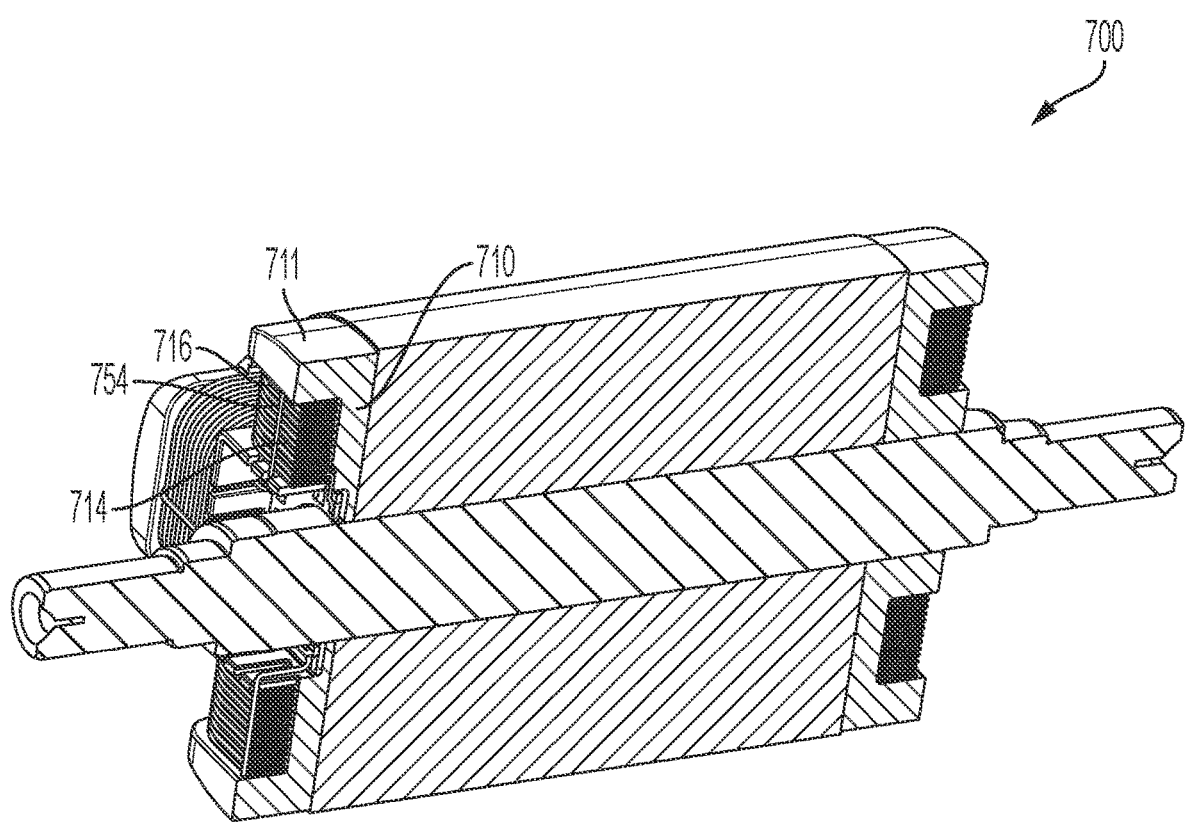
FIG. 7B is a side cross-sectional perspective view of the example rotor of FIG. 7A.

FIG. 7A is a planar view of an example rotor 700. FIG. 7B is a side cross-sectional perspective view of the example rotor 700. The rotor 700 is substantially similar to the example rotor 600 with the exception of any differences described herein. In FIGS. 7A-B, relative to FIGS. 6A-B, like numbers plus 100 are used to designate similar components. The example rotor 700 includes a spacer 754 between the AC coil 716 and the DC coil 714 of each respective tooth 709. The AC coil 716 and DC coil 714 of a respective tooth 709 are wrapped around a winding portion 710 of the tooth 709. Accordingly, the spacer 754, the AC coils 716, and the DC coil 714 each extend through a channel 712 defined by the winding portion 710 and the cap 711. The spacer is made of a non-magnetic material. In some implementations, the spacer 754 is made of a non-metallic material, such as plastic, fiberglass, or other insulate material. In other embodiments, it may be composed of a ferrite. The separation further isolates the AC coils 716 and the DC coils 714 from one another (e.g., higher frequency AC shielding). The spacer 754 can also be used for mechanical retention and/or organization of the windings during assembly and/or operation. In some implementations, the spacer 754 defines cooling channels that can carry a cooling fluid to regulate a temperature of the windings.

Figure 8A:
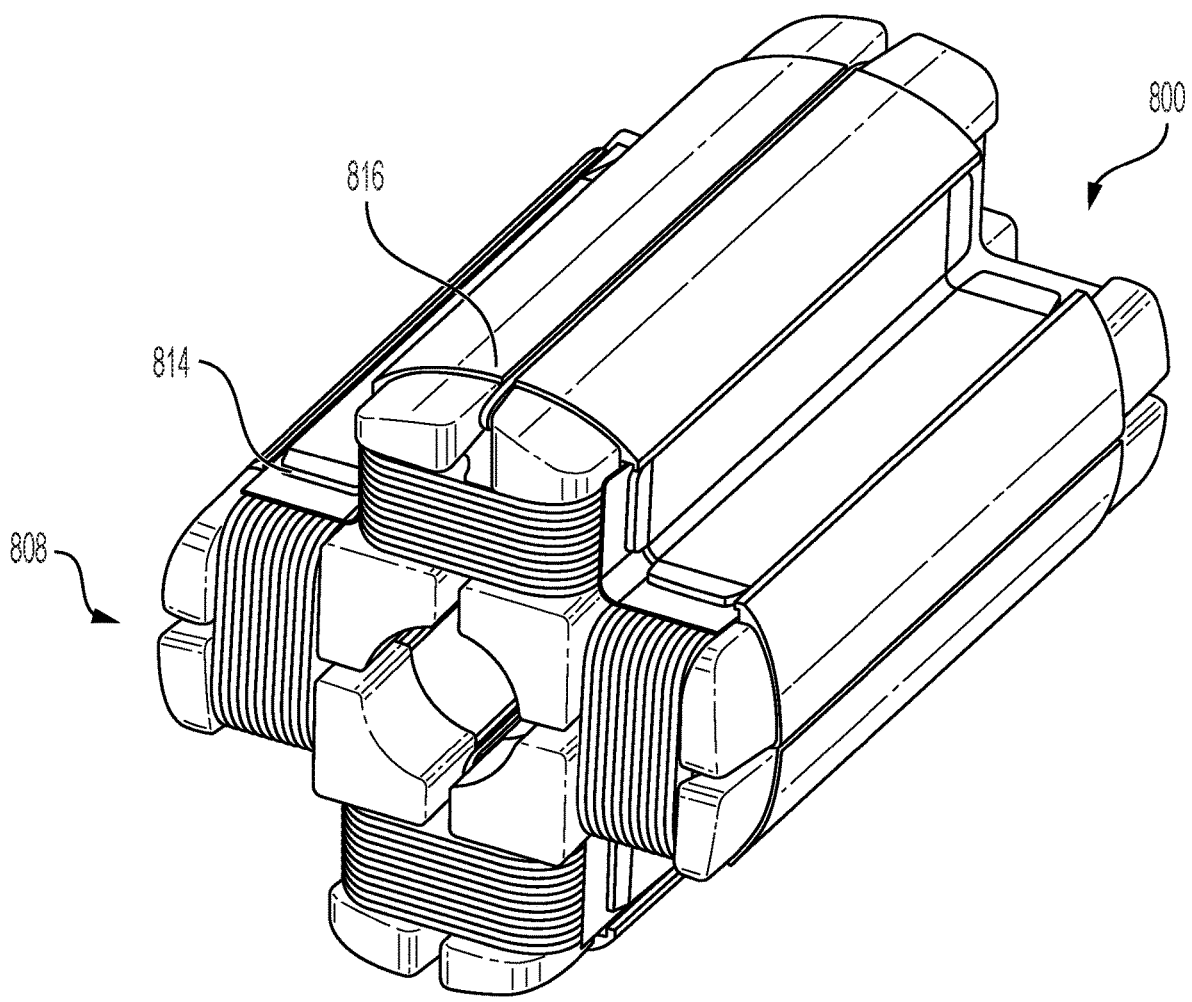
FIG. 8A is a perspective view of an example rotor.
Figures 8B, 8C:
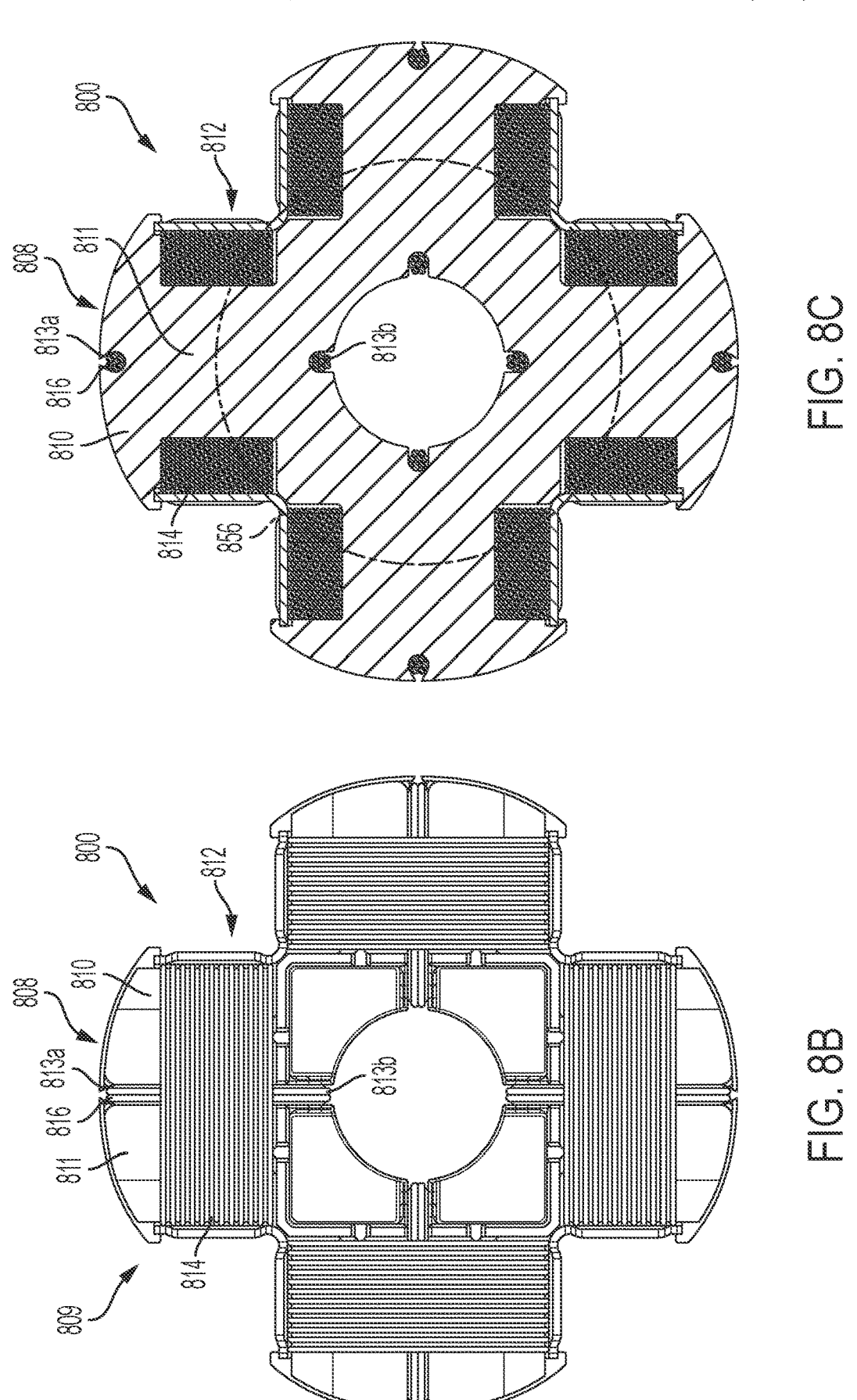
FIG. 8B is a planar view of the example rotor of FIG. 8A.
FIG. 8C is a planar cross-sectional view of the example rotor of FIG. 8A.
Figure 8D:
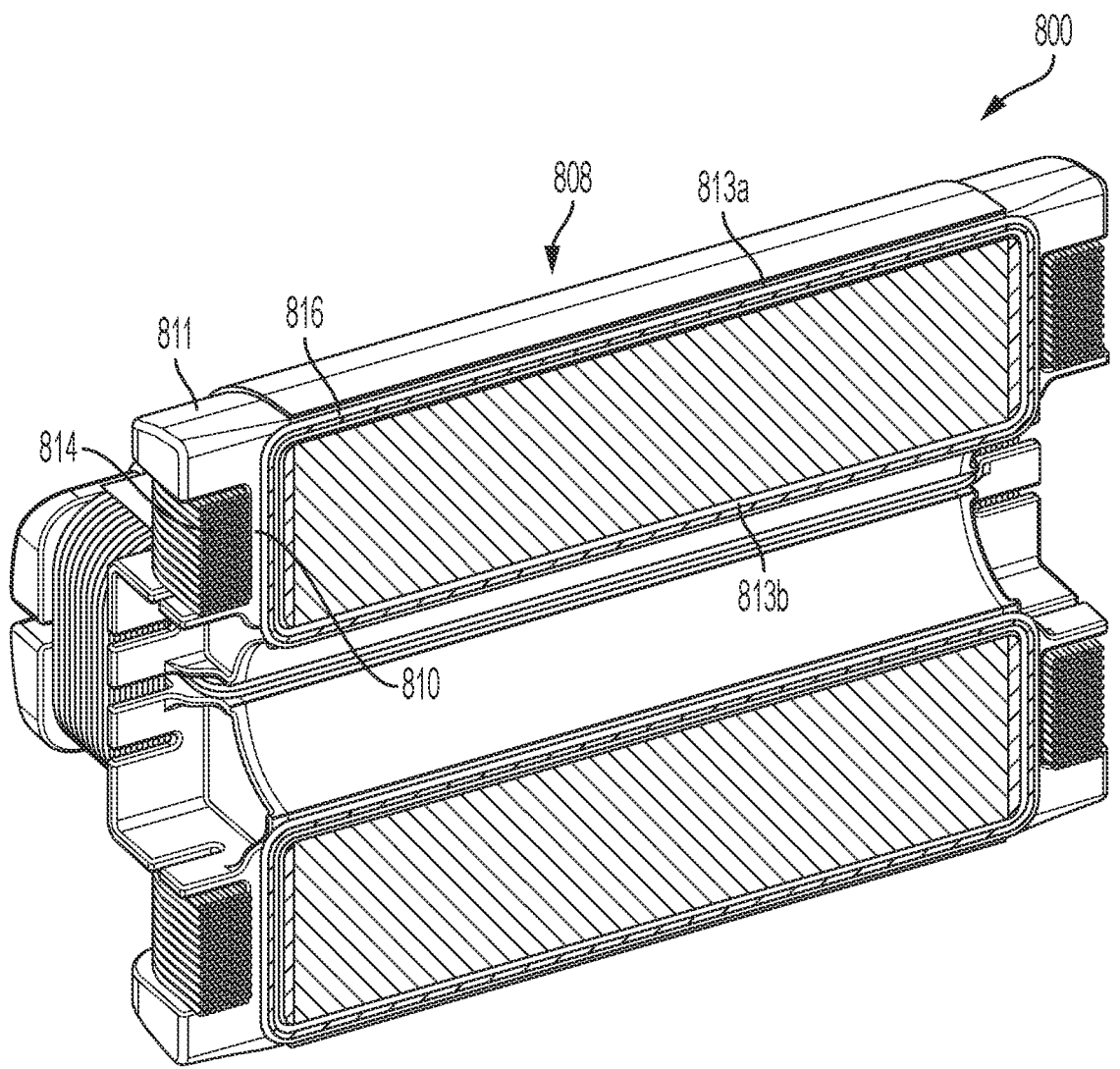
FIG. 8D is a side cross-sectional perspective view of the example rotor of FIG. 8A.

FIG. 8A is a perspective view of an example rotor 800. FIG. 8B is a planar view of the example rotor 800. FIG. 8C is a planar cross-sectional view of the example rotor 800. FIG. 8D is a side cross-sectional perspective view of the example rotor 800. The example rotor 800 is substantially similar to example rotor 500 with the exception of any differences described herein. In FIGS. 8A-D, relative to FIG. 5A-B, like numbers plus 300 are used to designate similar components.

Each tooth 809 of the rotor 800 includes a DC coil 814 wrapped around a winding portion of the particular tooth 809 and extending through a channel 812 defined by the winding portion 810 and a cap 811. Each tooth 809 further includes a first channel 813a extending along the cap 811 and a second channel 813b in a trunk 856 of the rotor, where an AC coil 816 extends through the channels 813a-b and is wound about the tooth 809 via the channels 813a-b. Accordingly, the rotor 800 includes DC coils 814 each with a respective DC coil D-axis being aligned with the associated rotor pole 808 D-axis. That is, the DC coil 814 D-axis is perpendicular to a direction of movement of the rotor 800; however, the AC coils 816 are perpendicular to their respective DC coils 814. That is, the AC coil D-axis is substantially perpendicular to its respective DC coil D-axis (within standard manufacturing tolerances). Having the AC coil D-axis offset from the DC D-axis and the rotor pole D-axis allows an AC signal to be sent to the rotor pole offset from the current phasor angle that is driving the rotor to rotate. That is, two distinct channels exist with this arrangement. As such, power, signals, and MMF signals can be exchanged with the rotor simultaneously across different channels due to the different physical angles of the coils. In some implementations, the AC coil extends up to 20% into a trunk 856 of the rotor. The "trunk" in this context is the imaginary cylinder where the teeth of the rotor poles extend from the rotor.

Maximum torque (theoretically) occurs at quadrature to that (e.g., 90° in the electrical reference frame) or on the Q-axis of the DC coil; however slotting effects, reluctance torque, and other effects often move this peak torque moment away from pure quadrature. For instance, in a wound field synchronous machine, peak torque can occur between 45-90° in the electrical reference frame. In some implementations, peak torque occurs between 60-80° in the electrical frame. The exact current phasor angle for peak torque can vary based on the loading and saturation. As both the AC coil and the DC coil have their own D-axis and Q-axis, charging and/or power transfer occurs by engaging the AC coil on its own D-axis, which may be different than the major D-axis of the machine. As discussed throughout this disclosure, operating current angles are defined by the Q-axis and D-axis vector components of a signal. Injecting a signal on the D-axis causes the current phasor angle to be less than the desired torque load (e.g., maximum torque per amp, MTPA) and takes away from torque. As such injecting a signal (e.g., a modulation or perturbation) on the Q-axis allows for power transfer under higher torque conditions than those that can be experiences with pure D-axis injection. As power injection along the Q-axis is orthogonal to the D-axis, a smoother magnetic field is created on the D-axis, resulting in a reduction in torque ripple. Additionally, this arrangement separates the power transfer flux from the D-axis flux (e.g., flux from the DC coil for torque production) and allows circuit components to be smaller (for example, have lower voltage and/or current ratings) for the AC coil. In some implementations, with power AC coils on both the D-axis and Q-axis for example, being able to modulate and transfer power on both axes allows for constant power transfer regardless of desired control.

Figures 9A, 9B:
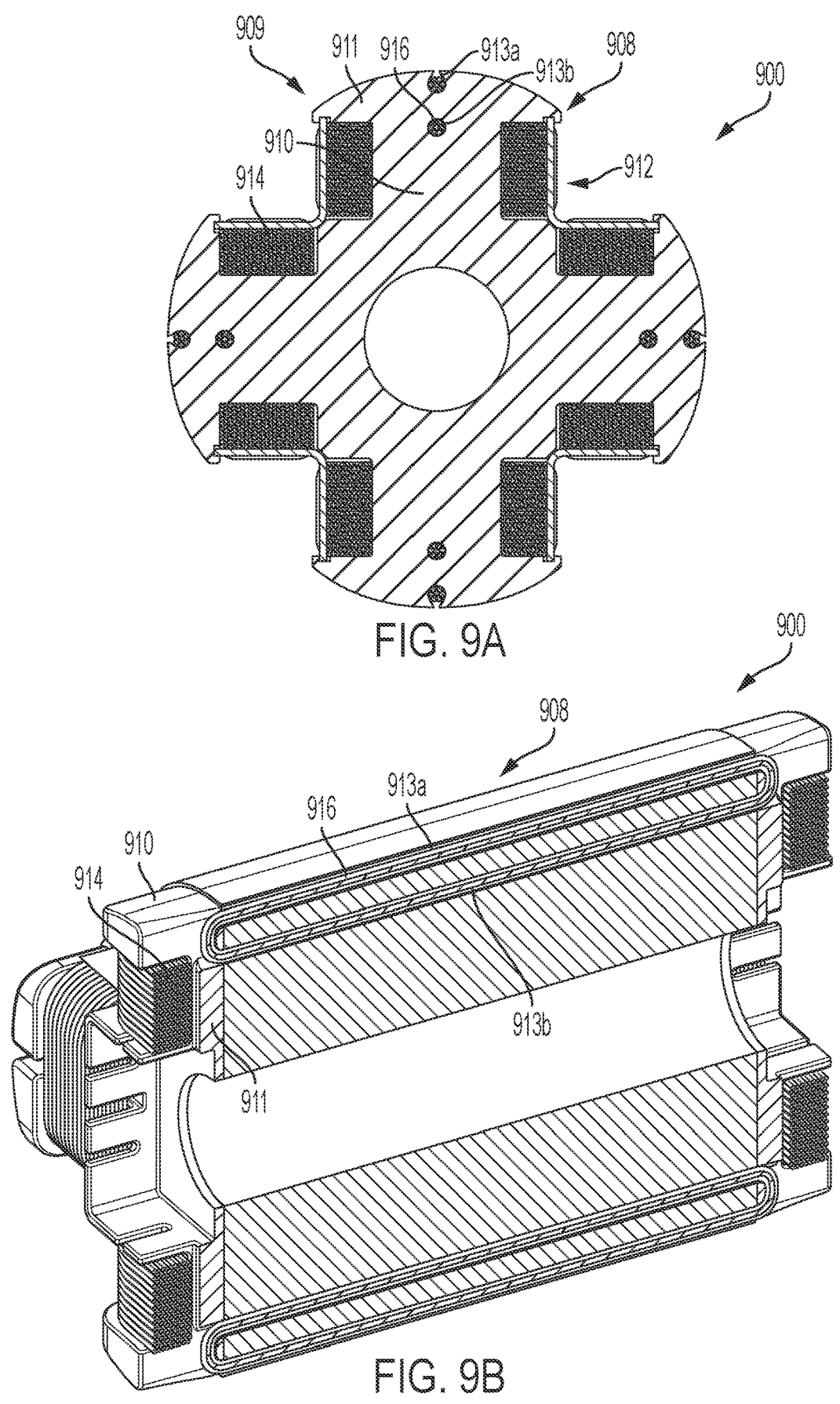
FIG. 9A is a planar cross-sectional view of an example rotor.
FIG. 9B is a side cross-sectional perspective view of the example rotor of FIG. 9A.

FIG. 9A is a planar cross-sectional view of an example rotor 900. FIG. 9B is a side cross-sectional perspective view of the example rotor 900. Rotor 900 is substantially similar to rotor 800 with the exception of any differences described herein. In FIGS. 9A-B, relative to FIG. 8A-D, like numbers plus 100 are used to designate similar components. The AC coils 916 of rotor 900 are perpendicular to the DC coils 914, however, the AC coils 916 do not extend completely through the rotor pole 908; instead, the AC coils 916 only extend through a portion of their respective DC coil flux path. That is, the second channel 913b of the rotor 900 is located further radially outward from the rotor center than the second channel 813b of the rotor 800.

This arrangement allows the AC coil to engage a Q-axis flux, but not purely at 90° within the electrical reference frame as in the rotor 800 (that is literally orthogonal to the DC winding and the D-axis). Having the entirety of the AC coil being spread across the pole face (and nearer the surface of the pole), can distribute and pin flux across the pole face itself. Alternatively or in addition, such an arrangement can help shield the pole face iron laminations from higher order harmonics that occur from slotting and other phenomena, as well as the higher frequency injections, including the power transfer signals (that is, core losses can be reduced).

Figure 10A:
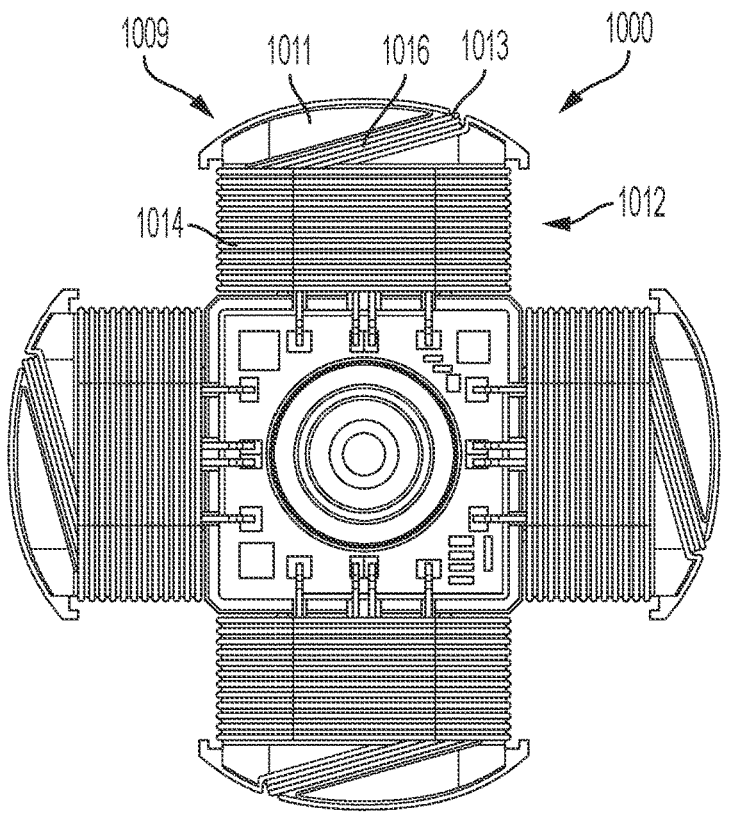
FIG. 10A is a planar view of an example rotor.
Figure 10B:
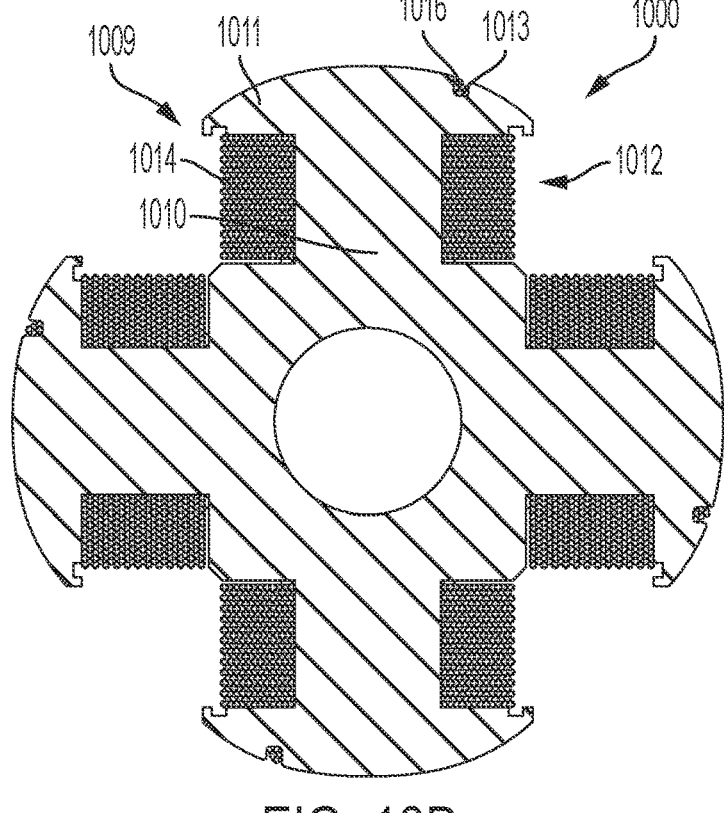
FIG. 10B is a planar cross-sectional view of the example rotor of FIG. 10A.
Figure 10C:
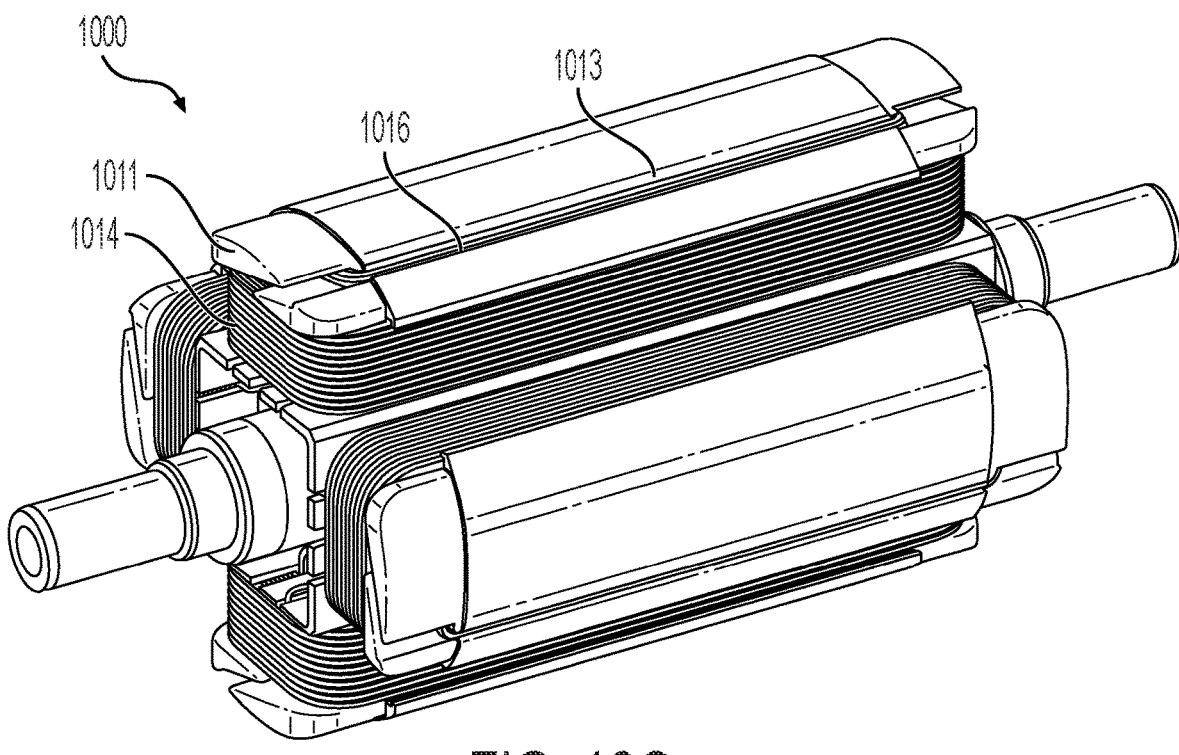
FIG. 10C is a perspective view of the example rotor of FIG. 10A.
Figure 10D:
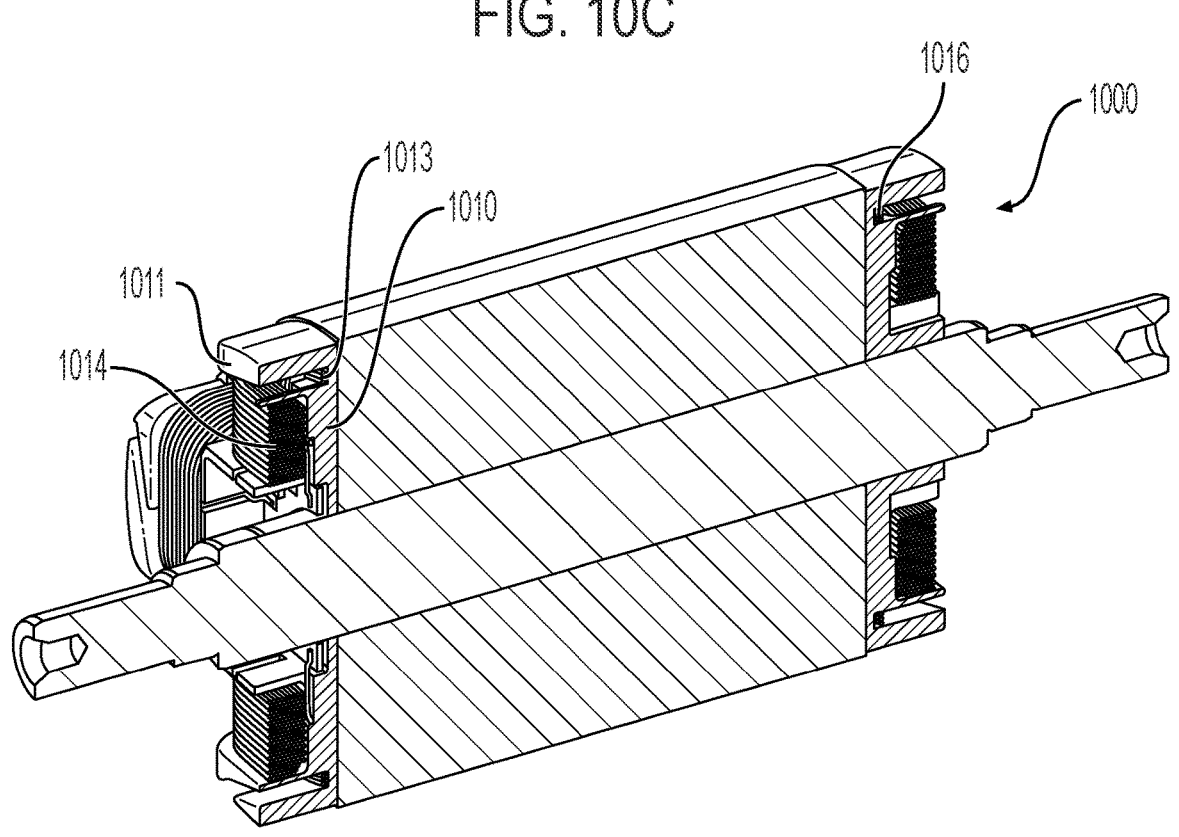
FIG. 10D is a perspective side cross-sectional view of the example rotor of FIG. 10A.

FIG. 10A is a planar view of an example rotor 1000. FIG. 10B is a planar cross-sectional view of the example rotor 1000. FIG. 10C is a perspective view of the example rotor 1000. FIG. 10D is a perspective side cross-sectional view of the example rotor 1000. Rotor 1000 is substantially similar to rotor 800 with the exception of any differences described herein. In FIGS. 10A-D, relative to FIG. 8A-D, like numbers plus 200 are used to designate similar components.

Each tooth 1009 of the rotor 1000 includes a DC coil 1014 wrapped around a winding portion 1010 of the particular tooth 1009 and extending through a channel 1012 defined by the winding portion 1010 and a cap 1011. Each tooth 1009 further includes a first channel 1013 extending along the cap 1011, where an AC coil 1016 extends through the channel 1012 and the channel 1013 and is wound about the tooth 1009 via the channels 1012 and 1013. Accordingly, the AC coils 1016 of rotor 1000 do not have an AC coil D-axis that align with either their respective rotor pole D-axis or their respective DC coil D-axis. Instead, the AC coils 1016 are angled either towards or away from a direction of motion. The angle of the AC coils 1016 relative to the DC coils 1014 is mechanically greater than 0° and less than 90°. For example, if desired to modulate or communicate more on the D-axis (or major axis), this range may be 0-60°, 0-45°, 10-20°, or 10-20°. As another example, if desired to modu-late or communicate more on the Q-axis (e.g., separation between major and minor axes), this range may be 30-90°, 45-90°, 70-90°, or 80-90°. Further, in some examples, the AC coil and DC coil may couple beyond 90°, for instance 110°, or between 90-110°.

From a synchronous reference frame, other angles are possible, for example, the AC coil D-axis may align with a rotor pole Q-axis. That is, the AC coil 1016 may be 90° from the DC coil 1014 in the synchronous reference frame. This arrangement provides a flux path that is not transiently limited by the AC coil; that is, this arrangement provides at least one flux path where, instead of the AC coil blocking all of the flux, the AC coil acts to diffuse the flux to a broader surface. Such an arrangement provides two time steps: the corner that is not bound by the coil (t1), and the area that is under the coil (t2); therefore, the corner can quickly be charged, and, over a period of time, the charge can diffuse into the broader area. Alternatively or in addition, this arrangement removes or reduces direct coupling between silicon circuitry and the charging phase. For example, the flux at the corner can oscillate between 0.5 Tesla to 1.5 Tesla, but then diffuses across the pole area over a longer time scale, essentially averaging the flux to substantially 1 Tesla. As such, this arrangement can charge faster and allow the rotor to sort out flux over time. This results in charging being a control independent infusion rather than something that is discretely controlled by the stator field.

Figure 11D:
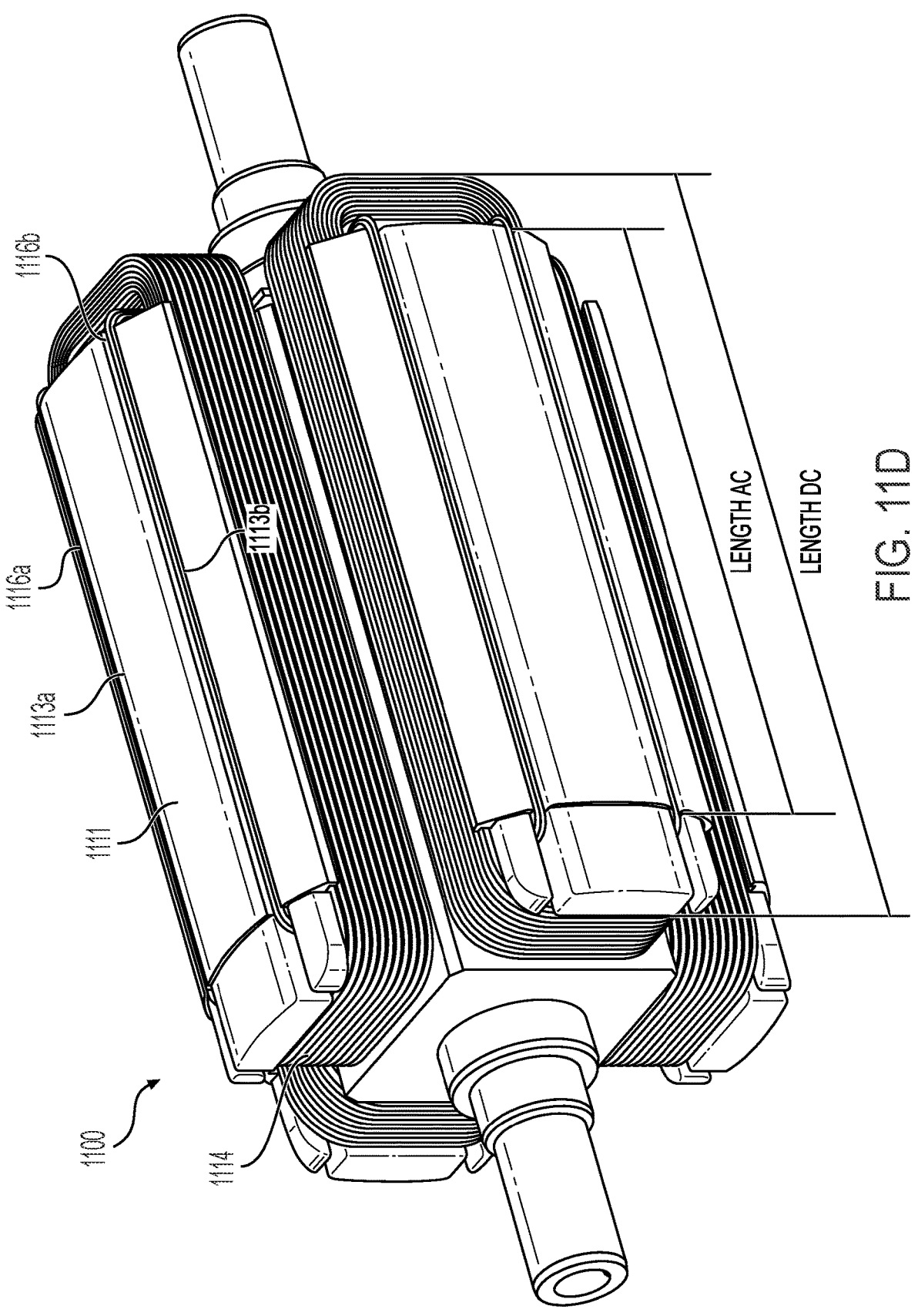
FIG. 11D is a perspective view of the example rotor of FIG. 11A.
Figure 12:
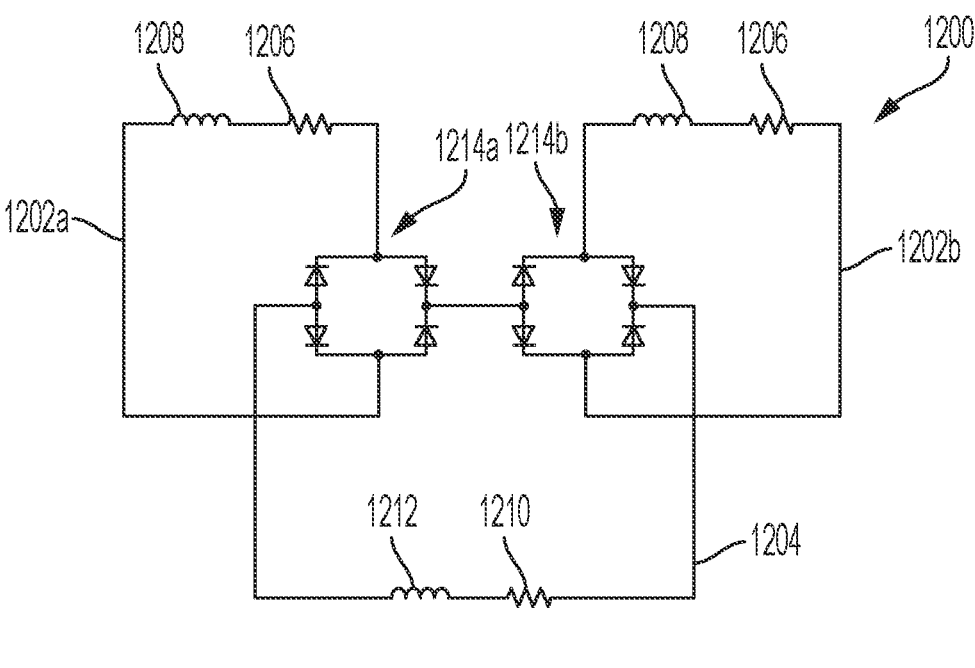
FIG. 12 is a circuit diagram of an example AC rotor coil and DC rotor coil arrangement including two AC coils.

FIG. 11A is a planar view of an example rotor 1100. FIG. 11B is a planar cross-sectional view of the example rotor 1100. FIG. 11C is a planar cross-sectional view, with the cross section being taken just past the end of the DC coils, of a pole of the example rotor 1100. FIG. 11D is a perspec-tive view of the example rotor 1100. The rotor 1100 is substantially similar to the rotor 500 with the exception of any differences described herein. In FIGS. 11A-D, relative to FIG. 5A-B, like numbers plus 600 are used to designate similar components. Each rotor pole 1108 is associated with a tooth 1109 of ferromagnetic material and includes a DC coil 1114 and a first and second AC coils 1116a and 1116b. The DC coil 1114 is wrapped around a winding portion 1110 of each tooth 1109 and extends through a channel 1112 defined by the winding portion 1110 and a cap 1111 (also referred to as an end flange). The AC coils 1116a-b of rotor 1100 run along respective grooves or channels 1113a and 1113b that extend along an axial length of a mushroom-shaped cap 1111 of the rotor poles 1108. The D-axes of the AC coils 1116a and 1116b may be parallel such that they run orthogonal to the major coil (DC coil 1114) D-axis. In other examples, the AC coils 1116a and 1116b may be angled (e.g., in a V-shape) such that the D-axes of the AC coils 1116a and 1116b are oblique or acute relative to the D-axis of the Dc coil 1114. The AC coils 1116a-b may be wired in series (e.g., with a shared rectification circuit) or may be independently (directly) connected to the PCB 550 (e.g., with respective rectification circuits). In some examples, current through the AC coils 1116a and 1116b is substan-tially in phase with one another to prevent or limit current in one AC coil cancelling out current in the other AC coil. FIG. 12, described below, provides an example circuit diagram for a rotor having two AC coils, which describes the circuit of the DC and AC coils of at least some embodiments of the rotor 1100. However, other circuits may also be used with the AC coils 1116a-b and DC coil 1114, such as an actively controlled rectifier circuit. The AC coils 1116a-b do not extend the length of the rotor to the same extent as the DC coils 1114. For example, FIG. 11D illustrates that the AC coils 1116a-b have a length (length$_{AC}$) that is shorter than a length (length$_{DC}$) of the DC coils 1114. Instead, the termi-nations of the AC coils extend from the cap to the PCB 550 underneath the ends of the DC coils 1114. Unlike, rotor 1000, which has AC coils 1016 that concentrate unidirec-tionally, rotor 1100 is directionally independent. That is, rotor 1000 gives torque preference in terms of torque production and timing due to the asymmetry of the AC coils 1016 on the poles. That is, rotor 1000 is more ideal spinning in a single direction, while rotor 1100 can rotate either direction with no difference in performance characteristics.

FIG. 12 is a circuit diagram of an example AC rotor coil and DC rotor coil circuit 1200 including a first AC coil 1202a and a second AC coil 1202b. The circuit 1200 may be substantially similar to the circuit 300 with the exception of any differences described herein. In the illustrated imple-mentation, each AC coil 1202a, 1202b is coupled to a DC coil 1204 by a respective, separate rectifier 1214a and 1214b. The DC coil 1204 and both AC coils 1202a and 1202b are all associated with a rotor pole on the same rotor, typically a same rotor pole or rotor tooth, or in other embodiments adjacent or symmetrically opposed rotor poles on the same rotor. Each rectifier feeds DC current into the single DC coil 1204. The AC coils 1202a and 1202b are configured to carry an AC current/voltage induced by an AC current produced by the stator. The illustrated AC coils 1202a and 1202b include the inherent resistance 1206 and inductance 1208 associated with any coil of wire. The DC coil 1204 is configured to define a rotor field winding energizable by magnetic fields produced by the stator wind-ings (i.e., via the wireless power transfer discussed through-out). The energized DC coil 1204, or rotor field winding, produces a magnetic field that interacts with the magnetic fields produced by the stator windings to produce relative forces between the rotor and the stator. The illustrated DC coil 1204 includes the inherent resistance 1210 and induc-tance 1212 associated with any coil of wire. The DC coil 1204 is at least partially influenced by each of the AC coils 1202a and 1202b. For example, in the illustrated implemen-tation, the AC coils 1202a and 1202b provide power to the DC coil 1204 by their respective passive rectifiers 1214a and 1214b. That is, to energize the windings (which includes both the AC coils 1214a and 1214b, and the DC coil 1204), the stator magnetic field induces a current within the AC coils 1214a and 1214b, which is then rectified by the rectifiers 1214a and 1214b and passes along as current to the DC coil 1204. This generates a magnetomotive force between the DC coil 1204 and the stator to move the rotor relative to the stator.

As illustrated, the circuit includes passive rectifiers 1214a and 1214b, more specifically, bridge rectifiers that includes four diodes. While illustrated as using a bridge rectifier, other rectifiers, including half-bridge (see rectifier 350a) or active rectifiers (see rectifier 350b), can be used without departing from this disclosure. Similarly, one or both of the rectifiers can be replaced with any of the active rectifier implementations described herein. While primarily illustrated as having separate rectifiers 1214a and 1214b, the AC coils 1202a and 1202b can be coupled to the DC coil 1204 by a single rectifier without departing from this disclosure. The circuit 1200, and noted variations thereof (e.g., including one of the other noted rectifiers) may be applicable to at least some embodiments of the rotor 1100 of FIGS. 11A-D, as noted above, as well as at least some embodiments of the rotors 1300 and 1400 illustrated in FIGS. 13A-13D and 14A-14D.

Figures 13A, 13B:
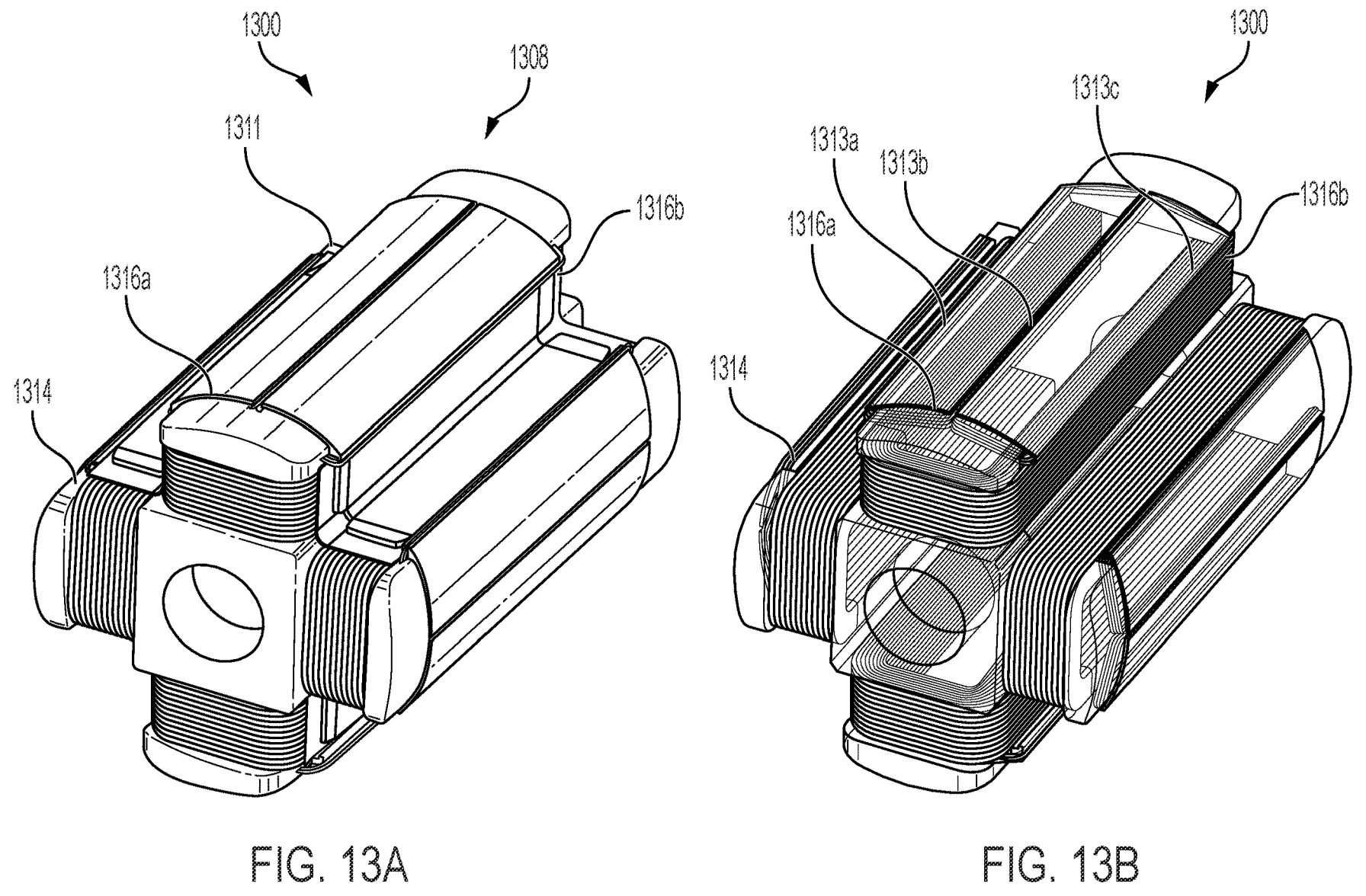
Figures 13C, 13D:
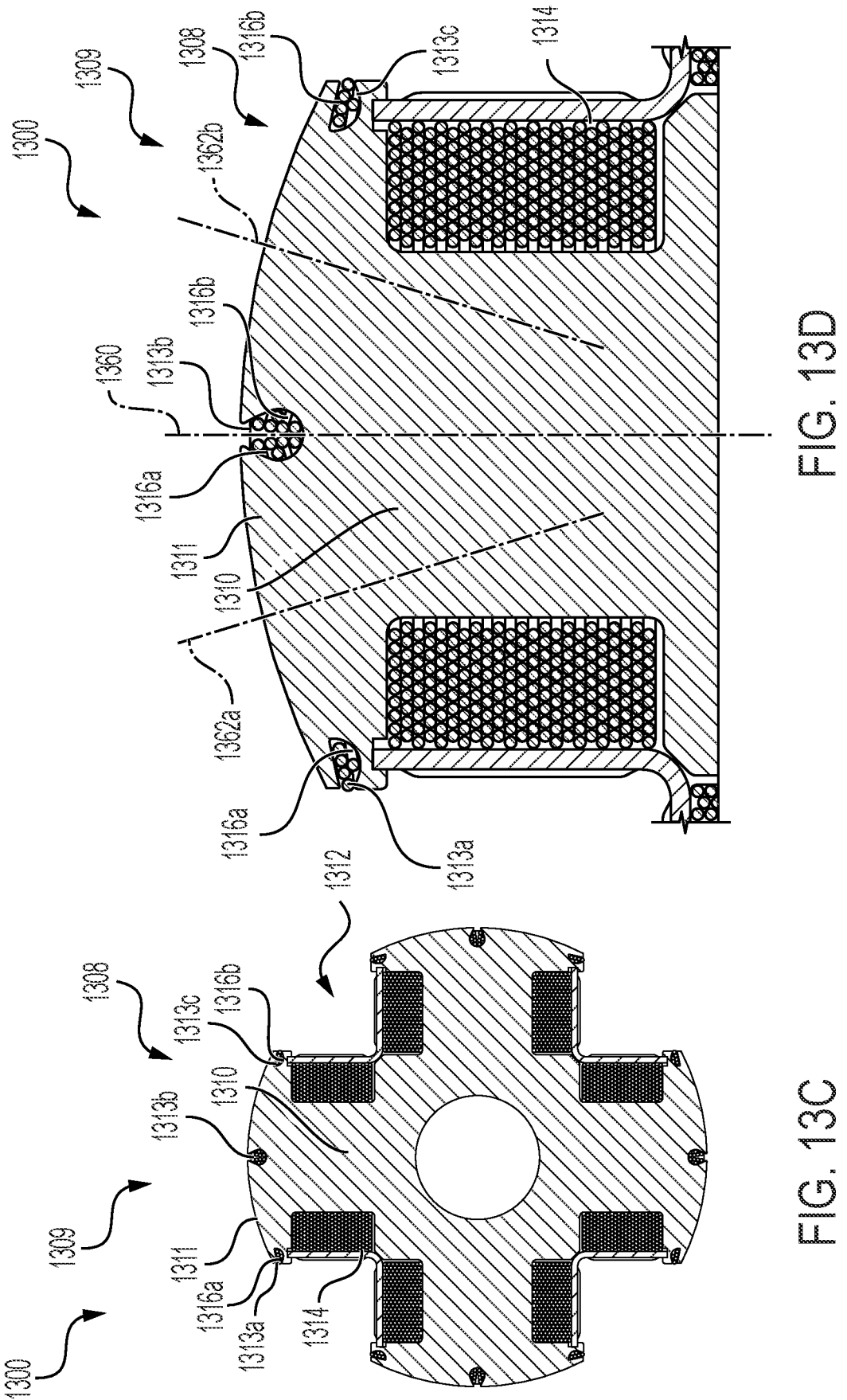
FIG. 13C is a planar cross-sectional view of the example rotor of FIG. 13A.
FIG. 13D is a planar cross-sectional view of a pole of the example rotor of FIG. 13A.

FIG. 13A is a perspective view of an example rotor 1300. FIG. 13B is a perspective view of the example rotor 1300 with the rotor laminations and back-iron of the rotor predominantly hidden from view. FIG. 13C is a planar cross-sectional view of the example rotor 1300. FIG. 13D is a planar cross-sectional view of a pole of the example rotor 1300. The rotor 1300 is substantially similar to rotor 1000 with the exception of any differences described herein. In FIGS. 13A-D, relative to FIGS. 11A-D, like numbers plus 200 are used to designate similar components.

Each rotor pole 1308 is associated with a tooth 1309 of ferromagnetic material and includes a DC coil 1314 and a first and second AC coils 1316a and 1316b. The DC coil 1314 is wrapped around a winding portion 1310 of each tooth 1309 and extends through a channel 1312 defined by the winding portion 1310 and a cap 1311 (also referred to as an end flange). The first AC coil 1316a and the second AC coil 1316b are within the cap 1311 of each rotor pole 1308. More particularly, the AC coils 1316a-b of rotor 1300 run along respective channels 1313a, 1313b, and 1313c that extend along an axial length of the cap 1311. As illustrated, the first AC coil 1316a has a first AC coil D-axis 1362a, and the second AC coil 1316b has a second AC D-axis 1362b arranged in a bisected butterfly arrangement. Neither the first AC D-axis 1362a nor the second AC D-axis 1362b, are aligned with the DC coil D-axis 1360. The DC coil axis 1360 is substantially aligned (within standard manufacturing and operational tolerances) with the rotor pole D-axis. The first AC D-axis 1362a and the second AC D-axis 1362b are also miss-aligned from one another as well; however, in some implementations, the first AC D-axis 1362a and the second AC D-axis 1362b have a symmetrical offset from the rotor pole D-axis 1360 towards and away from the direction of motion of the rotor. The angle of the AC coils 1316a, 1316b relative to the DC coil 1314 is mechanically greater than 0° and less than 90°. For example, if desired to modulate or communicate more on the D-axis (or major axis), this range may be 0-60°, 0-45°, 10-20°, or 10-20°. As another example, if desired to modulate or communicate more on the Q-axis (e.g., separation between major and minor axes), this range may be 30-90°, 45-90°, 70-90°, or 80-90°. Further, in some examples, the AC coil and DC coil may couple beyond 90°, for instance 110°, or between 90-110°. From a synchronous reference frame, other angles are possible, for example, the AC coil D-axis 1362a, 1362b may align with a stator pole Q-axis in a positive or negative direction (e.g., examples in which the AC coils 1316a-b are positioned perpendicular to the DC coil 1314). Such an arrangement takes advantage of inherent AC perturbations caused by flux linkage imbalance between the first AC coil 1316a and the second AC coil 1316b. Flux is also spread out across the pole face. At intervening or oblique angles between 0 (pure D-axis alignment) and 90° (pure Q-axis alignment) in the major axis reference frame (e.g., relative to the DC coil 1314), the AC coils 1316a and 1316b may couple to both the D-axis and the Q-axis in the major axis reference frame. In some examples, the angle of maximum coupling in the major axes may constitute the D-axis of the minor coil (AC coil).

In some implementations, instead of operating two separate AC coils 1316a, 1316b in a bisected butterfly arrangement, a single conductor or wire may be wound in a figure-8, or connected butterfly, arrangement to effectively provides two AC coils and, ultimately, similar net effects. This arrangement reduces the number of wires that need to be connected to rectifiers (and in turn, reducing the number of rectifiers). Additionally, because of the shared conductor or wire, control of one AC coil may no longer be independent of control of the other AC coil (e.g., current may not be driven through only one of the coils because they are formed form one continuous conductive element).

Figures 14A, 14B:
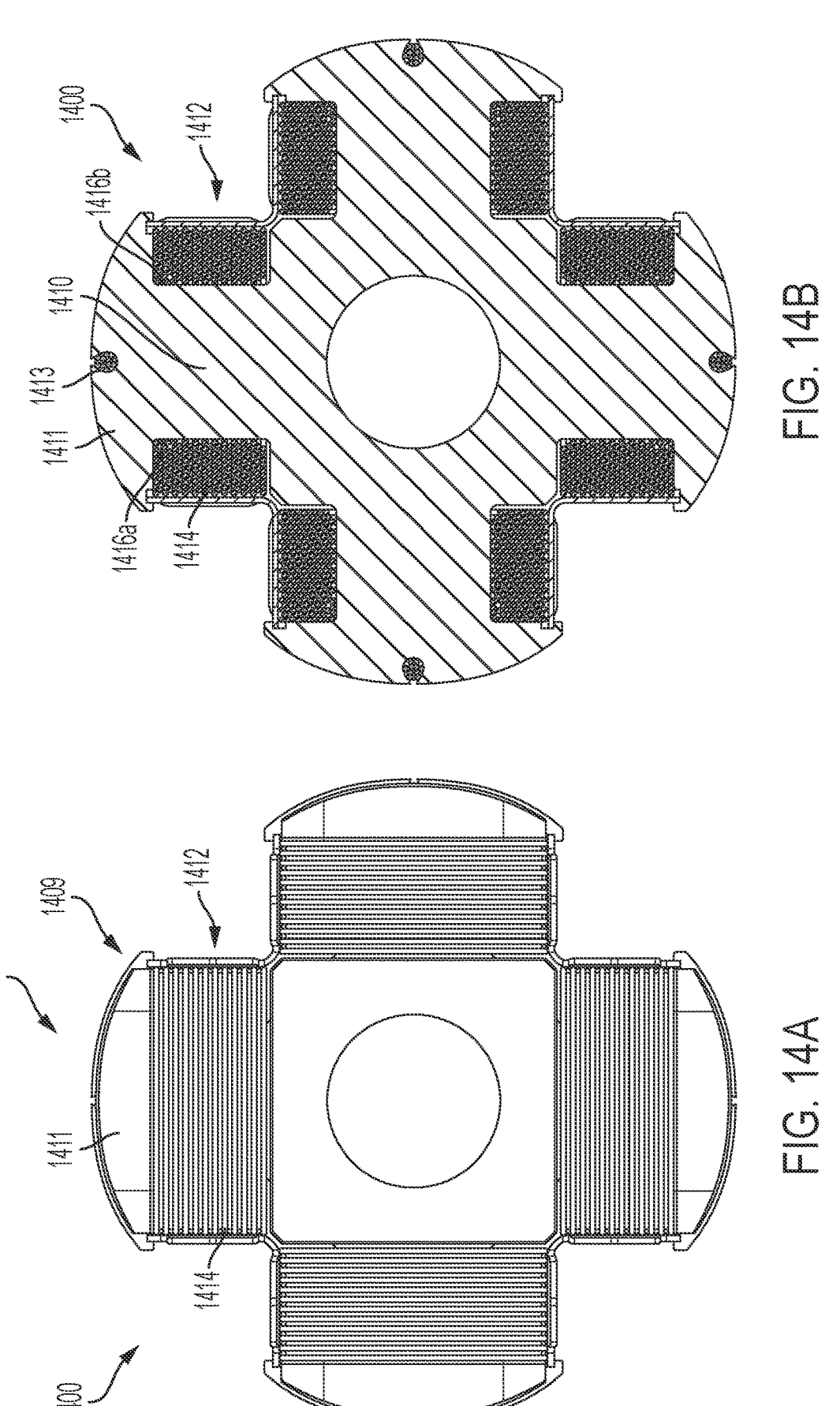
FIG. 14A is a planar view of an example rotor.
FIG. 14B is a planar cross-sectional view of the example rotor of FIG. 14A.
Figure 14C:
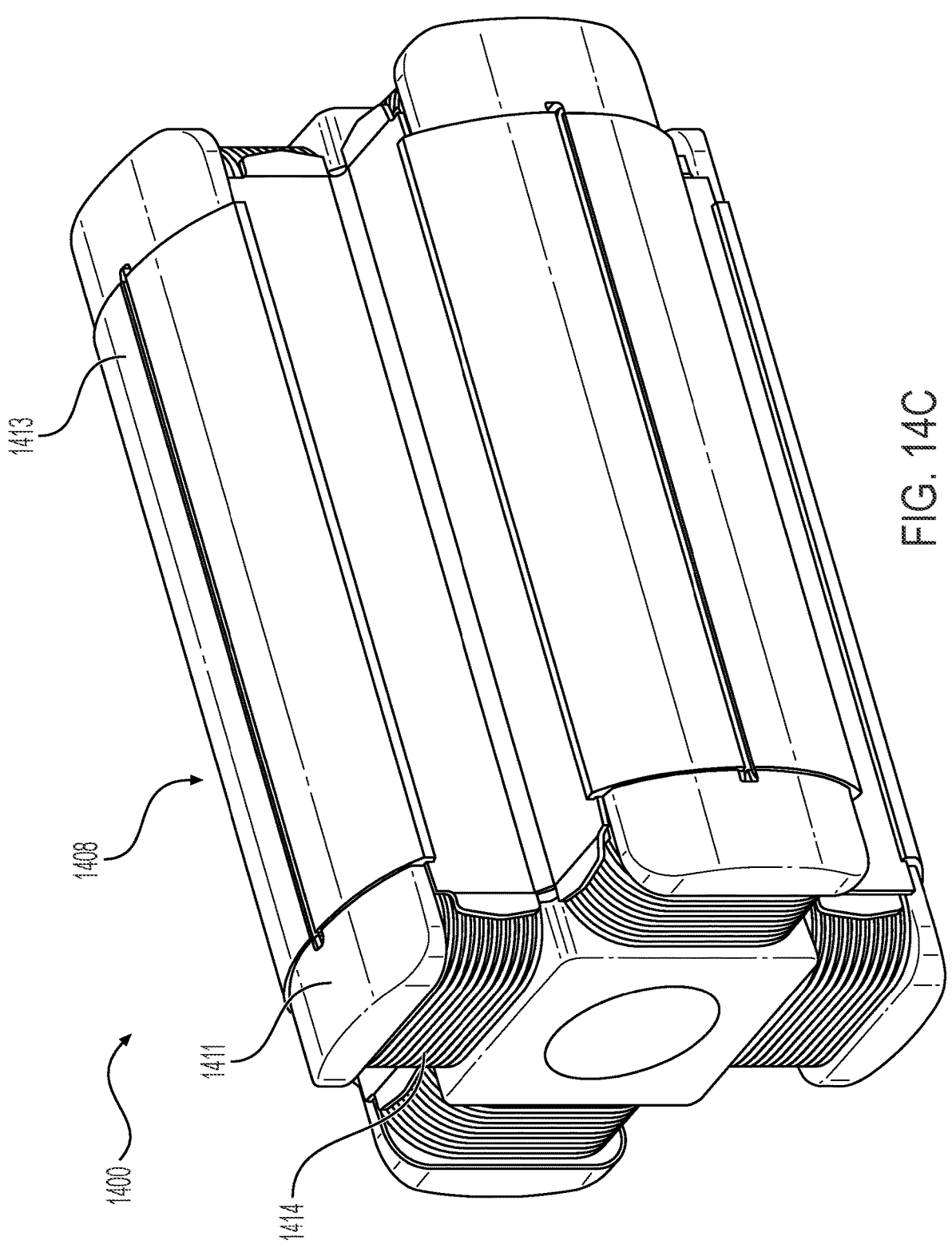
FIG. 14C is a perspective view of the example rotor of FIG. 14A.
Figure 14D:
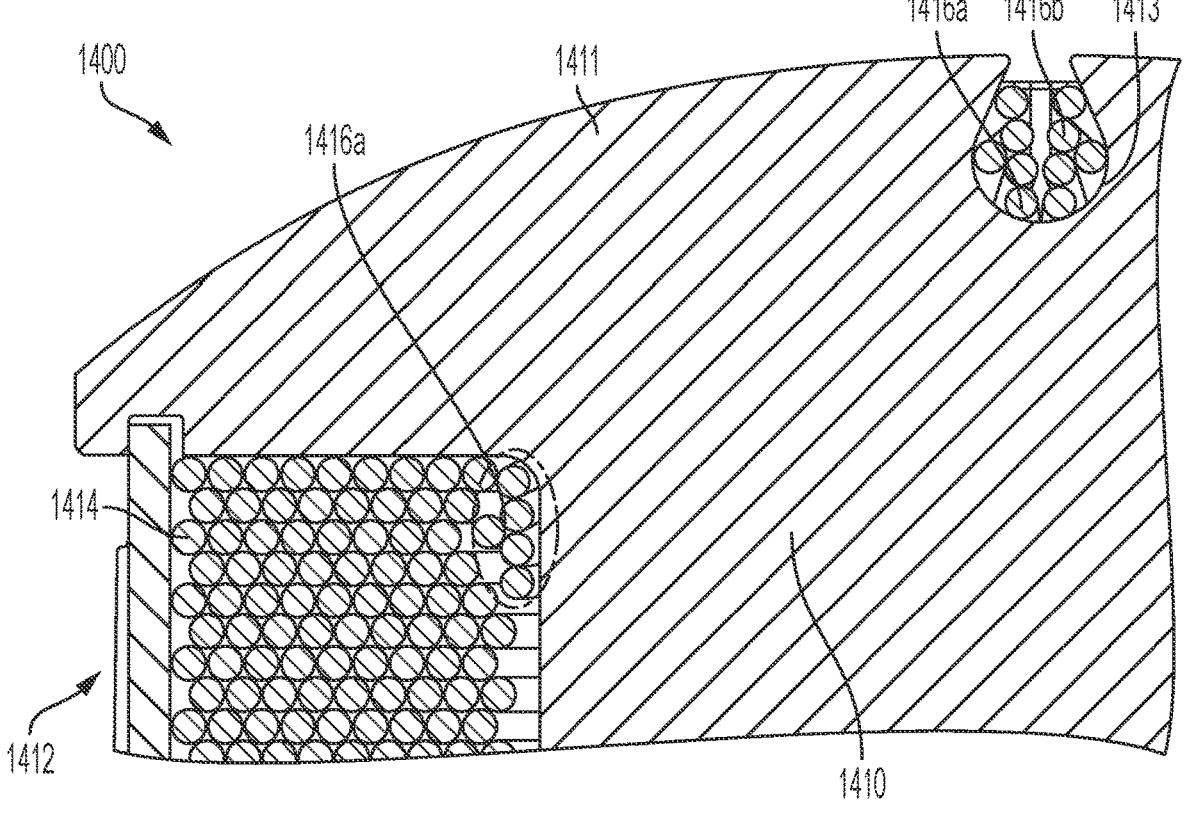
FIG. 14D is a planar cross-sectional view of a pole of the example rotor of FIG. 14A.
Figure 15:
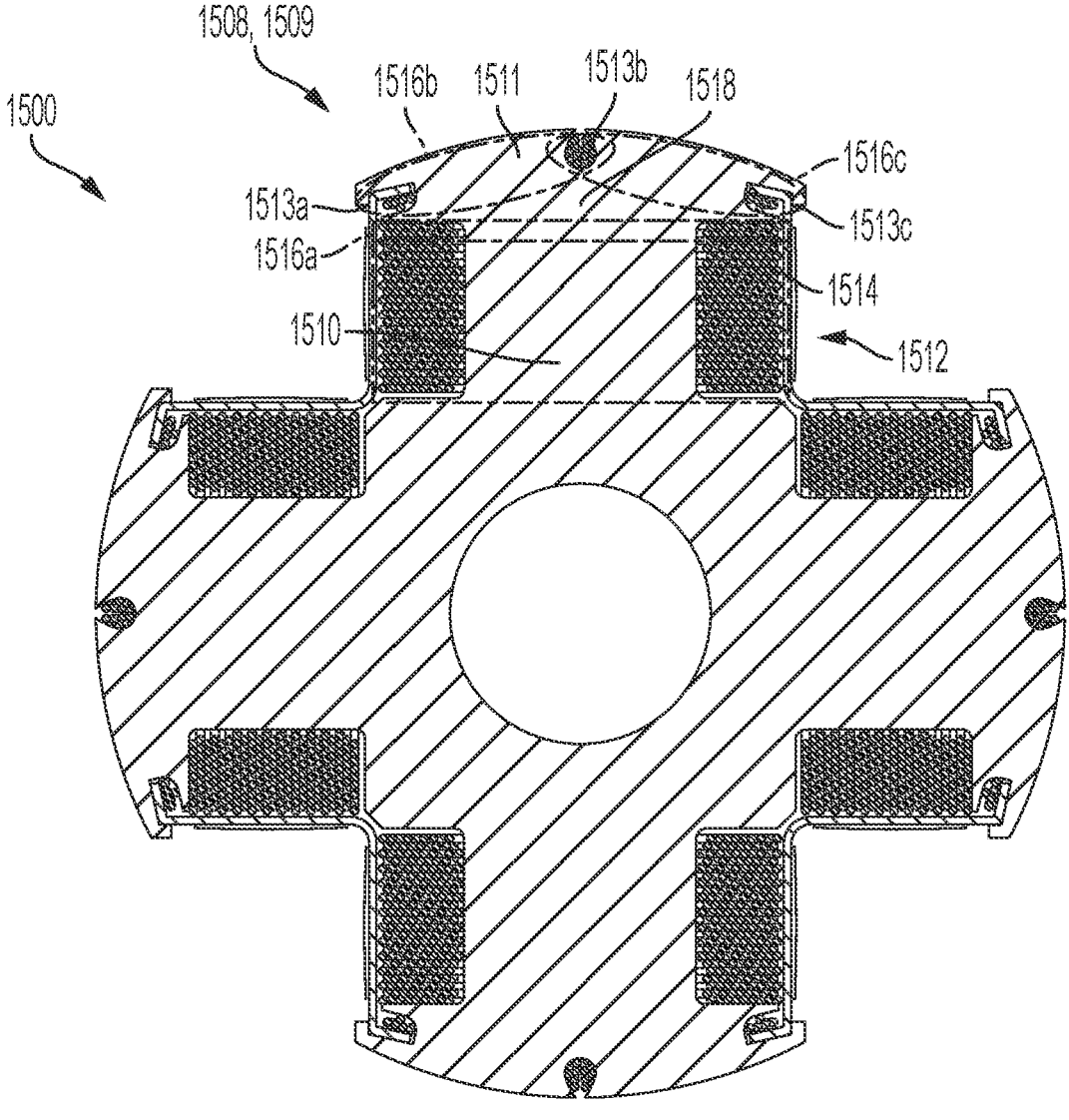
FIG. 15 is a planar cross-sectional view of an example rotor.

FIG. 14A is a planar view of an example rotor 1400. FIG. 14B is a planar cross-sectional view of the example rotor 1400. FIG. 14C is a perspective view of the example rotor 1400. FIG. 14D is a planar cross-sectional view of a pole of the example rotor 1400. The rotor 1400 is substantially similar to the rotor 1300 with the exception of any differences described herein. In FIGS. 14A-D, relative to FIGS. 13A-D, like numbers plus 100 are used to designate similar components.

Each rotor pole 1408 is associated with a tooth 1409 of ferromagnetic material and includes a DC coil 1414 and a first and second AC coils 1416a and 1416b. The DC coil 1414 is wrapped around a winding portion 1410 of each tooth 1409 and extends through a channel 1412 defined by the winding portion 1410 and a cap 1411 (also referred to as an end flange). The butterfly (bisected or connected) arrangement of FIGS. 14A-D include the first AC coil 1416a and the second AC coil 1416b extending underneath a mushroom-shaped cap 1411 of the rotor pole 1408. More particularly, the AC coils 1416a-b of rotor 1400 run along respective shared channel 1413 that extends along an axial length of the cap 1411. The portion of the AC coils 1416a, 1416b that is underneath the mushroom-shaped cap 1411 are covered by a portion of a DC coil 1414. Such an arrangement helps retain the AC coils.

FIG. 15 is a planar cross-sectional view of an example rotor 1500. The example rotor 1500 is substantially similar to the rotor 1300 with the exception of any differences described herein. In FIG. 15, relative to FIGS. 14A-D, like numbers plus 100 are used to designate similar components.

Each rotor pole 1508 is associated with a tooth 1509 of ferromagnetic material and includes a DC coil 1514 and a first, second, and third AC coil 1516a-c. The DC coil 1514 and AC coil 1516a are wrapped around a winding portion 1510 of each tooth 1509 and extend through a channel 1512 defined by the winding portion 1510 and a cap 1511 (also referred to as an end flange). The DC coil 1514 is adjacent to and parallel to the first AC coil 1516a. A D-axis of the DC coil 1514 may be generally aligned with an AC D-axis of the first AC coil 1516a. Within a mushroom-shaped cap 1518 is the second AC coil 1516b and the third AC coil 1516c. More particularly, the AC coil 1516b runs along channels 1513a and 1513b that extend along an axial length of the cap 1511, and the AC coil 1516c runs along channels 1513b and 1513c that extend along an axial length of the cap 1511. Accordingly, the channel 1513b is a shared channel that guides both the AC coil 1516b and the AC coil 1516c.

The second AC coil 1516b and third AC coil 1516c can be formed by a single conductor or wire wound in a figure-8 arrangement, or by two conductors or wires separately coupled to a rectifier that links the AC coils 1516a-c of the rotor 1300 with the DC coil 1514. The AC coils 1516a-b may be wired in series (e.g., with a shared rectification circuit) or may be independently (directly) connected to the PCB 550 with respective rectification circuits. A D-axis of the DC coil 1514 may be generally oblique with respect to the AC D-axes of each of the second AC coil 1516b and the third AC coil 1516c. Further, the AC D-axis of the second AC coil 1516b and the AC D-axis of the third AC coil 1516c may be different (i.e., not aligned). In the illustrated example, these AC D-axes may be oblique with respect to one another. However, in other examples, the AC coils 1516a and 1516b may be positioned on the rotor 1500 such that their respective D-axes are perpendicular to one another. This three AC-coil arrangement allows for a more flexible control and/or power transfer scheme as having multiple AC coils at different angles allows power transfer to occur at a wider variety of angles as well. A similar circuit as shown in FIG. 12 may be used, except that another rectifier circuit would be provided for the third AC coil (i.e., one rectifier per separate AC coil). The third rectifier circuit may be coupled between the two rectifier circuits 1214a and 1214b (via respective midpoints nodes between diodes) and also coupled to the third AC coil (via top and bottom voltage rails).

While this disclosure has described several implementations, the subject matter of this disclosure can be applied to any field wound synchronous rotor with AC and DC coils. Further examples and details on stator and rotor topologies and drive mechanisms can be found in U.S. patent application Ser. No. 17/151,978, the entirety of which is hereby incorporated by reference.

The following discussion of motor operation and control may be applicable to and implemented with each of the electric machine embodiments described herein. In operation, field oriented or vector controls with specific perturbations (e.g., signals, electrical field and or flux changes, magnetic field of flux changes, etc.) for power transfer may be used to control various aspects of the rotor field. These perturbations create an AC excitation that couples with the AC coil. Thus, a direct correlation of rotor current, or current induced in AC windings that can be rectified into the DC coil, which can effectively be steered from the stator and inverter. In other words, a high frequency signal can create dynamic behavior of a machine that is a function of currents in a D-axis and Q-axis field (controlled by a controller) in addition to AC components of the system. Such a frequency may be chosen such that the frequency is within a range to transfer power from the stator to the AC coil for a given circuit. The frequency may also be moderated by the rotations speed of the rotor and/or the switching speed of the controller. In some implementations this can be 100-300 hz, in others 300-1000, in others 1-5 khz, 5 khz-10 khz, 10 khz-above. In some implementations, greater frequencies may enable a resonant circuit if a capacitor is used. Alternatively or additionally, impedance matching can be used in non-resonant circuits. Frequencies can depend upon the speed of the machine (e.g., upon the rotations per minute (RPM) of the rotor). In some implementations, in some cases, a fixed perturbation (signal) can be chosen with a frequency that is at least 5-10 times higher than the fundamental frequency (e.g., the frequency necessary to maintain rotation) to prevent an interaction with torque generation resulting in torque ripple. Amongst other strategies, vector modulation can be employed to help define the perturbations.

Vector control modulation may be directly used to couple to either the D-axis or Q-axis and may be embodied in either amplitude modulation (AM), current angle modulation (CAM), or both. The relative effectiveness of AM vs CAM is proportionate to both the magnitude and the percent change of the modulation (the latter of which may be described as frequency modulation, FM). FM may be further used, in conjunction with the circuit topology and devices, to establish resonance or impedance matching. In some implementations, non-resonant or impedance network circuitry can be used without departing from this disclosure.

Figure 17:
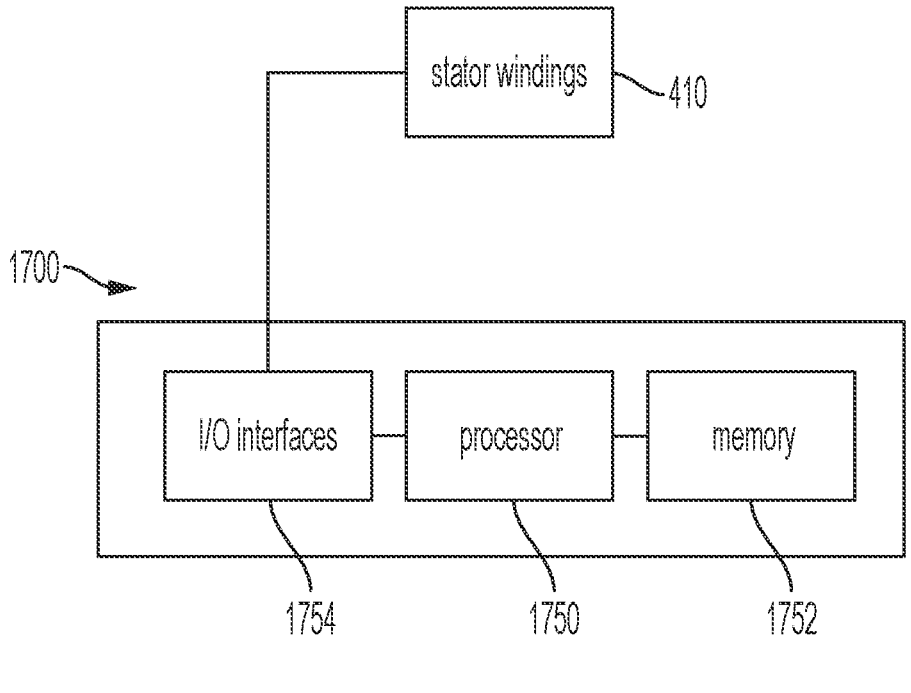
FIG. 17 is a block diagram of a controller that can be used with aspects of this disclosure.

An example vector control may be described by letting $i_d$, $i_q$, and $i_z$ be the currents at fundamental frequency represented in the D-Q reference frame (e.g., principal control components). Then, it is possible to add an independent excitation in any of the D/Q axes that is superimposed onto the fundamental currents resulting in a total stator current:

$$i_{d_{total}} = i_d + i_{d_{excitation}} \tag{2}$$

$$i_{q_{total}} = i_q + i_{q_{excitation}} \tag{3}$$

$$i_{z_{total}} = i_z + i_{z_{excitation}} \tag{4}$$

Where $i_{d_{excitation}}$, $i_{q_{excitation}}$, and $i_{z_{excitation}}$ are the independent perturbation signals that can be selected by the motor controller (e.g., the motor controller 104 of FIG. 1, the switch controller 264 or 284 (of FIGS. 2B-C), or the motor controller 1700 of FIG. 17). Typically, perturbations can be chosen to be sinusoidal to simplify analysis, for example, such perturbations can be further described as:

$$i_{d_{excitation}} = m_d \cos(w_d t) \tag{5}$$

$$i_{q_{excitation}} = m_q \sin(w_q t) \tag{6}$$

$$i_{z_{excitation}} = m_z \cos(w_z t) \tag{7}$$

The perturbation magnitude and frequency can be chosen independently per component. In some implementations, perturbations are applied to a single axis, that is, no perturbation is applied to the other two axes and are used to generate a field excitation for power transfer. For example, a perturbation can be applied solely to the D-axis of the AC coil for power transfer and/or control purposes, reducing interference with the MMF stator signal, and therefore reducing torque ripple. Alternatively or in addition, a D-axis perturbation can be used in that attempt to counteract torque ripple, and a Q-axis perturbation can be used if the D-axis perturbation is insufficient, essentially using multiple axis injections to create a net effect. In some implementations, a Q-axis perturbation can be used in combination with D-axis perturbation to form a rotating vector injection. Z-axis perturbation has no effect on the torque ripple and does not require knowledge of the D-Q reference system; however, in some implementations, the Z-axis is not used for perturbations and the Z-axis perturbations are substantially 0.

The vector injection has the benefit that it describes vector motion that has constant magnitude and constant angular velocity and describes a circle in the D-Q reference frame. Hence, this concept can be realized as the generation of a rotating magnetic field resulting in a constant overall perturbation.

As previously mentioned, control of the rotor field can be manipulated by the controller (e.g., the controller 104, 264,

284, or 1700) through the stator windings using amplitude modulation (AM), current angle modulation (CAM), and/or frequency modulation (FM). Amplitude modulation (AM) at a given current angle can be used to transfer power to an AC coil, where the greatest power is transferred at the current angle (in the D-Q reference frame) of greatest coupling to the AC coil. For instance, for an AC coil aligned with the Q-axis with respect to the synchronous reference frame axis (that is, the AC D-axis is aligned with the Q-axis of the rotor pole), then the greatest power transfer would occur at a phasor current angle of 90° electrical (where 0° electrical is defined as the D-axis of the synchronous reference frame). In another example, where an AC coil is aligned with the D-axis of the rotor pole, the AC coil would have the greatest coupling at 0° electrical in the synchronous reference frame. AM can be defined by a magnitude and a frequency.

Current angle modulation (CAM) can be used to transfer power to the AC coil, where oscillations in current angle are defined about a set operating point of current angle as defined by the D-Q reference frame (e.g., a current angle can be modulated to achieve a target torque per amp, MTPA). CAM perturbations can be defined by an oscillation, a magnitude, and a frequency. In some implementations, a CAM strategy may be used to intentionally create AC perturbations. For example, a current angle can oscillate about a maximum torque output angle point of 70° in the electrical field by +/−5 deg at an oscillation frequency of substantially 300 Hz (within standard frequency control error). Such current angle control provides an oscillation from 65-75° in the electric domain at 300 Hz, for a total 10° swing. In other implementations, the oscillation may be more or less, and/or occur about different nominal set points or frequencies.

Varying the frequency of the modulation (FM) of the stator's magnetomotive force magnitude can affect the response of the system or the effectiveness of power transfer. Additionally, the controls and circuit can be tuned such that they put the system near a resonance point on an AC coil, or create a network matching impedance for the AC coil and stator coil-inductor system. Such a resonance frequency has the benefit of creating an efficient coupling and enabling a reduction of the AC coil size, which would be similar for an impedance matching system. In some implementations, AC coupling can be achieved at non-resonant or impedance matching frequencies. Regardless of the coupling method used, the amount of power transferred can be modulated. Similarly, different coupling strategies may be employed to achieve different goals, for example, in instances when a quick response is needed, greater amounts of AM or FM coupling may be used. Mitigating torque ripple may be easier using FM at higher frequencies and AM at lower frequencies.

Local flux variations occur naturally as the machine rotates due to slotting effects and may also be used to transfer power by generating an AC response due to a change in flux linkages. That is, an AC response is generated due to the tooth-pass frequency of the rotor pole passing teeth of the stator (assuming salient and/or concentrated stator windings). In implementations relying on such inherent variations, the high frequency variation/perturbation in the entire magnetic field may be reduced or unneeded. Advantageously, this approach may generate less losses (e.g., switching and core losses); however, these variations are not fully controllable because the tooth-pass frequency is a function of the rotational speed of the rotor. Higher rotational speeds tend to result in more effective AC responses as a function of local slotting effects and flux variations.

In some implementations, a hybrid scheme can be adapted such that a control scheme utilizes an AC imposition in addition to local flux variations. This provides a method for explicit control through the AC signal and the benefit of efficiency of the local flux variations. For example, the AC signal can be relied upon at low speed, high torque conditions, or when a large torque step is needed. At higher rotational speeds and lower torque requirements, the local flux variations would be used as the flux demand would not be as high. FIG. 20, discussed below, provides an example method 2000 for implementing a hybrid control scheme.

Figure 16:
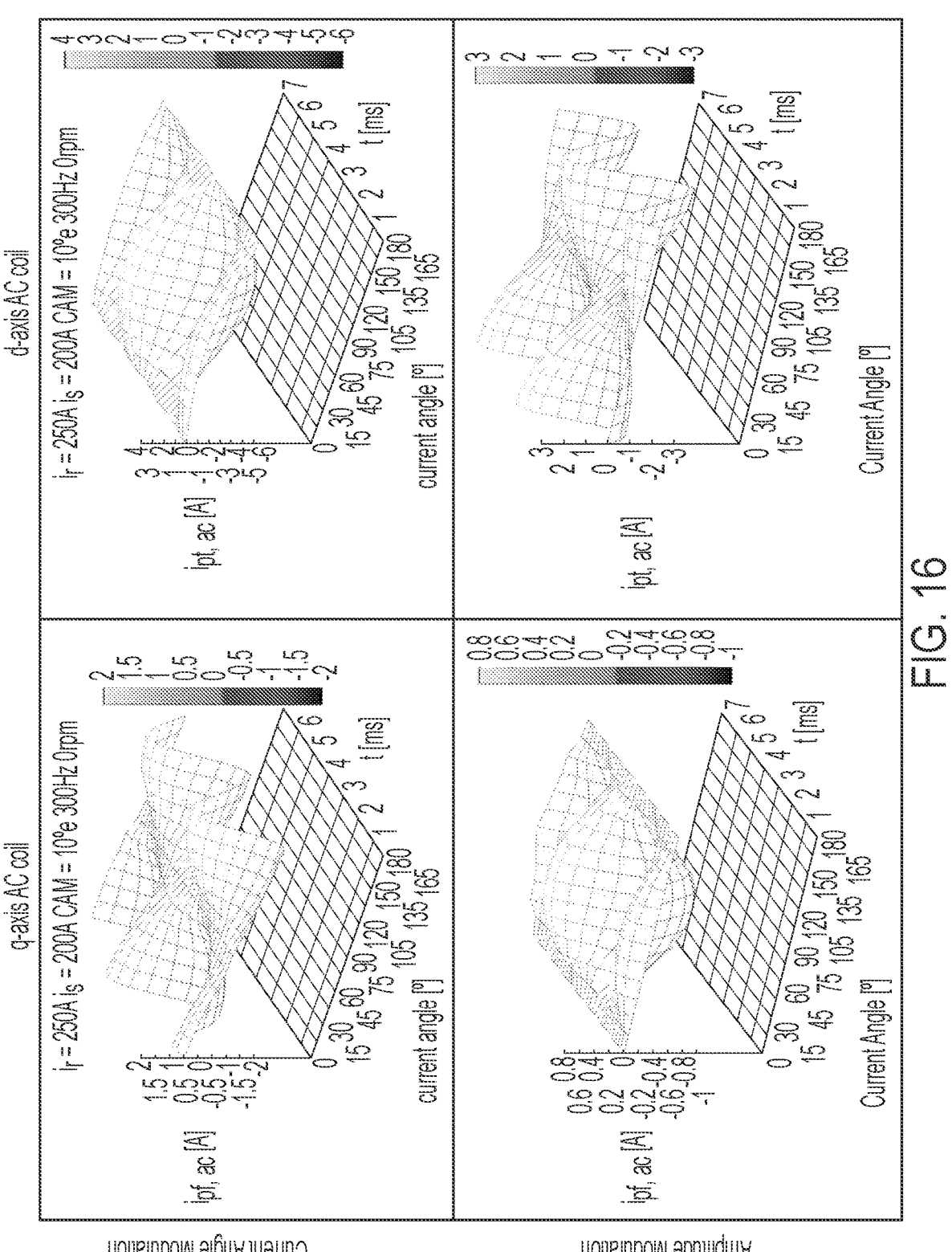
FIG. 16 includes three-dimensional response plots for AC and DC coils responding to amplitude modulation and current angle modulation. The Y-axes shows current, the X-axes shows the current phasor angle, and the Z-axes shows time.

FIG. 16 includes three-dimensional response plots for AC coils responding to amplitude modulation and current angle modulation in both the D-axis and Q-axis. The Y-axes show current, the X-axes show the current phasor angle, and the Z-axes show time. The plots show induced AC current in the winding across a sweep of current angle at a fixed amplitude of perturbation and frequency. AM behaves purely as a function of relative coupling, where the Q-axis coil has maximum coupling at 90° electrical in the synchronous reference frame, and minimum coupling at both 0° and 180° electrical in the synchronous reference frame. The D-axis coil exhibits the inverse response.

Conversely, CAM elicits a response that is shifted 90° out of phase. That is, the Q-axis coil fully couples at 0° and 180° electrical with respect to the synchronous reference frame, and couples very little (e.g., none or nearly none) at 90° electrical. The D-axis coil exhibits the inverse response.

FIG. 17 is a block diagram of an example controller 1700 that can be used with aspects of this disclosure. Controller 1700 can be used in addition to or in lieu of motor controller 104 previously described. In the former instance, controller 1700 and motor controller 104 can be combined into a single, integrated controller, or controller 1700 and motor controller 104 can be separate, discrete controllers. Similarly, the controller 1700 can incorporate the switch controller 264 or 284 (see FIGS. 2B-2C), or the functionality thereof. The controller 1700 can, among other things, monitor parameters of the electric machine 400 and send signals to actuate and/or adjust various operating parameters of the electric machine 400. Further, although primarily described with respect to the electric machine 400, the controller 1700 (and other controllers described herein) can similarly be used in conjunction with any of the electric machines described herein (e.g., including the electric motor 102) in a similar manner as with the electric machine 400. In other words, the controllers can, among other things, monitor parameters of the electric machines, actuate and/or adjust various operating parameters of the electric machines (e.g., by, among other things, controlling the active rectifier of these electric machines). The rotors of these electric machines can take the form of any of the rotors described herein, including as illustrated and described with respect to FIGS. 5A-15.

As shown in FIG. 17, the controller 1700, in certain instances, includes a processor 1750 (e.g., implemented as one processor or multiple processors) and a memory 1752 (e.g., implemented as one memory or multiple memories) containing instructions that cause the processors 1750 to perform operations described herein. The processors 1750 are coupled to an input/output (I/O) interface 1754 for sending and receiving communications with components in the electric machine 400, including, for example, a rotor position sensor or a current sensor. In certain instances, the controller 1700 can additionally communicate status with and send actuation and/or control signals to one or more of the various electric machine components (including power or drive signals to the stator) of the electric machine 400 as well as other sensors (e.g., temperature sensors, vibration sensors, and other types of sensors) provided in the electric machine 400. The communications can be hard-wired, wireless, or a combination of wired and wireless. In some implementations, the controller 1700 can be a distributed controller with different portions located within different locations, for example, different parts of a vehicle. Additional controllers can be used in conjunction with controller 1700 as stand-alone controllers or networked controllers without departing from this disclosure.

The controller 1700 can have varying levels of autonomy for controlling the electric machine 400. For example, the controller 1700 can begin sensing a change in load and/or speed, and an operator can adjust the power frequency, control frequency, current magnitude, and/or current angle. Alternatively, the controller 1700 can begin sensing a change in load and/or speed, receive an additional input from an operator, and adjust the power frequency, control frequency, current magnitude, and/or current angle with no other input from an operator. Alternatively, the controller 1700 can begin sensing a change in load and/or speed and adjust the power frequency, control frequency, current magnitude, and/or current angle with no input from an operator. Similarly, with all of the control schemes described herein, various coupling methods can be used on different channels or control axes, for example, AM coupling can be used on one channel, and FM coupling can be used on a separate channel.

For example, in operation, the controller 1700 can be a controller configured to energize the stator windings and produce the stator magnetic field within the stator by sending a control signal to the stator windings 410. For example, the controller 1700 can generate control signals (e.g., respective pulse-width modulated (PWM) control signals) for switching elements to control application of current from a power supply to the stator windings (e.g., as described further below with respect to switch controllers and switching elements of FIGS. 2B-2C).

The controller 1700 can be configured to produce the stator magnetic field by sending a current through the stator at a current angle and magnitude, and actively adjusting the current angle and magnitude depending upon operation conditions of the electric machine 400. In some implementations, the current angle and magnitude can be modulated to achieve a desired result and/or coupling of rotor coils. Alternatively or in addition, the controller 1700 can receive a position stream from the position sensor. The position stream is representative of the rotor position. The position stream can be an analog or digital electrical or electromagnetic signal. Responsive to receiving the position stream, the controller 1700 can determine the presence, absence, or severity of any torque ripple that is present. The controller 1700 can then adjust a current angle and/or current magnitude responsive to determining a torque ripple is present.

In some implementations, the current phasor angle 417 is increased ahead of the rotor pole 408 in the direction of movement during high torque conditions. That is, in instances where greater current per torque unit is required can lead to an increased current phasor angle 417. In general, as the current phasor angle 417 increases, the rotor 404 coils become more active (more current flowing through the coils) due to a lessened D-axis component. In other words, the field of each rotor winding decays faster as the current phasor angle 417 increases. The greater activity within the coils can lead to increased torque ripple without mitigation; however, a current amplitude can be increased during the increase the D-axis component experienced by each pole, counter acting the potential negative torque produced by the increased current phasor angle 417.

Alternatively or in addition, the current phasor angle 417 is decreased during high-speed, low torque operations. Alternatively or in addition, the current angle can become negative during braking operations. Regardless of the operating mode used, the controller 1700 is capable of adjusting the current angle and/or the current amplitude to meet the present demands of the electric machine 400 in a given situation. The controller is capable of communicating with the rotor, through the stator, at a wide range of frequencies, for example, between 50 and 1000 Hertz (Hz). In some implementations, the communication occurs between 100 and 1000 Hz. Regardless, the system is able to communicate changes faster than traditional systems. For example, a traditional squirrel-cage induction machine communicates at substantially 7 Hz. The ability for higher frequency transmission allows for the controller 1700 to actively reduce torque ripple, regardless of operating condition, and to quickly adjust to changes in operating conditions.

Alternatively or in addition, the controller 1700 can increase a magnitude and/or frequency of an AC signal during low speed and/or high torque conditions. Alternatively or in addition, the controller 1700 can decrease a magnitude and/or frequency of an AC signal at higher rotational speeds and/or lower torque conditions.

Alternatively or in addition, the controller can communicate to and control an active rectifier (FIGS. 3B-3C) on the rotor. As such, a current through the rotor winding can be actively adjusted alternatively or in addition to the phasor current angle and/or magnitude.

Figure 18:
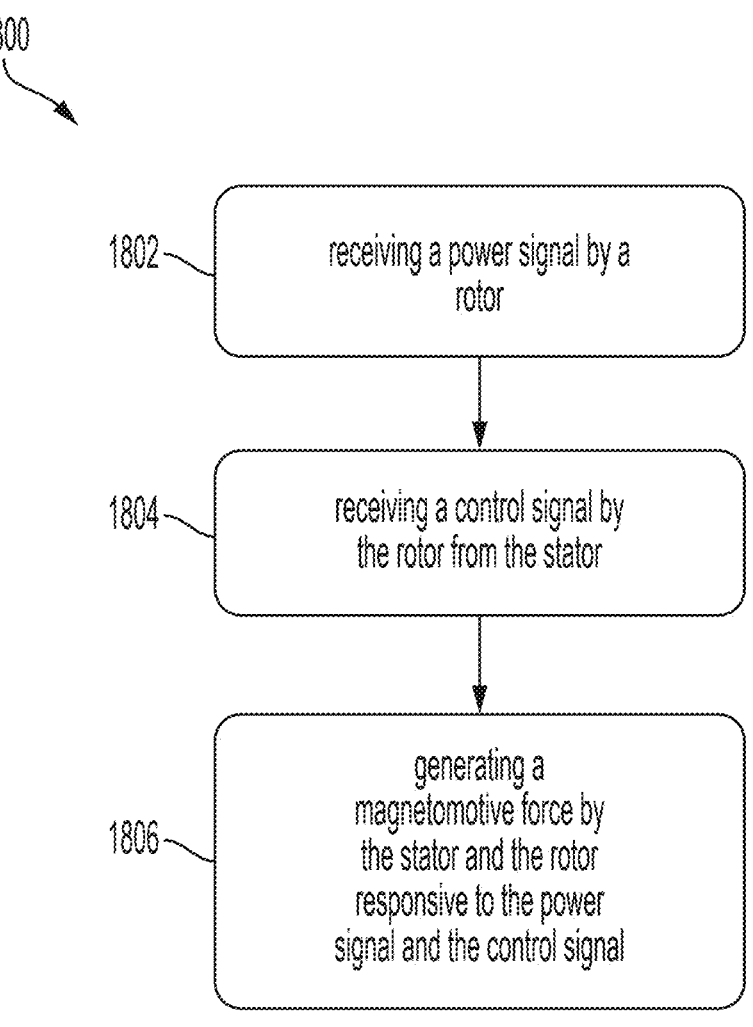
FIG. 18 is a flowchart of an example method that can be used with aspects of this disclosure.

FIG. 18 is a flowchart of an example method 1800 that can be used with aspects of this disclosure. At 1802, a power signal is received by a rotor from an associated stator. Receiving the power signal includes receiving an AC signal from the associated stator, by a rotor AC coil.

At 1804, a control signal is received by the rotor from the stator. The control signal has less amplitude than the power signal, for example, an amplitude of up to 5% of the power rating of the electric machine. Receiving the control signal includes receiving an AC signal, from the associated stator, by the rotor AC coil. Such a signal can include a control signal modulated onto the power signal, such as with frequency modulation or with amplitude modulation. In some implementations, the control signal can be a separate and distinct signal from the power signal.

At 1806, a magnetomotive force is generated by the stator and the rotor responsive to the power signal and the control signal. Generating the magnetomotive force includes rectifying the received AC signal to a DC current that is passed through the DC rotor coil. In response to passing the DC current through the DC coil, a magnetic field is generated.

FIG. 19 is a flowchart of a method 1900 that can be used with aspects of this disclosure. All or part of method 1900 can be performed by the controller 1700, the motor controller 104, and/or an active rectifier, consistent with this disclosure. The method 1900 may also be implemented by other controllers and systems.

In block 1905, an auxiliary (e.g., an alternating current (AC)) coil of a first rotor winding of a plurality of rotor windings of a rotor of a field wound synchronous electric machine carries a first current (e.g., an AC current) induced by an AC current flowing in a stator of the field wound synchronous electric machine. The stator includes stator windings configured to be energized to define stator poles and the rotor windings are configured to be energized to define fixed rotor poles with associated teeth comprising a ferromagnetic material. The stator may be, for example, the stator 106, the stator 402, or another stator described herein. Similarly, the rotor may be the rotor 108, 404*a*, 404*b*, 404*c*, 500, 600, 700, 800, 900, 1000, 1100, 1300, 1400, 1500, or another rotor described herein. The stator windings may be energized via a current generated by a controller (e.g., the controller 104 or 1700), as described herein, to define the stator poles. For example, the controller may incorporate a switch controller (e.g., the switch controller 264 or 284) to drive switching elements of an inverter bridge to apply a respective AC current signal to the stator windings of each phase of the stator (see, e.g., FIGS. 2B-C). The AC current signal may be generated along one or more control channels or axes of the motor (e.g., D-axis or Q-axis in a synchronous reference frame) using one or more control techniques described throughout the disclosure. For example, the controller may inject a current signal along a control channel or axis (e.g., D-axis or Q-axis) resulting in a modulating signal (modulated in amplitude, frequency, or phase) through the stator windings along the control channel or axis, which induces the current in one or more rotor windings of the rotor.

In block 1910, a rectifier receives the first current (e.g., the AC current induced in the auxiliary coil (e.g., the AC coil). The rectifier may be rotationally fixed to the rotor and electrically coupled to the AC coil and to a primary coil (e.g., a DC coil) of the first rotor winding. The rectifier may be the rectifier 300, 350*a*, 350*b*, 1200, or another active rectifier. The rectifier may be integrated into a printed circuit board (e.g., PCB 550 or another PCB), which is rotationally fixed to the rotor (e.g., secured to the rotor or rotor shaft for rotation therewith). The rectifier may receive the first current induced in the AC coil via conductive connections with the AC coil. For example, the AC coil may have conductive leads that are connected to terminals of a PCB that incorporates the rectifier.

In block 1915, the rectifier generates a second current (e.g., a DC current) from the first current induced in the AC coil. For example, in the case of a passive rectifier (e.g., rectifier 300 or 1200), the rectifier passively rectifies the AC current to generate the DC current via its diodes and/or other discrete circuit components and the interconnections thereof. As another example, in the case of an active rectifier (e.g., rectifiers 350*a* and 350*b*), corresponding control circuitry drives switching elements of the active rectifier (e.g., with respective PWM signals) to actively rectify the AC current to generate the DC current. Like the rectifier, the control circuitry may be rotationally fixed to the rotor. For example, the control circuitry may include a rotor microprocessor or gate drive unit on the same PCB as the rectifier or another PCB rotationally fixed to the rotor. The control circuitry may drive the switching elements based on data signals received wirelessly from the stator or based on a "self-synchronizing" control scheme, as described above. The rectifier outputs the second current to the primary coil (e.g., DC current to the DC coil).

In block 1920, the primary coil carries the second current from the rectifier, the second current defining a fixed rotor pole (of the fixed rotor poles) that interacts with the stator poles to produce relative forces between the rotor and the stator. For example, the second current results in the fixed rotor pole and corresponding magnetic field, which interacts with (e.g., is pushed or pulled) by magnetic fields generated by current in the stator windings. This interaction results in magnetomotive forces that may rotate the rotor (e.g., in a desired direction, at a desired speed, and/or desired torque).

Although method 1900 is described with respect to an AC or auxiliary coil, a DC or primary coil, and a rectifier associated with a first rotor winding, each rotor winding of the rotor may similarly include one or more AC coils, a DC coil, and a rectifier and may operate under similar principles.

As noted above, the method 1900 may be used with each of the rotor embodiments disclosed herein. In some embodiments, the method 1900 includes additional steps to accommodate particular features of specific rotor designs, such as use of multiple AC coils (see, e.g., FIGS. 11A, 12, 13A, 14A, and 15). For example, each AC coil of the first rotor winding may carry AC current induced by the stator and provide the current to the rectifier. The rectifier may further rectify a sum of the AC current received from the two or more AC coils, and output the DC current to the DC coil.

Additionally, as described above, in some examples, the AC coil (or AC coils, as the case may be) may be configured to receive data signals wirelessly transmitted by the stator. The control circuitry associated with the rectifier or separate control circuitry may be configured to detect the data signals by monitoring the induced AC current for frequency, magnitude, and/or phase modulations that encode data, and decoding such modulations into the data. As noted, these data signals may provide control information for the control circuitry that controls the active rectifier. In certain embodiments, signals can be sent through the AC coil on the rotor to communicate with the stator wherein these data signals may provide control information for the machine such as rotor speed, current level, temperature, or other state information.

FIG. 20 is a flowchart of a method 2000 for a hybrid control scheme for controlling an electric machine using AC imposition in addition to local flux variations that can be used with aspects of this disclosure. All or part of method 2000 can be performed by the controller 1700, the motor controller 104, and/or an active rectifier, consistent with this disclosure. The method 2000 may also be implemented by other controllers and systems.

In block 2005, a DC coil of a rotor is driven based on wirelessly transferred power from the stator that is captured by an AC coil of the rotor. For example, to implement the block 2005, a controller (e.g., the controller 1700, the motor controller 104, or the like) may execute the method 1900 of FIG. 19 to control one of the electric machines described herein.

In block 2010, the controller determines a motor characteristic indicative of rotational speed of the rotor. For example, the motor characteristic may be the rotational speed of the rotor, which may be determined by the controller. The rotational speed may be determined, for example, using the output of a rotor position sensor (e.g., one or more Hall sensors) or by a current or voltage sensor that detectors zero-crossings on the stator coils. In other examples, the motor characteristic may be a flux variation amount experienced by the rotor (e.g., by the AC coil) due to slotting effects, which may vary according to rotational speed of the rotor and thus be indicative of the rotational speed.

In block 2015, the controller adjusts a ratio of power captured by the AC coil based on the motor characteristic, where the ratio of power captured is (a) an amount of wirelessly transferred power from the stator that is captured relative to (b) an amount of power induced due to system flux variations that is captured. As an example, the controller may compare the motor characteristic to a speed threshold, which may be a threshold indicative of a particular rotor speed and represented in the appropriate units given the motor characteristic (e.g., rotations per minute, zero-crossings per minute, flux variations per minute, etc.). When the controller determines that the motor characteristic exceeds the speed threshold (i.e., indicating that the rotational speed of the rotor is above a speed threshold), the controller adjusts the ratio to reduce the amount of wireless transferred power from the stator that is captured and/or increases an amount of power induced due to system flux variations that is captured. For example, to make this adjustment, the controller may reduce a modulation or injection into the stator windings intended to provide wirelessly power transfer to the rotor. This reduction may result in the system flux variations naturally or inherently inducing additional current in the AC coil of the rotor to make up for the reduction in power received and captured from the stator windings.

In block 2020, the DC coil is driven based on the power captured by the AC coil with the ratio as adjusted (in the previous block 2015). For example, to implement the block 2020, the controller may continue to execute the method 1900 of FIG. 19 to provide the wireless power transfer from the stator, the AC coil may capture power from both the stator and the system flux variations, and the DC coil is driven by a rectifier on the rotor that uses, as its AC supply or input, the new ratio of power captured by the AC coil.

After block 2020, the method 2000 (or controller) may proceed back to block 2010 to again determine the motor characteristic (i.e., an updated motor characteristic) before proceeding through blocks 2015 and 2020, thereby continuously adjusting the ratio of power captured based on the motor characteristic. Accordingly, in a further pass through blocks 2010, the controller may determine that the motor characteristic no longer exceeds the speed threshold (i.e., indicating that the rotational speed of the rotor is below the speed threshold), the controller adjusts the ratio to increase the amount of wireless transferred power from the stator that is captured and/or decrease an amount of power induced due to system flux variations that is captured. For example, to make this adjustment, the controller may increase a modulation or injection into the stator windings intended to provide wirelessly power transfer to the rotor. The system flux variations may already have decreased, in light of the reduced motor speed, and/or this reduction in the modulation or injection may result in the system flux variations naturally or inherently inducing less current in the AC coil of the rotor.

In some examples, the ratio is adjusted such that, when the rotor speed is determined to be above the speed threshold, the AC coil is substantially entirely powered by system flux variations and, when the rotor speed is determined to be below the speed threshold, the AC coils is substantially entirely powered by the modulation or injection into the stator windings.

Rotor Coils with Mismatched Inductance

In some embodiments of the electrical machines disclosed herein having a rotor with an AC and DC coil, the AC coil and DC coil of a rotor tooth or pole (or of each rotor tooth or pole) are provided with substantially different inductances. In these "mismatched inductance" embodiments, the DC coil may be provided with a higher inductance than the AC coil. Although referred to as an AC and DC coil, as with other AC and DC coils described herein, the AC coil may also be referred to as an auxiliary or minor axis coil, and the DC coil may also be referred to as a primary or major axis coil. Further, the AC coil may be referred to as an antenna or antenna coil, as it may receive power and/or data signals wirelessly (e.g., from the stator windings).

In these mismatched inductance embodiments, during operation of the electrical machine for wireless power transfer from the stator to the rotor, a high frequency signal modulation may be generated and imposed on a lower frequency carrier signal that is driven through one or more stator coils, using similar techniques as described above for other embodiments. Here, the modulation frequency is, for example, at least 10 times the carrier signal frequency, at least 100 times the carrier signal frequency, or at least 1,000 times the carrier signal frequency. In some embodiments the modulation frequency may be above 500 Hz, above 1,000 Hz, above 5,000 Hz, or above 10,000 Hz. The modulation signal generates an electromagnetic wave that transfers power from the stator to the rotor, where the electromagnetic wave interacts with the two coils (AC coil and DC coil) of different inductance wound about the rotor pole. The first (AC) coil is lower inductance (e.g., at least 10 times lower, at least 50 times lower, or at least 100 times lower) than the second, higher inductance (DC) coil, and is in electrical communication with the AC inputs to a rectifier circuit (e.g., a partially rectified or fully rectified circuit, such as a half bridge or full bridge diode rectifier). The rectifier circuit receives the energy from the first coil and translates (i.e., rectifies) the energy into a rectified electrical source. The signal also interacts with the high inductance coil; however, the higher inductance of this coil generates a virtual impedance that blocks significant power transfer, which is undesirable in the second (DC) coil. In other words, the stator may wireless transfer power to the first (AC) coil without impacting the second (DC) coil through induced modulations in the second (DC) coil. For example, the AC coil may couple relatively well to a D axis injection, while the DC coil couples relatively poorly to the same D axis injection, ideally acting purely as a resistive load to flux the rotor. As a result, two coils of different inductance (mismatched inductance) may be used to generate net DC current on the rotor pole without the use of a secondary power transfer step.

In some embodiments, to provide the coils of different inductance levels, a different number of turns may be used. For example, the higher inductance coil may have more turns than the lower inductance coil. In some examples, aside from the number of turns, these coils may otherwise be generally similar in construction.

In some further embodiments, to further enhance the effect, a secondary inductive material (a leakage inductor) may be placed in magnetic communication with the higher inductance coil to further enhance the inductance of the high inductance coil, disproportionate to the number of turns. This leakage inductor may be placed as a closed or partially closed ring about the end turns of the high inductance coil and may be made of magnetic iron of similar properties as the rotor, or alternatively some other inductive material.

In some embodiments, to further enhance the inductance of the high inductance coil, the end turns of the high inductance (DC) coil, but not the AC coil, may be embedded or wrapped in a ferromagnetic material. This has the added benefit of acting as a linear snubber on the field winding on a turn-by-turn basis, protecting rotor circuit components (e.g. diodes or capacitors) from high voltages that could be induced in the rotor windings and/or enabling use of rotor circuit components with lower voltage ratings than otherwise usable. In one example implementation, a ferrite "cap" may be injection molded around the DC coil's end turns at one or both ends of the rotor.

In some embodiments, to further enhance the inductance separation between the high inductance (DC) coil and low inductance (AC) coil, instead or in addition to the above modifications to the DC coil, the end turns of the AC coil be manufactured with "hairpin" turns at the rotor tooth thank corners to minimize additional leakage (and thereby, reduce inductance).

Figure 21:
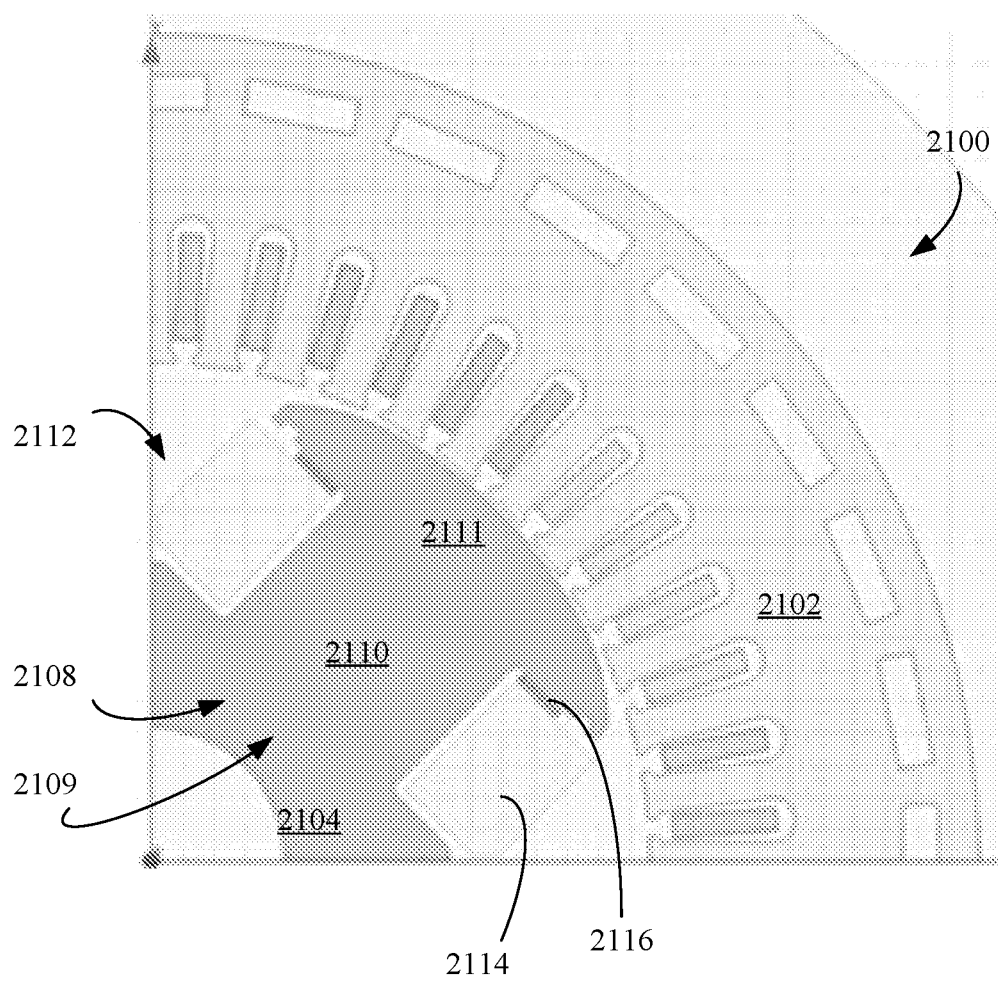
FIG. 21 is a planar cross-sectional view of an example motor.

FIG. 21 is a planar cross-sectional view of an example motor 2100 including a stator 2102 and including a rotor 2104 having coils with mismatched inductance. The example motor 2100 is substantially similar to the rotor 600 with the exception of any differences described herein. In FIG. 21, relative to FIGS. 6A-B, like numbers plus 1500 are used to designate similar components.

Each rotor pole 2108 is associated with a tooth 2109 of ferromagnetic material and includes a DC coil 2114 and an AC coil 2116. The DC coil 2114 and AC coil 2116 are wrapped around a winding portion 2110 of each tooth 2109 and extend through a channel 2112 defined by the winding portion 2110 and a cap 2111 (also referred to as an end flange). The DC coil 2114 is adjacent to and parallel to the AC coil 2116. A D-axis of the DC coil 2114 may be generally aligned with an AC D-axis of the AC coil 2116. The AC coil 2116 is a "pancake" or generally flat coil that is wrapped multiple times around the winding portion 2110 at the same radial position so that the AC coil 2116 does not extend significantly in the radial direction along the winding portion 2110 (e.g., more than the one or a few times the diameter of the wound conductor forming the coil). In light of the single AC coil 2116 per rotor pole 2108 in this example, the circuit diagram of FIGS. 3A, 3B, and 3C may each be applicable in this embodiment. However, in some examples, the circuit diagram of FIG. 3A may further include capacitance (in the form of a discrete capacitor(s) or implicit capacitance in the motor 2100) coupled across the output of the rectifier similar to the capacitors 358 and 370 of FIGS. 3B-C.

Further, the motor 2100 may be an example of an electrical machine with rotor coils of mismatched inductance, as described above. That is, in such examples, the AC coil 2116 has a significantly higher inductance than the DC coil 2114.

Thus, particular implementations of the subject matter have been described. Other implementations and modifications are within the scope of the following claims and have the benefit of this disclosure. It is intended to embrace all such implementations and modifications and, accordingly, the above description to be regarded as illustrative rather than in a restrictive sense. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, and various elements may be added, reordered, combined, omitted, or modified. Further, in some non-limiting examples, certain operations can be executed in parallel, including by dedicated parallel processing devices, or separate computing devices configured to interoperate as part of a large system.

One or more embodiments are described and illustrated in the following description and accompanying drawings. These embodiments are not limited to the specific details provided herein and may be modified in various ways. Furthermore, other embodiments may exist that are not described herein. Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

In some non-limiting examples, aspects of the present disclosure, including computerized implementations of methods, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, non-limiting examples of the invention can be implemented as a set of instructions, tangibly embodied on a non-transitory computer-readable media, such that a processor device can implement the instructions based upon reading the instructions from the computer-readable media. Some non-limiting examples of the invention can include (or utilize) a device such as an automation device, a special purpose or a (specifically programmed and configured) general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to the invention, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular non-limiting examples of the invention. Further, in some non-limiting examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

As used herein, the term, "controller" and "processor" and "computer" include any device capable of executing a computer program, or any device that includes logic gates configured to execute the described functionality. For example, this may include a processor, a microcontroller, a field-programmable gate array, a programmable logic controller, etc. As another example, these terms may include one or more processors and memories and/or one or more programmable hardware elements, such as any of types of processors, CPUs, microcontrollers, digital signal processors, or other devices capable of executing software instructions.

In addition, the phraseology and terminology used herein is for the purpose of description and should not be regarded as limiting. For example, the use of "comprising," "including," "containing," "having," and variations thereof herein is meant to encompass the items listed thereafter and equivalents thereof as well as additional items. Additionally, the terms "connected" and "coupled" are used broadly and encompass both direct and indirect connecting and coupling, and may refer to physical or electrical connections or couplings. The modifier "substantially," when used to modify a particular action, state, or other term (e.g., substantially closed), may refer to an amount that is apparent within the context of its use to one of skill in the art, and which, at least in some embodiments, refers to 90%, 95%, 99%, or 99.5% of the modified term. Furthermore, the phase "and/or" used with two or more items is intended to cover the items individually and both items together. For example, "a and/or b" is intended to cover: a; b; and a and b. Unless otherwise specified or limited, phrases similar to "at least one of A, B, and C," "one or more of A, B, and C," etc., are meant to indicate A, or B, or C, or any combination of A, B, and/or C, including combinations with multiple or single instances of A, B, and/or C.

What is claimed is:

1. A field wound synchronous electric machine comprising:

a stator including stator windings configured to be energized to define stator poles;

a rotor including rotor windings configured to be energized to define fixed rotor poles with associated teeth comprising a ferromagnetic material and including a winding portion and a cap, where the fixed rotor poles interact with the stator poles to produce relative forces between the rotor and the stator, each of the rotor windings is associated with a respective at least one tooth of the teeth, and each of the rotor windings comprises:

an auxiliary coil configured to carry a first current induced by an AC current flowing in the stator, and a primary coil configured to carry a second current that defines a respective one of the fixed rotor poles; and a rectifier electrically coupled to the auxiliary coil and the primary coil of a first rotor winding of the rotor windings, the rectifier being configured to receive the first current induced in the auxiliary coil of the first rotor winding and to generate the second current in the primary coil of the first rotor winding from the first current induced in the auxiliary coil;

wherein a D-axis of the primary coil of the first rotor winding in a synchronous reference frame extends radially outward from a rotor shaft through the rotor pole of the rotor winding, and wherein a D-axis of the auxiliary coil of the first rotor winding in the synchronous reference frame is (i) substantially perpendicular to the D-axis of the primary coil of the first rotor winding in the synchronous reference frame, and the auxiliary coil extends through a first channel of the cap of a first tooth of the teeth and a second channel of a trunk of the rotor or the first tooth, or (ii) substantially aligns with the D-axis of the primary coil of the first rotor winding in the synchronous reference frame, and the primary coil and the auxiliary coil of the first rotor winding are wrapped around a winding portion of the first tooth of the teeth.

2. The field wound synchronous electric machine of claim 1, further comprising a controller configured to:

drive the stator windings to induce the first current in the rotor windings; and drive the stator windings to generate magnetic fields that provide a magnetomotive force that interacts with fixed rotor poles of the rotor to move the rotor relative to the stator.

3. The field wound synchronous electric machine of claim 1, wherein the rectifier comprises a passive rectifier.

4. The field wound synchronous electric machine of claim 1, wherein the rectifier comprises an active rectifier comprising one or more gates.

5. The field wound synchronous electric machine of claim 1, wherein the rectifier comprises a resonance capacitor and a voltage regulator configured to regulate a voltage across the resonance capacitor.

6. The field wound synchronous electric machine of claim 1, wherein the rectifier comprises a secondary inductor on a DC side of the rectifier.

7. The field wound synchronous electric machine of claim 1, wherein the auxiliary coil of each rotor winding is a first auxiliary coil, and wherein each rotor winding further comprises a second auxiliary coil, wherein the first auxiliary coil and the second auxiliary coil of each rotor winding have different D-axis alignments in a synchronous reference frame.

8. The field wound synchronous electric machine of claim 7, wherein the first auxiliary coil and the second auxiliary coil of each rotor winding each have a D-axis in a synchronous reference frame different from a primary coil D-axis of each rotor winding in the synchronous reference frame.

9. The field wound synchronous electric machine of claim 1, further comprising a spacer between the auxiliary coil and primary coil.

10. The field wound synchronous electric machine of claim 1, wherein an AC voltage within the auxiliary coil of each rotor winding is at least 5 times more than a voltage within the primary coil of the rotor winding, and wherein a DC current within the primary coil of each rotor winding is at least 5 times more than a current within the auxiliary coil of the rotor winding.

11. The field wound synchronous electric machine of claim 1, further comprising a plurality of rectifiers and the rectifier is a first rectifier of the plurality of rectifiers, each rectifier of the plurality of rectifiers being associated with a respective rotor winding of the rotor windings, being rotationally fixed to the rotor, being electrically coupled to the auxiliary coil and to the primary coil for the respective rotor winding, and, for the respective rotor winding, being configured to receive the first current induced in the auxiliary coil and to generate the second current in the primary coil from the first current induced in the auxiliary coil.

12. The field wound synchronous electric machine of claim 1, wherein the primary coil is positioned on a major D-axis in a synchronous reference frame, and the auxiliary coil is positioned on a minor D-axis in the synchronous reference frame.

13. The field wound synchronous electric machine of claim 1, wherein the auxiliary coil is configured to further receive data signals wirelessly transmitted by the stator.

14. The field wound synchronous electric machine of claim 13, wherein control circuitry is configured to:
    detect the data signals by monitoring the first current for frequency, magnitude, or phase modulations that encode data, and
    decode the frequency, magnitude, or phase modulations.

15. The field wound synchronous electric machine of claim 1, further configured to send data signals through the auxiliary coil to communicate with the stator, wherein the data signals provide control information for the field wound synchronous electric machine, the control information including rotor speed, current level, temperature, or other state information.

16. The field wound synchronous electric machine of claim 1, further comprising:
    a major D-axis that is used for torque production, and
    a minor D-axis that is used for wireless power transfer between the stator and rotor, data communication between the stator and rotor, or both wireless power transfer and data communication between the stator and rotor.

17. The field wound synchronous electric machine of claim 1, wherein a perturbation is applied to the D-axis, a Q-axis, or a Z-axis of the auxiliary coil to generate a field excitation for power transfer.

18. A method of operating for a field wound synchronous electric machine, the method comprising:
    carrying, by an auxiliary coil of a first rotor winding of a plurality of rotor windings of a rotor of the field wound synchronous electric machine, a first current induced by an AC current flowing in a stator of the field wound synchronous electric machine, the stator including stator windings configured to be energized to define stator poles and the rotor windings configured to be energized to define fixed rotor poles with associated teeth comprising a ferromagnetic material and including a winding portion and a cap;
    receiving, by a rectifier, the first current induced in the auxiliary coil, the rectifier being rotationally fixed to the rotor and electrically coupled to the auxiliary coil and to a primary coil of the first rotor winding;
    generating, by the rectifier, a second current from the first current induced in the auxiliary coil; and
    carrying, by the primary coil, the second current from the rectifier, the second current defining a fixed rotor pole of the fixed rotor poles that interacts with the stator poles to produce relative forces between the rotor and the stator,
    wherein a D-axis of the primary coil of the first rotor winding in a synchronous reference frame extends radially outward from a rotor shaft through the rotor pole of the rotor winding, and
    wherein a D-axis of the auxiliary coil of the first rotor winding in the synchronous reference frame is
        (i) substantially perpendicular to the D-axis of the primary coil of the first rotor winding in the synchronous reference frame, and the auxiliary coil extends through a first channel of the cap of a first tooth of the teeth and a second channel of a trunk of the rotor or the first tooth, or
        (ii) substantially aligns with the D-axis of the primary coil of the first rotor winding in the synchronous reference frame, and the primary coil and the auxiliary coil of the first rotor winding are wrapped around a winding portion of the first tooth of the teeth.

19. The method of claim 18, further comprising:
    driving, by a controller, the stator windings to induce the first current in the rotor windings; and
    driving, by the controller, the stator windings to generate magnetic fields that provide a magnetomotive force that interacts with fixed rotor poles of the rotor to move the rotor relative to the stator.

20. The method of claim 18, wherein the rectifier comprises an active rectifier, and the method further comprising:
    controlling one or more gates of the active rectifier to rectify the first current induced in the rotor windings.

21. The method of claim 18, further comprising:
    regulating, by a voltage regulator, a voltage across a resonance capacitor of the rectifier.

*    *    *    *    *